US011020909B2

(12) United States Patent
Compton et al.

(10) Patent No.: US 11,020,909 B2
(45) Date of Patent: Jun. 1, 2021

(54) METHODS OF PRODUCING A CELLULAR STRUCTURE

(71) Applicant: University of Tennessee Research Foundation, Knoxville, TN (US)

(72) Inventors: Brett Gibson Compton, Knoxville, TN (US); Michael James Goin, Knoxville, TN (US); Hesam Shams, Knoxville, TN (US); Oleg Shylo, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 264 days.

(21) Appl. No.: 16/165,880

(22) Filed: Oct. 19, 2018

(65) Prior Publication Data

US 2019/0118486 A1 Apr. 25, 2019

Related U.S. Application Data

(60) Provisional application No. 62/575,054, filed on Oct. 20, 2017.

(51) Int. Cl.
*B22F 7/04* (2006.01)
*B29C 41/20* (2006.01)
(Continued)

(52) U.S. Cl.
CPC .............. *B29C 64/40* (2017.08); *B28B 1/001* (2013.01); *B29C 64/10* (2017.08); *B29C 64/106* (2017.08);
(Continued)

(58) Field of Classification Search
CPC .......... B22F 3/1055; B22F 7/04; B28B 1/001; B29C 41/02; B29C 41/20; B29C 64/10;
(Continued)

(56) References Cited

U.S. PATENT DOCUMENTS

2014/0255647 A1* 9/2014 Johnson ................ B29C 64/112
428/118

OTHER PUBLICATIONS

Kolesky et al., "3D Bioprinting of Vascularized, Heterogeneous Cell-Laden Tissue Constructs," Adv. Mater, pp. 1-7 (2014).

* cited by examiner

*Primary Examiner* — Leo B Tentoni
(74) *Attorney, Agent, or Firm* — Jenkins, Wilson, Taylor & Hunt, P.A.

(57) ABSTRACT

A method of producing a cellular structure via an additive manufacturing technique includes the steps of: providing a feedstock material to an additive manufacturing printer device; dispensing the feedstock material from the printer device; and controlling the dispensing of the feedstock material to form at least one layer of the cellular structure according to a first predetermined gradient. In some aspects, the cellular structure comprises an array of cells surrounded, respectively, by walls, and arranged to create a non-uniform relative density and/or cell geometry across a width and/or a height of the cellular structure. An article of manufacture produced by such methods includes a cellular structure configured to produce a controlled collapse with selectable dynamic stiffness characteristics by altering the distribution and geometry of cells within the cellular structure, while being able to maintain a substantially similar static stiffness characteristic.

22 Claims, 35 Drawing Sheets
(23 of 35 Drawing Sheet(s) Filed in Color)

(51) Int. Cl.
  *B29C 70/68* (2006.01)
  *B33Y 10/00* (2015.01)
  *B29C 64/40* (2017.01)
  *B29C 64/393* (2017.01)
  *C08J 9/26* (2006.01)
  *B29C 64/314* (2017.01)
  *B29C 64/153* (2017.01)
  *B33Y 70/00* (2020.01)
  *B29C 64/118* (2017.01)
  *B29C 64/106* (2017.01)
  *B29C 64/112* (2017.01)
  *B29C 64/10* (2017.01)
  *B28B 1/00* (2006.01)
  *B29K 63/00* (2006.01)
  *B29K 75/00* (2006.01)
  *B29D 99/00* (2010.01)
  *B29K 103/04* (2006.01)
  *B29K 103/06* (2006.01)
  *B29K 67/00* (2006.01)
  *B29K 21/00* (2006.01)
  *B29L 31/60* (2006.01)
  *B29K 55/02* (2006.01)
  *B29L 24/00* (2006.01)

(52) U.S. Cl.
  CPC .......... *B29C 64/112* (2017.08); *B29C 64/118* (2017.08); *B29C 64/153* (2017.08); *B29C 64/314* (2017.08); *B29C 64/393* (2017.08); *B33Y 70/00* (2014.12); *C08J 9/26* (2013.01); *B29D 99/0089* (2013.01); *B29K 2021/00* (2013.01); *B29K 2055/02* (2013.01); *B29K 2063/00* (2013.01); *B29K 2067/046* (2013.01); *B29K 2075/00* (2013.01); *B29K 2075/02* (2013.01); *B29K 2103/04* (2013.01); *B29K 2103/06* (2013.01); *B29L 2024/006* (2013.01); *B29L 2031/608* (2013.01)

(58) Field of Classification Search
  CPC ... B29C 64/106; B29C 64/112; B29C 64/118; B29C 70/68; B29D 99/0089; B29K 2021/00; B29K 2055/02; B29K 2063/00; B29K 2067/046; B29K 2075/00; B29K 2075/02; B29K 2103/04; B29K 2103/06; B29L 2024/006; B29L 2031/608; B33Y 10/00; B33Y 70/00
  USPC ......... 264/259, 308, 331.11, 331.13, 331.19, 264/331.21
  See application file for complete search history.

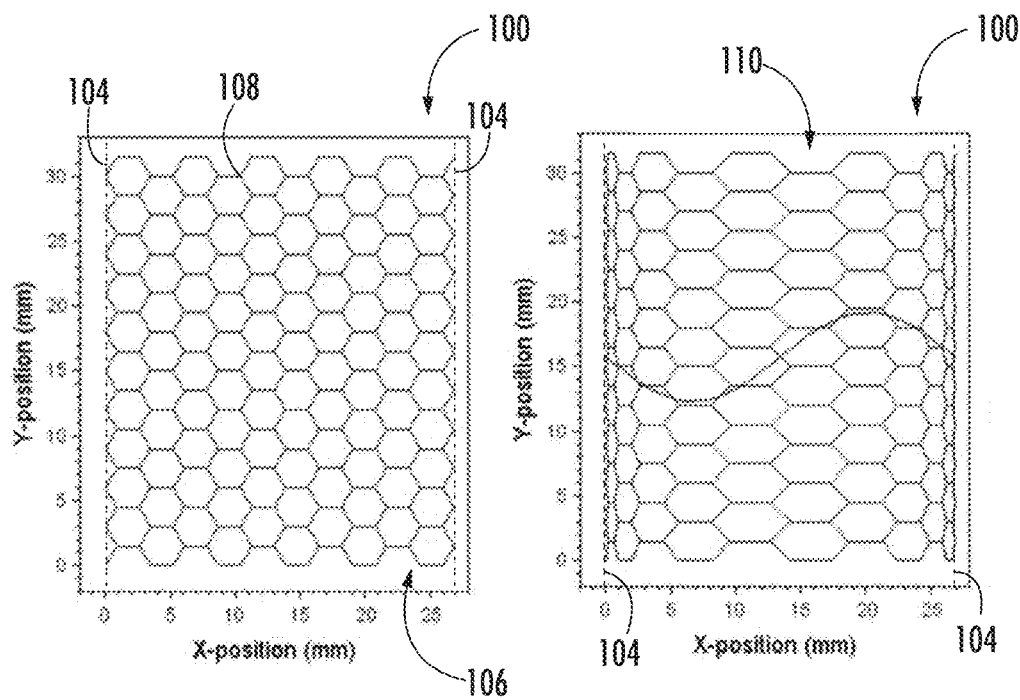
FIG. 3A
FIG. 3C
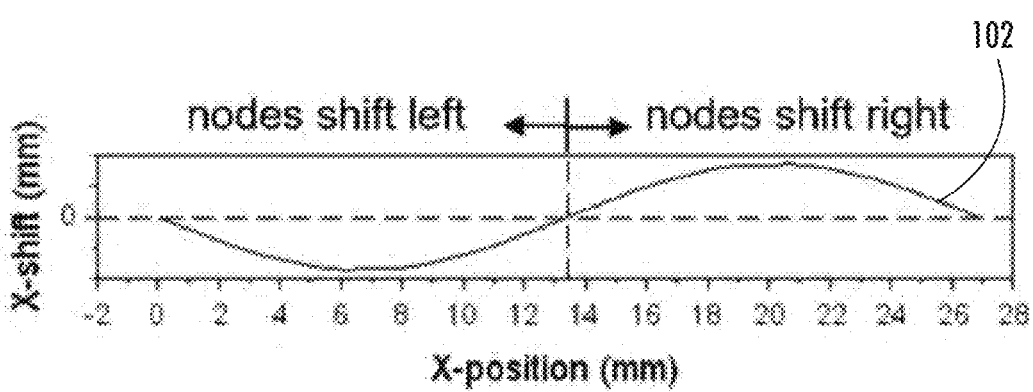
FIG. 3B

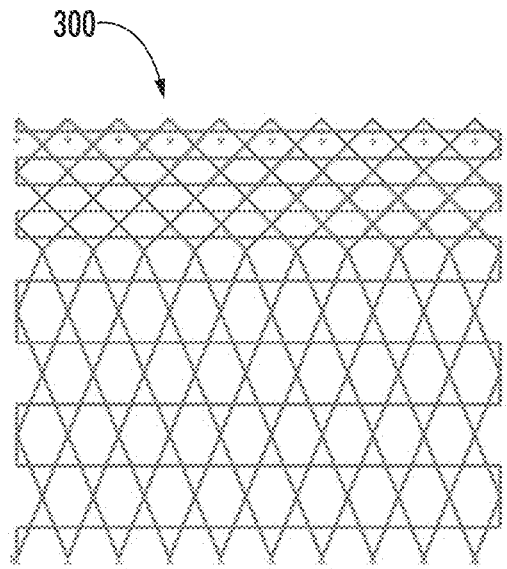
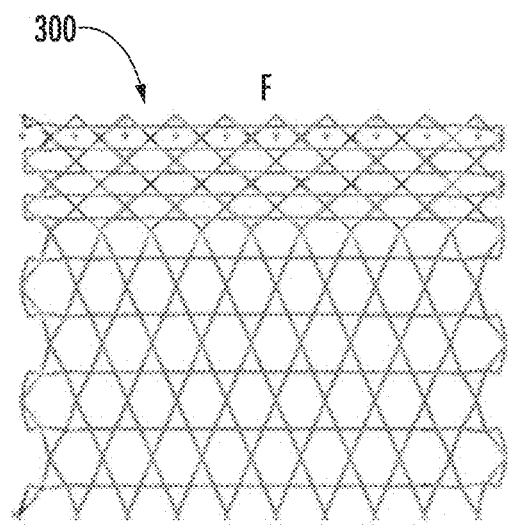
FIG. 20A  FIG. 20B
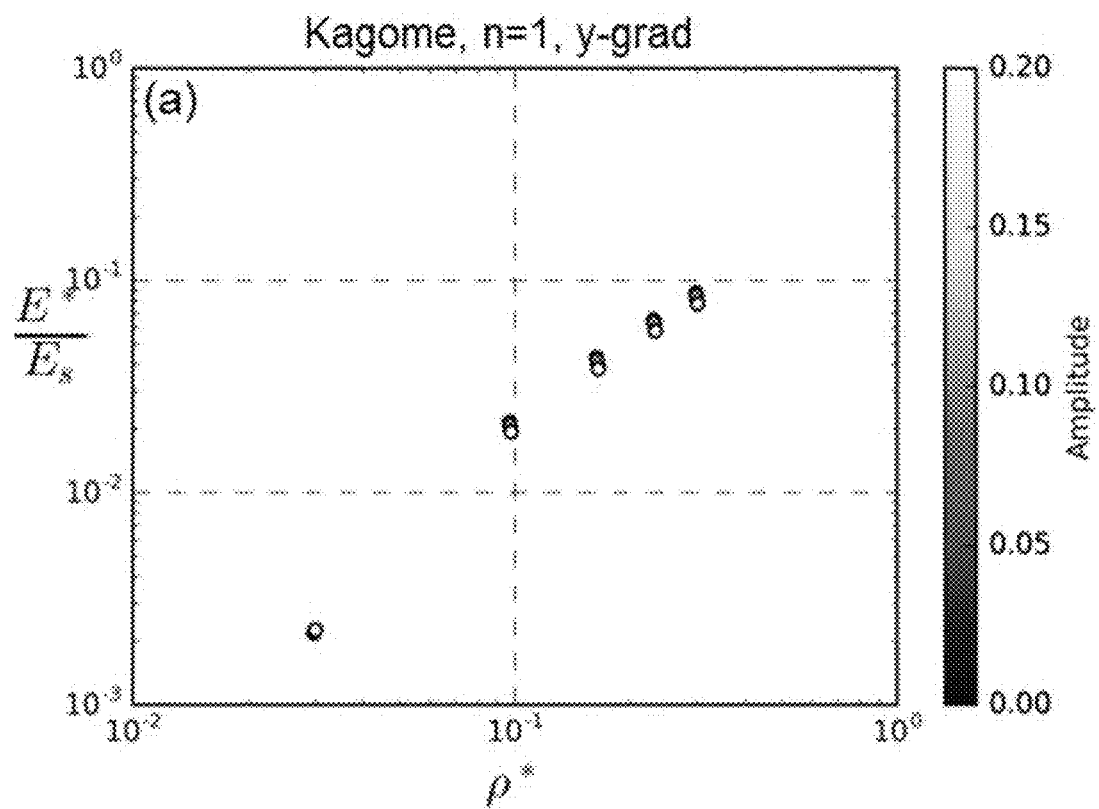
FIG. 20C

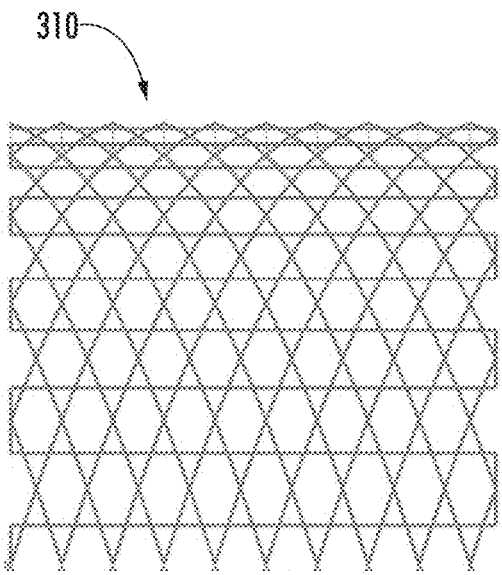 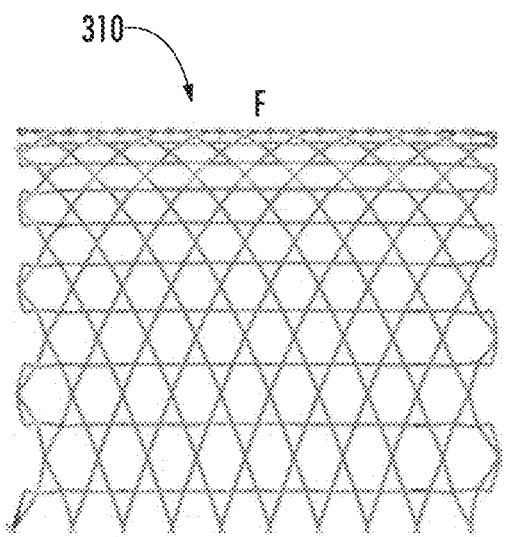
FIG. 21A  FIG. 21B
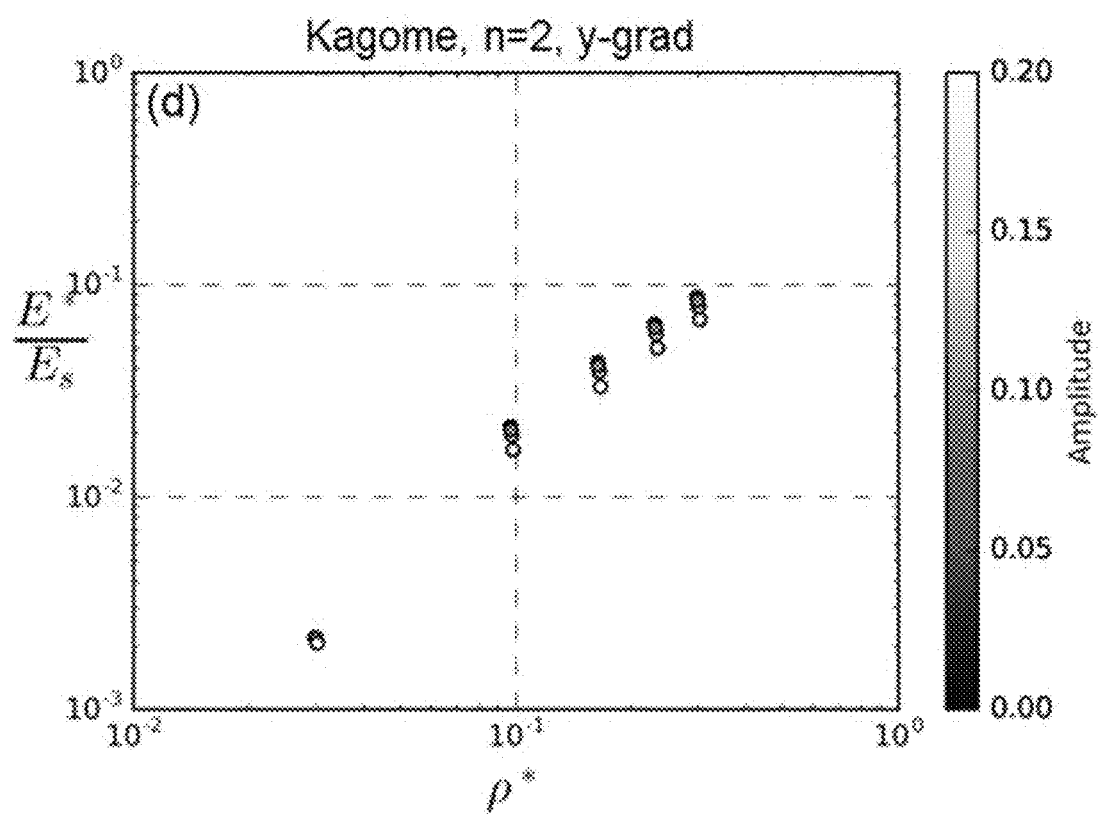
FIG. 21C

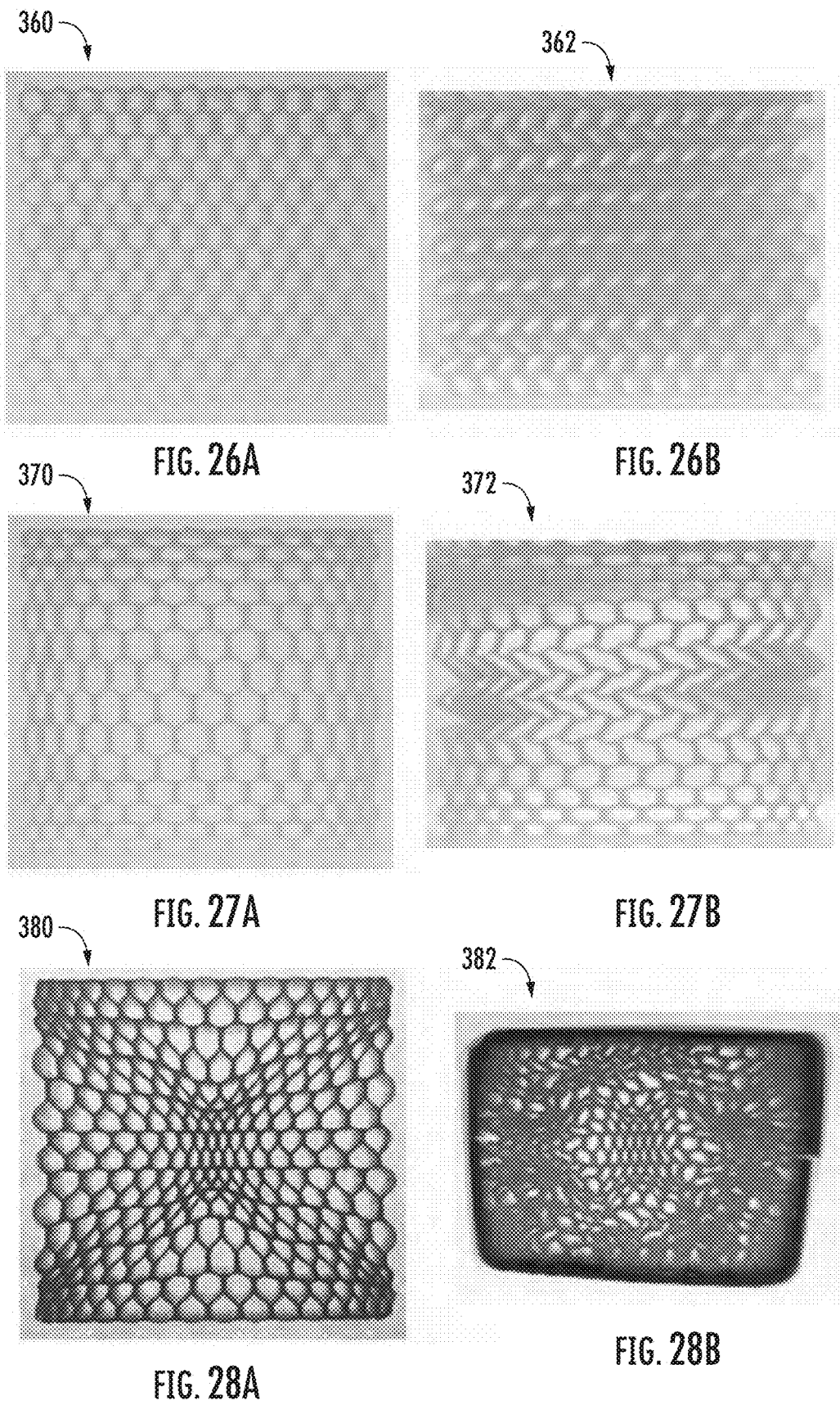

METHODS OF PRODUCING A CELLULAR STRUCTURE

CROSS-REFERENCE TO RELATED APPLICATIONS

This application claims benefit of U.S. Provisional Patent Application Ser. No. 62/575,054, filed Oct. 20, 2017, which is herein incorporated by reference in its entirety.

TECHNICAL FIELD

The presently disclosed subject matter relates to a method of producing a three-dimensional (3D) article of manufacture having a cellular structure, such as by using an additive manufacturing (AM) technique. More particularly, the presently disclosed subject matter relates to controlling a shape and/or distribution of the cells within the cellular structure.

BACKGROUND

Cellular materials offer unique combinations of mechanical properties (strength and stiffness), functional properties (thermal insulation, vibration damping, fluid flow, etc.), and low density that conventional engineering materials cannot achieve. As can be seen in FIGS. 1A-1C, which show example arrangements of cells within such cellular structure, cellular materials are typically comprised of thin walls (or "struts") of solid material arranged periodically in space to define empty cells (or "voids"). For example, in FIG. 1A, a hexagonal cell geometry is illustrated, while FIGS. 1B and 1C show triangular and square cell geometries, respectively.

The properties of cellular materials are largely dictated by the properties of the base material from which the walls are formed, the connectivity and shape of the walls, and the relative proportion of solid material to empty space (e.g., the relative density) of the cellular structure. This can be seen in FIGS. 2A-2C, with FIG. 2A providing a diagram for geometric definitions of a hexagonal cellular structure. As shown in FIG. 2A, h is the height of a side wall of the hexagonal cell, I is the length of a top or bottom wall, and θ is the angle between the side wall height h and the top wall length I, with θ being expressed as an angle beyond a right angle (e.g., 90°). FIG. 2B is a graph of normalized elastic modulus vs. relative density, with values plotted for θ values of 15°, 30°, and 45°. For hexagonal cell geometries, the cell arrangements are isotropic when θ is equal to 30° and anisotropic when θ does not equal 30°. FIG. 2C is a graph of Poisson's ratio vs. relative wall length, defined as h/I, plotted for θ values of 20, 30°, and 40°.

Common applications of cellular materials include thermal insulation, protective packaging for goods during transport, crumple zones and other protection systems in vehicles, shoe insoles, acoustic tiles, padding and armor (e.g., helmet liners), etc. Because the properties of cellular materials depend on the relative density of the structure and the shape of the individual cells, the properties of cellular materials can be tuned over a wide range without altering the composition of the base material. That is, cellular materials offer unique opportunities to vary mechanical and functional properties spatially within one component made of one single material. Structures that employ graded cellular materials can possess greater resistance to buckling than non-graded structures would possess for the same amount of material. Additionally, graded cellular structures can have drastically different dynamic properties, such as, for example, energy absorption during dynamic crushing, than uniformly distributed cellular structures and, furthermore, can have two different gradient schemes that result in identical static properties can result in drastically different dynamic properties. There is also potential for designing graded cellular structures with tailored and unique combinations of static and dynamic properties, but these graded cellular structures have so far proven exceptionally ill-suited to conventional manufacturing techniques.

The rise of additive manufacturing (AM) has accelerated research on graded cellular materials, since AM methods enable the fabrication of structures with unprecedented geometric complexity. However, much of the research on graded cellular materials to date has focused on metal lattices fabricated using powder bed fusion AM technology. With this particular technology, the design and process flow favors the creation of gradients in cellular material density using a constant cell shape and changing only the thickness of the struts or walls. However, by constraining structures to having a fixed unit cell geometry, the range of properties that can be achieved within a structure is drastically limited. Furthermore, any such known techniques are particularly ill-suited to material extrusion AM methods, which include, for example, fused deposition modeling (FDM™), fused filament fabrication (FFF), big area additive manufacturing (BAAM), robocasting, paste extrusion, and direct ink writing (DIW). This class of AM technologies is the most widely used AM technology and is also the most readily accessible to hobbyists, students, and academics, largely because of the low cost of such additive manufacturing devices.

Accordingly, there currently exists a need for methods of creating a three-dimensional cellular structure with a gradient applied thereacross to provide a non-uniform arrangement of cells in one or more directions of a cellular structure.

SUMMARY

In some embodiments, the presently disclosed subject matter provides a method of producing a three-dimensional (3D) structure, such as via an additive manufacturing technique. In some embodiments, the method comprises: providing a feedstock material to an additive manufacturing printer device; dispensing the feedstock material from the printer device; and controlling the dispensing of the feedstock material to form at least one layer of the cellular structure according to a first predetermined gradient, such that the at least one layer comprises an array of cells surrounded, respectively, by walls, and arranged to create a non-uniform relative density and/or cell geometry across a width and/or a height of the cellular structure.

In some embodiments, the feedstock material is selected from the group consisting of one or more of acrylonitrile butadiene styrene (ABS), poly(lactic acid) (PLA), and other thermoplastics, epoxies, elastomers, reactive polymer systems (e.g., polyurethane, polyurea), preceramic polymer resins, ceramics, metals, fiber composites, bio-materials, gels, conductive inks, and battery materials.

In some embodiments of the method, the array of cells comprises cells having a shape of one or more of a triangle, a square, a rectangle, a parallelogram, a kagome pattern, a hexagon, an octagon, and an hourglass.

In some embodiments of the method, the relative density of the at least one layer increases from a first side of the at least one layer to a second side of the at least one layer.

In some embodiments of the method, at least some of the walls are arranged between adjacent cells of the array of cells.

In some embodiments of the method, the array of cells is arranged according to a shift function to create the non-uniform relative density and/or cell geometry across the width and/or the height of the at least one layer.

In some embodiments of the method, the shift function is a non-linear shift function, such that each row and/or column of cells in the array of cells has a different relative density and/or cell geometry from an adjacent row and/or column of cells in the array of cells.

In some embodiments of the method, the at least one layer has a lower and/or higher relative density in a center region of the at least one layer than at a perimeter region of the at least one layer.

In some embodiments of the method, the shift function is a piece-wise linear shift function, such that the at least one layer comprises at least first and second regions, wherein the array of cells comprises a first subarray of cells and a second subarray of cells, wherein the first subarray of cells has a first relative density and is arranged in the first region, and wherein the second subarray of cells has a second relative density and is arranged in the second region.

In some embodiments of the method, the first relative density is different from the second relative density.

In some embodiments of the method, the first subarray of cells comprises cells that are a different size, aspect ratio, and/or shape than cells in the second subarray of cells.

In some embodiments of the method, controlling the dispensing of the feedstock material comprises: arranging at least one attractor node and/or at least one detractor node within the first predetermined gradient; selecting an amplitude associated with the shift function to determine a degree of non-linearity of a distribution of cells within the array of cells; and applying the shift function to generate a non-uniform distribution of cells within the array of cells.

In some embodiments of the method, the shift function comprises a piece-wise linear shift function, a quadratic shift function, a sinusoidal shift function, an exponential shift function, or any combination thereof.

In some embodiments, the method comprises controlling the dispensing of the feedstock to form a plurality of subsequent layers of the cellular structure according to respective predetermined gradients.

In some embodiments of the method, a relative density and/or cell geometry of an array of cells of a first layer has a different gradient from a relative density and/or cell geometry of an array of cells of a second layer.

In some embodiments, the method comprises varying a speed of a nozzle of the printer device as the feedstock material is dispensed to produce walls having variable thickness.

In some embodiments of the method, the additive manufacturing technique comprises one or more of a fused deposition modeling (FDM™) technique, a fused filament fabrication (FFF) technique, a big area additive manufacturing (BAAM) technique, a robocasting technique, a paste extrusion technique, and/or a direct ink writing (DIW) technique.

In some embodiments of the method, the cellular structure comprises a single layer, wherein the at least one layer is the single layer, and wherein the at least one layer is dispensed onto a substrate.

In some embodiments of the method, the substrate comprises woven or non-woven fabric, felt, polymer film, paper, and/or foil.

In some embodiments, the method comprises: defining a three-dimensional domain corresponding to a three-dimensional cellular structure; arranging a plurality of nodes throughout the domain; applying a shift function in at least one direction of the domain so that the nodes have a non-uniform distribution in the at least one direction; and interconnecting the nodes to form individual three-dimensional cells within the cellular structure.

In some embodiments of the method, interconnecting the nodes comprises connecting adjacent nodes with struts so that the cellular structure is of an open cell type.

In some embodiments of the method, the individual cells are physically segregated from each other by walls so that the cellular structure is of a closed cell type.

In another embodiment, the presently disclosed subject matter provides an article of manufacture, the article comprising: a cellular structure having one or more layers that are dispensed in a viscous form, wherein each of the one or more layers comprise a plurality of walls that define an array of cells, and wherein the array of cells is arranged to create a non-uniform relative density and/or cell geometry across a width and/or a height of the cellular structure. In some embodiments, the cellular structure is a three-dimensional (3D) cellular structure. In some embodiments, the cellular structure comprises a layer that is individually dispensed in a viscous form, wherein the layer comprises a plurality of walls that define an array of cells (e.g., are arranged between adjacent cells), and wherein the array of cells is arranged to create a non-uniform relative density and/or cell geometry across a width and/or a height of the structure. In some embodiments, the article is produced by an additive manufacturing technique.

In some embodiments, the article of manufacture comprises a material that is selected from the group consisting of one or more of acrylonitrile butadiene styrene (ABS), poly (lactic acid) (PLA), and other thermoplastics, epoxies, elastomers, reactive polymer systems (e.g., polyurethane, polyurea), preceramic polymer resins, ceramics, metals, fiber composites, bio-materials, gels, conductive inks, and battery materials.

In some embodiments of the article of manufacture, the array of cells comprises cells having a shape of one or more of a triangle, a square, a rectangle, a parallelogram, a kagome pattern, a hexagon, and an octagon.

In some embodiments of the article of manufacture, the relative density of the article of manufacture increases from a first side of the article of manufacture to a second side of the article of manufacture.

In some embodiments of the article of manufacture, at least some of the plurality of walls are arranged between adjacent cells of the array of cells.

In some embodiments of the article of manufacture, the array of cells is arranged according to a shift function to create the non-uniform relative density and/or cell geometry across the width and/or the height of the article of manufacture.

In some embodiments of the article of manufacture, the shift function is a non-linear shift function, such that each row and/or column of cells in the array of cells has a different relative density and/or cell geometry from an adjacent row and/or column of cells in the array of cells.

In some embodiments of the article of manufacture, the article of manufacture has a lower relative density in a center region of the article of manufacture than at a perimeter region of the article of manufacture.

In some embodiments of the article of manufacture, the shift function is a piece-wise linear shift function, such that the cellular structure comprises at least first and second regions, wherein the array of cells comprises a first subarray of cells and a second subarray of cells, wherein the first subarray of cells has a first relative density and is arranged in the first region, and wherein the second subarray of cells has a second relative density and is arranged in the second region.

In some embodiments of the article of manufacture, the first relative density is different from the second relative density.

In some embodiments of the article of manufacture, the first subarray of cells comprises cells that are a different size, aspect ratio, and/or shape than cells in the second subarray of cells.

In some embodiments of the article of manufacture, a relative density and/or cell geometry of an array of cells of a first layer of the one or more layers has a different gradient from a relative density and/or cell geometry of an array of cells of a second layer of the one or more layers.

In some embodiments of the article of manufacture, the first and second layers are adjacent layers within the article of manufacture, and wherein the second layer is applied sequentially to the first layer.

In some embodiments, the article of manufacture comprises a non-uniform distribution of cells within the array of cells in each of the one or more layers, wherein a degree of the non-uniform distribution of cells within the array of cells for each of the one or more layers is determined by selecting an amplitude associated with the shift function for each of the one or more layers.

In some embodiments of the article of manufacture, the shift function comprises a piece-wise linear shift function, a quadratic shift function, a sinusoidal shift function, an exponential shift function, or any combination thereof.

In some embodiments of the article of manufacture, one or more of the plurality of walls have a thickness different from a thickness of others of the plurality of walls.

In some embodiments of the article of manufacture, the article is produced via an additive manufacturing technique.

In some embodiments of the article of manufacture, the additive manufacturing technique comprises one or more of a fused deposition modeling (FDM) technique, a fused filament fabrication (FFF) technique, a big area additive manufacturing (BAAM) technique, a robocasting technique, a paste extrusion technique, and/or a direct ink writing (DIW) technique.

In some embodiments of the article of manufacture, the one or more layer is dispensed onto a substrate.

In some embodiments of the article of manufacture, the substrate comprises woven or non-woven fabric, felt, polymer film, paper, and/or foil.

In some embodiments of the article of manufacture, the cellular structure is a three-dimensional cellular structure within a three-dimensional domain; a plurality of nodes are arranged throughout the domain; a shift function is applied in at least one direction of the domain so that the nodes have a non-uniform distribution in the at least one direction; and the nodes are interconnected to form individual three-dimensional cells within the cellular structure.

In some embodiments of the article of manufacture, adjacent nodes are connected with struts so that the cellular structure is of an open cell type.

In some embodiments of the article of manufacture, the individual cells are physically segregated from each other by walls so that the cellular structure is of a closed cell type.

Accordingly, it is an object of the presently disclosed subject matter to provide a method of producing a structure, such as a three-dimensional (3D) structure, such as by an additive manufacturing technique, as well as an article of manufacture produced by such methods.

An object of the presently disclosed subject matter having been stated hereinabove, and which is achieved in whole or in part by the presently disclosed subject matter, other objects will become evident as the description proceeds hereinbelow.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 3A-3C show a schematic illustration of the preparation of a graded cellular structure in FIG. 3C by applying the shift function of FIG. 3B to the uniformly distributed cells of the cellular structure of FIG. 3A.

FIGS. 20A-20C show a kagome-shaped cellular structure, which has a piece-wise linear shift function applied parallel to a loading direction, in an undeformed state (FIG. 20A), a deformed state (FIG. 20B), and a plot (FIG. 20C) of the elastic modulus vs. relative density of the kagome-shaped cellular structure at several amplitudes of the shift function.

FIGS. 21A-21C show a kagome-shaped cellular structure, which has a nonlinearly-graded (e.g., quadratic) shift function applied parallel to a loading direction, in an undeformed state (FIG. 21A), a deformed state (FIG. 21B), and a plot (FIG. 21C) of the elastic modulus vs. relative density of the kagome-shaped cellular structure at several amplitudes of the shift function.

FIGS. 26A-28B are photographs showing, in respective example embodiments, how elastomeric cellular structures can have different gradients (e.g., shift functions) applied thereacross to control a behavior of the collapse of the cells within the cellular structure.

DETAILED DESCRIPTION

Figure 1A:
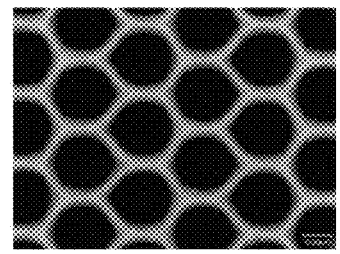
FIGS. 1A-1C show example cell geometries of cellular structures.
Figure 1B:
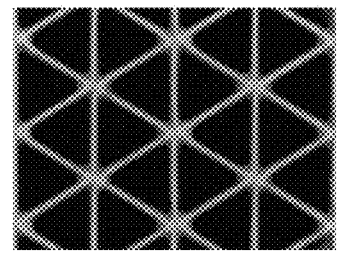
Figure 1C:
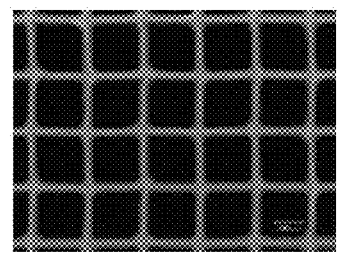

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a," "an," and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising," which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Unless otherwise indicated, all numbers expressing quantities of temperature, time, weight, volume, concentration, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value is meant to encompass variations of, in one example ±20% or ±10%, in another example ±5%, in another example ±1%, and in still another example ±0.1% from the specified amount, as such variations are known to be appropriate to perform the disclosed methods. Additionally, the term "substantially" includes not only the specified amount, but can include, for example, ±20%, ±15%, ±10%, ±5%, ±1%, and ±0.5%, as may be readily understood by those having ordinary skill in the art.

Numerical ranges recited herein by endpoints include all numbers and fractions subsumed within that range (e.g., 1 to 5 includes, but is not limited to, 1, 1.5, 2, 2.75, 3, 3.90, 4, and 5).

In some embodiments, a method of producing a three-dimensional (3D) cellular structure via an additive manufacturing (AM) technique (e.g., material extrusion) is disclosed. In some such embodiments, the method comprises two aspects that can be used independently or in conjunction with each other. In one aspect, the method is used to create at least one cellular structure having one or more gradients, as defined by one or more shift functions, in at least one portion of the cellular structure through a changing relative density and cell shape by shifting the positions and/or geometries of one or more of the cells in space (e.g., compressing the cells in one region to increase a relative density therein and/or expanding the cells in another region to decrease a relative density therein). In another aspect, the method can include changing the flow rate (e.g., the mass flow rate) of feedstock material relative to the translation speed of the print head of the additive manufacturing device (e.g., a "3D printer"). These two aspects can be combined to produce a graded cellular structure having non-uniform cell distribution, geometry, and wall thickness to enable an unprecedented range of structural and transport properties to be achieved using only one base material (e.g., feedstock material).

In some embodiments, the feedstock material used to produce such a cellular structure (e.g., an "article of manufacture") comprises one or more of acrylonitrile butadiene styrene (ABS), poly(lactic acid) (PLA), and other thermoplastics, epoxies, elastomers, reactive polymer systems (e.g., polyurethane, polyurea), preceramic polymer resins, ceramics, metals, fiber composites, bio-materials, gels, conductive inks, and battery materials.

Such methods can create graded cellular structures, examples of which are schematically illustrated in FIGS. 3A-3C. The method starts, in some aspects, with defining a domain 100 (e.g., the outer boundary that defines the shape of the current layer that is being printed) that is filled with a uniform cellular "infill pattern" that would result from a typical slicing operation in the normal process flow of the material extrusion AM process. Next, a function, which can include a shift function (see, e.g., 102, FIG. 3B) and/or a thickness function, is applied in one or more directions (e.g., height, width, and/or depth) within the domain 100. Where the function applied comprises a shift function 102, the shift function 102 can have a positive, negative, or zero value within the domain 100, but must have a zero value at every location on the boundary 104, inasmuch as the perimeter region of the domain 100 for each layer is statically fixed in space according to the shape of the structure ultimately being formed. In the example shown in FIGS. 3A and 3C, the boundary 104 is a lateral boundary defining the width of structure being formed at this layer. The value of the shift function 102 at any location within the domain corresponds to the spatial shift that a portion of the material (e.g., a cell 106 or a node 108) experiences at that location. The spatial shift value is added to the nominal x- and/or y-coordinate values for the respective cell 106 or node 108, as appropriate, depending on the direction(s) within the domain 100 in which the shift function 102 is applied. The application of this spatial shift value, which is determined by the shift function 102, creates a modified cellular structure in which the cells 106 and nodes 108 defining the vertices of the cells are shifted from the nominal, or uniform, distribution in FIG. 3A into the graded cellular structure shown in FIG. 3C. This graded cellular structure, generally designated 110, can be subsequently transmitted to the AM device (e.g., a 3D printer device) to create the specified layer of the domain 100. While the example domains presented herein are of a rectangular shape, those having skill in the art will recognize that shift functions 102 may exist for any domain shape, including other geometric shapes and amorphously shaped regions.

Figure 4A:
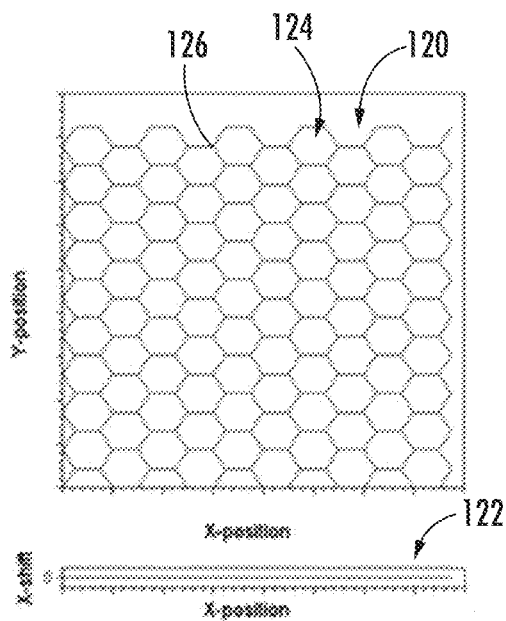
FIGS. 4A-4C are schematic illustrations of several respective shift functions to produce a graded cell distribution across a width of a cellular structure.
Figure 4B:
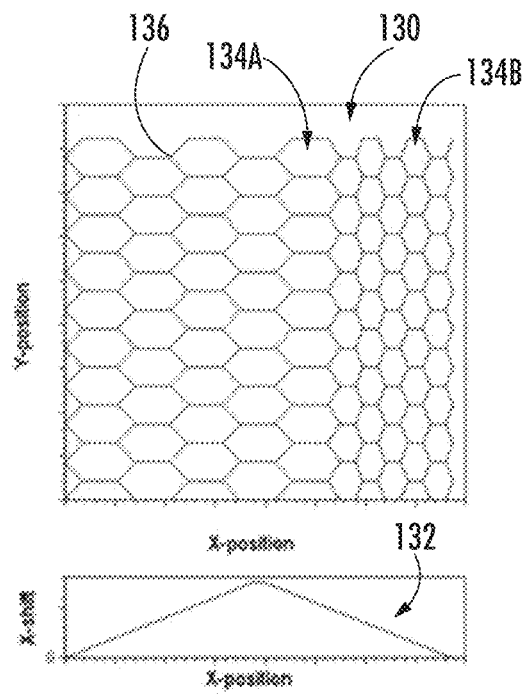
Figure 4C:
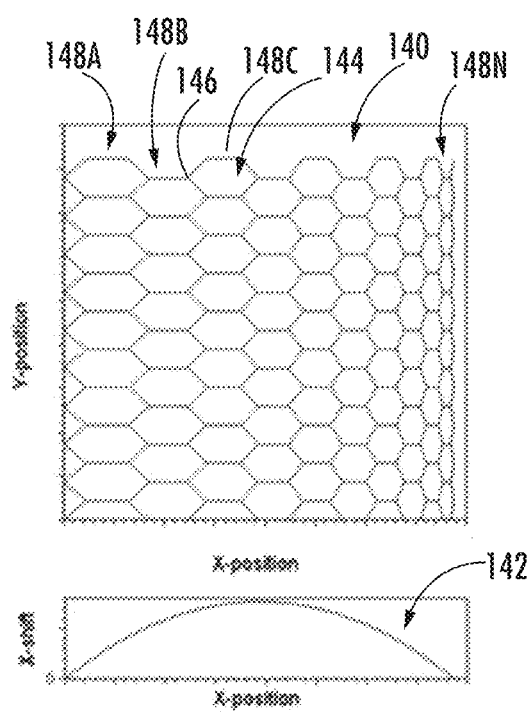

Examples of different shift functions for a rectangular domain are shown in FIGS. 4A-4C. In FIG. 4A, the shift function, generally designated 122 is a straight line at a zero value, meaning that the position of the cells, generally designated 124, and nodes, generally designated 126, defining the cellular structure, generally designated 120, are all shifted by a value of zero, resulting in the uniform distribution of hexagonal cells 124 and nodes 126 within the domain (e.g., the individual layer being created) remaining uniform after application of the shift function. FIG. 4B shows the application of a piece-wise (e.g., linear) shift function, generally designated 132, that results, at least in this example embodiment, in a dual-region arrangement of cells, generally designated 134A, 134B, with a first region having a first subarray of cells 134A with a different relative density, cellular distribution, and/or cellular geometry from a second subarray of cells 134B in a second region. Because the first (left) region of cells 134A is shifted to the right, the shift in the x-direction of each cell in the domain increases, relative to a uniform distribution, as shown in FIG. 4A, from left to right. This shift of the cells 134A begins to decrease at the midpoint of the domain and decreases to zero at the right boundary of the domain. FIG. 4C shows the application of a continuously variable, nonlinear (e.g., quadratic) shift function, generally designated 142, which results in each subsequent column of cells, generally designated 148A, 148B, 148C, . . . 148N, comprising a different geometry (e.g., size and/or shape) from the adjacent columns of cells. For example, the width of the first column of cells 148A is different from the second column of cells 148B, which in turn has a different width from the third column of cells 148C. This continues across the entire width of the domain.

In some embodiments, the shift function can be, for example, a sinusoidal shift function, an exponential shift function, a quadratic shift function, a piece-wise linear shift function, or any combination thereof. Those having ordinary skill in the art will understand that a plurality of different shift functions can be applied to different regions and/or in different directions of the domain without deviating from the scope of this instant disclosure. Furthermore, shift functions can be applied in one or more directions of the domain and each shift function can be of a different or same type in each direction. For example, a sinusoidal shift function can be applied in the x-direction (e.g., in the width direction), a piece-wise shift function can be applied in the y-direction (e.g., in the length direction), and a quadratic shift function can be applied in the z-direction (e.g., in the depth, or thickness, direction). In embodiments having a shift function applied in the z-direction, the position of the nodes in each dispensed layer is shifted to create the resultant cellular gradient across the thickness of the resultant structure.

In embodiments where a thickness function is applied over the cellular structure within the domain of the layer being dispensed, such thickness functions can vary spatially within the domain and range between and including values both above and/or below unity (e.g., 1) within any suitable range; in some embodiments, it may be advantageous for the values for the thickness function to range from approximately 0.5 to 2, although specific bounds for thickness functions may be outside of this range, depending on the feedstock material and/or the capabilities and type of AM device (e.g., a 3D printer device). By applying such a thickness function, a speed of the nozzle of an AM device (e.g., a 3D printer device) may be varied as the feedstock material is dispensed to produce walls having variable thickness values. In some known embodiments, the extrusion factor or the print speed is multiplied by the value of the thickness function, so that the flow rate of feedstock material is varied systematically relative to the translation speed of the print head, which can be variable or a fixed value, resulting in the deposition of thicker or thinner cell walls at one or a plurality of locations throughout domain. An example of this approach is shown in FIGS. 36A-36C.

Figure 36A:
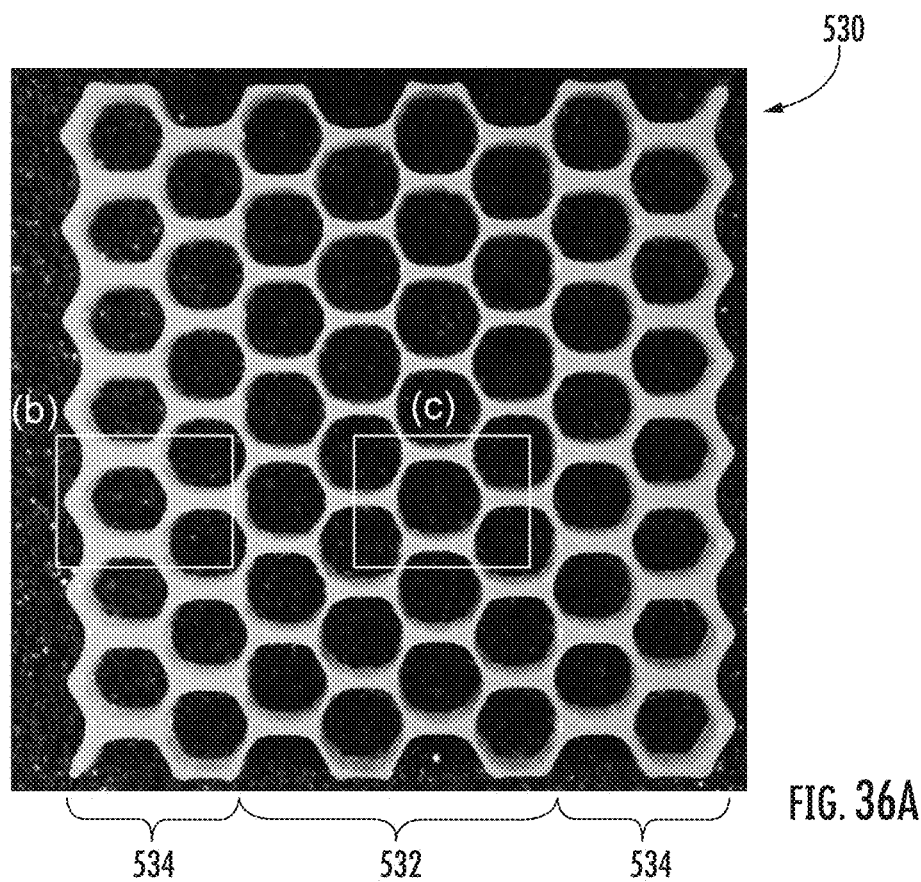
FIGS. 36A-36C are photographs of an example embodiment of a cellular structure with a thickness function applied to generate a plurality of walls of different thicknesses.
Figure 36B:
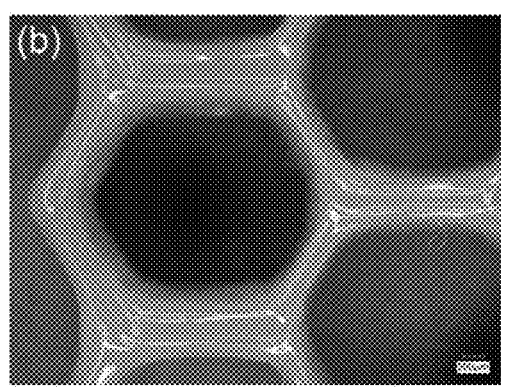
Figure 36C:
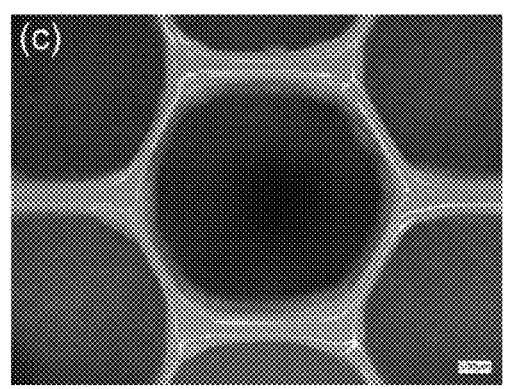

In FIGS. 36A-36C, an example embodiment of a single layer of a cellular structure dispensed via an additive manufacturing technique is shown. As shown in FIG. 36A, a nonlinear thickness function is applied to produce a thickness gradient for the walls of each column of cells arranged across the width of the layer of the cellular structure, generally designated 530. In this embodiment, the thickness gradient is of a type that produces thinner walls in a central region 532 of the layer of the cellular structure 530 than in the outer regions 534 of the layer of the cellular structure 530, with the cell wall thickness tapering (e.g., becoming progressively thinner) gradually at each progressively inner adjacent column of cells. As can be seen in FIGS. 36B and 36C, which are close-up views of the cellular structure 530 of FIG. 36A, the walls 536A of the cells in the outer region 534 are thicker than the walls 536B of the cells in the central region 532. An inverse thickness function to that shown in FIGS. 36A-36C is also contemplated, resulting in the walls of the cells in the center region being thicker than the walls of the cells in the outer regions. In some embodiments, the thickness function can be applied in multiple directions across the layer of the cellular structure. In some embodiments, the thickness function can be, for example, a piecewise linear thickness function (e.g., a step function), a sinusoidal thickness function, an exponential thickness function, a quadratic thickness function, or any suitable combination thereof. As discussed hereinabove regarding the shift functions, different thickness shift functions can be applied in each direction of the cellular structure. Such thickness functions as are disclosed herein can be combined with any of the shift functions discussed herein, to produce a wall thickness gradient and a cellular arrangement gradient in one or more directions and/or in one or more layers of a cellular structure.

In embodiments where a shift value is applied, such functions can be applied in any direction (e.g., x, y, z, radial, etc.). Any combination (e.g., superposition) of shift functions can be employed to create virtually any imaginable gradient scheme(s) within the domain. Examples of basic sinusoidal shift functions include:

$$\Delta x(x, y) = A_x \sin\left(\frac{2\pi x}{a}\right) \quad (1)$$

$$\Delta y(x, y) = A_y \sin\left(\frac{2\pi y}{b}\right) \quad (2)$$

In these functions, A is the amplitude of the gradient (e.g., determines a degree of the non-linearity) in the direction indicated by the subscript (e.g., x or y), a is the domain length in the x-direction, x is the x-position of a cell being shifted, b is the domain length in the y-direction, and y is the y-position of a cell being shifted. A printed honeycomb structure with this type of gradient is shown in FIGS. 6A and 6B. Similar shift functions having different shift amplitudes for the graded cellular structure of FIGS. 6A and 6B can, for example, be seen in FIGS. 5A-5C, providing an illustration of the effect created by varying the parameters of equations (1) and (2), as discussed herein.

Figures 5A, 5B, 5C:
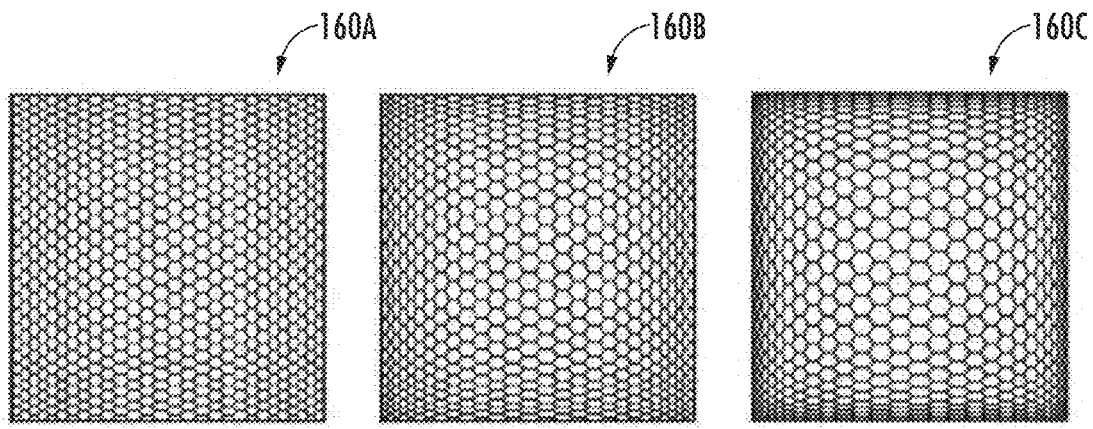
FIGS. 5A-5I are schematic illustrations showing example cellular gradients prepared by applying shift functions of various patterns and shift amplitudes to produce a non-uniform distribution of cells across a cellular structure in more than one direction.
Figure 6A:
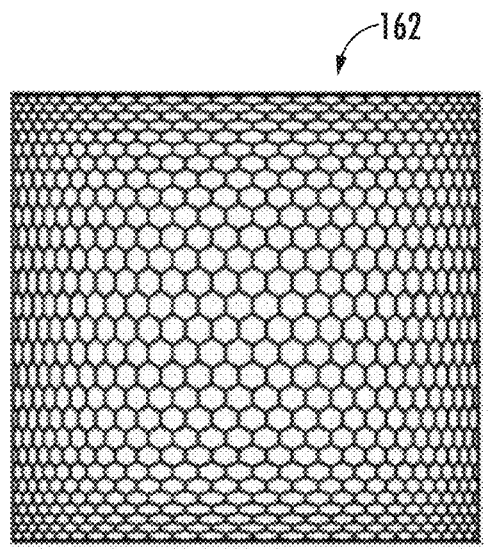
FIGS. 6A, 7A, and 8A show schematic arrangements of cellular distributions achieved by the application of shift functions.
Figure 6B:
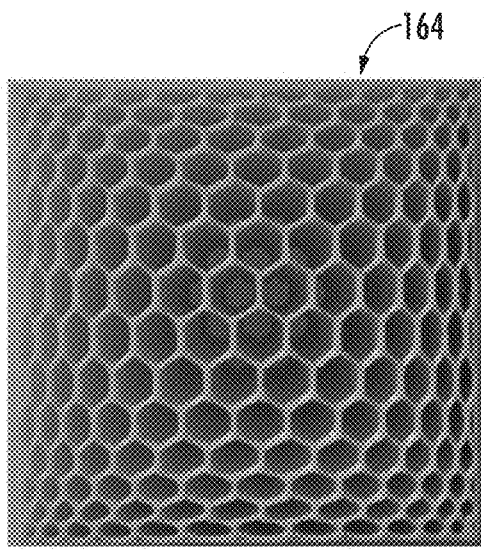
FIGS. 6B, 7B, and 8B are images of the arrangements from FIGS. 6A, 7A, and 8A, respectively, produced as an article of manufacture using an additive manufacturing technique.

In FIGS. 5A-5C, the shift functions are shown being applied identically in the x- and y-directions, such that the cellular gradient is mirrored in the x- and y-directions. In FIG. 5A, the cellular structure, generally designated 160A, has a low amplitude shift function applied, resulting in a non-uniform cellular gradient in which the relative cellular geometries and densities between the boundary regions and the central region are different, but not drastically so. In FIG. 5B, the cellular structure, generally designated 160B, has an intermediate amplitude shift function applied, resulting in a non-uniform cellular gradient in which the relative cellular geometries and densities between the boundary regions and the central region are increased and decreased, respectively, relative to that shown in FIG. 5A, with the cells in the central region being comparatively larger than the cells at the boundary regions in FIG. 5B and the cellular density ratio being comparatively greater between the boundary regions and the central region of cellular structure 160B in FIG. 5B than in the cellular structure 160A shown in FIG. 5A. In FIG. 5C, the cellular structure, generally designated 160C, has a high amplitude shift function applied, resulting in a non-uniform cellular gradient in which the relative cellular geometries and densities between the boundary regions and the central region are increased relative to that shown in FIGS. 5A and 5B, with the cells in the central region being comparatively larger than the cells at the boundary regions in FIG. 5C being comparatively greater than those shown in the cellular structures 160A, 160B shown in FIGS. 5A and 5B, respectively.

Power law shift functions can be defined as follows:

$$\Delta x(x, y) = A_x \left[1 - \left(\frac{2|x - x_0|}{a}\right)^n\right] \quad (3)$$

$$\Delta y(x, y) = A_y \left[1 - \left(\frac{2|y - y_0|}{b}\right)^n\right] \quad (4)$$

Figure 7A:
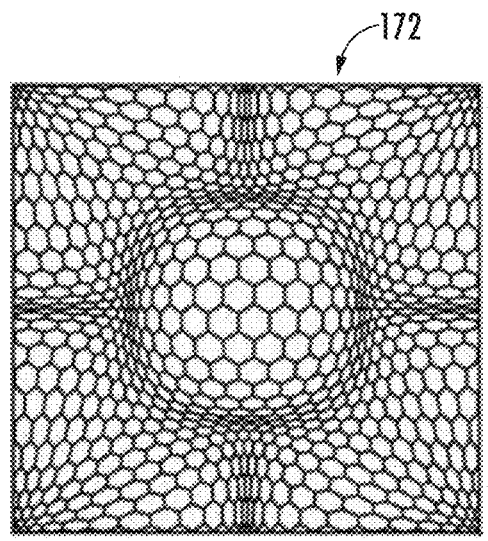
Figure 7B:
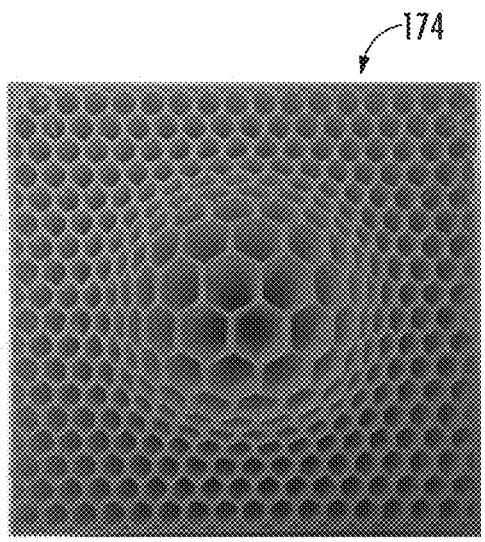

In these functions, $x_o$ and $y_o$ are the x- and y-coordinates of the geometric center of the domain, and n is an exponent that dictates the shape (e.g., the "power") of the gradient function. The shape of the shift function is bilinear when n=1 and quadratic when n=2. Higher values of n are contemplated as well. Examples of gradients resulting from these functions are shown in FIGS. 7A and 7B. The effect in cellular gradients within the domain from varying the parameters of equations (3) and (4) can be seen, for example, in FIGS. 5D-5F.

Figures 5D, 5E, 5F:
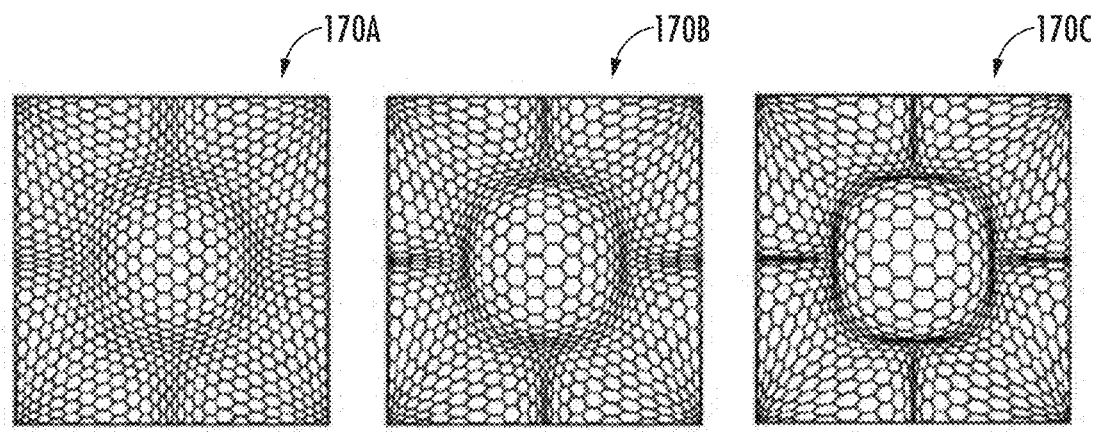

In FIGS. 5D-5F, the shift functions are shown being applied identically in the x- and y-directions, such that the cellular gradient is mirrored in the x- and y-directions. In FIG. 5D, the cellular structure, generally designated 170A, has a low amplitude shift function applied, resulting in a non-uniform cellular gradient. In the embodiments shown in FIGS. 5D-5F, the cells are largest and have the lowest density in the central region and also in the quadrants adjacent the corners (e.g., in regions adjacent the corners of the square domains shown), with comparatively smaller cells and higher cellular densities being located in a ring about the central region and extending radially out therefrom at angles that are at substantially 90°, 180°, 270°, and 360°. By changing boundaries from which the shift function is applied, these radially extending regions of high cellular density can be radially shifted, both relative to each other and relative to the perimeter of the domain. In FIG. 5E, the cellular structure, generally designated 170B, has an intermediate amplitude shift function applied, resulting in a non-uniform cellular gradient in which the relative cellular geometries and densities between the central/quadrant regions and the ring/radial regions are increased and decreased, respectively, relative to the cellular arrangement shown in FIG. 5D, with the cells in the central/quadrant regions in FIG. 5E being comparatively larger and having a comparatively lower cellular density than the cells in the ring/radial regions in FIG. 5D. In FIG. 5F, the cellular structure, generally designated 170C, has a high amplitude shift function applied, resulting in a cellular gradient in which the non-uniformity of the relative cellular geometries and densities between the central/quadrant regions and the ring/radial regions are increased and decreased, respectively, relative to the cellular arrangements shown in FIGS. 5D and 5E, with the cells in the central/quadrant regions being comparatively larger than the cells at the ring/radial regions in FIG. 5F being comparatively greater than those shown in the cellular structures 170A, 170B shown in FIGS. 5D and 5E, respectively.

Shift functions can also be include those with exponential shape and radial spatial variation, for example $$\Delta x(x, y) = A_x \sin\left(\frac{2\pi x}{a}\right) \exp\left(\frac{-(x^2 + y^2)^{1/2}}{k_x}\right) \quad (5)$$

$$\Delta y(x, y) = A_y \sin\left(\frac{2\pi y}{b}\right) \exp\left(\frac{-(x^2 + y^2)^{1/2}}{k_y}\right) \quad (6)$$

Figure 8A:
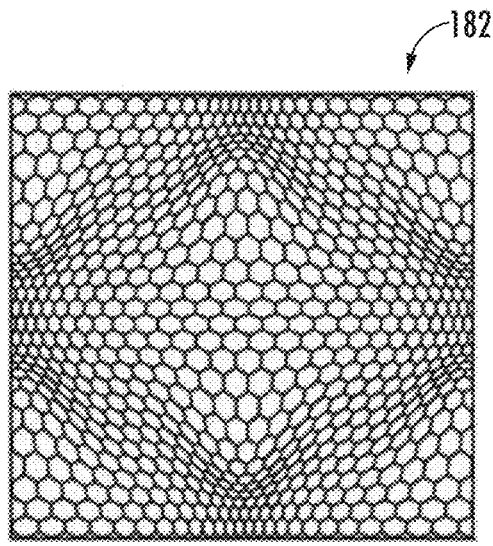
Figure 8B:
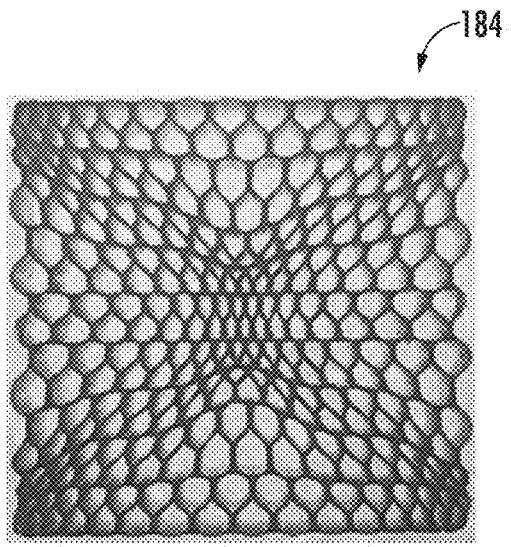

In these functions, k is the x- or y-coordinate at which the exponential equals 1/e. This value will typically be some fraction of the domain length (e.g., k=b/5). An example of a graded honeycomb structure printed using this type of shift function is shown in FIGS. 8A and 8B. The varying "intensities" of the shift created by varying the parameters of equations (5) and (6) as discussed herein are shown in the example embodiments shown in FIGS. 5G-5I.

Figures 5G, 5H, 5I:
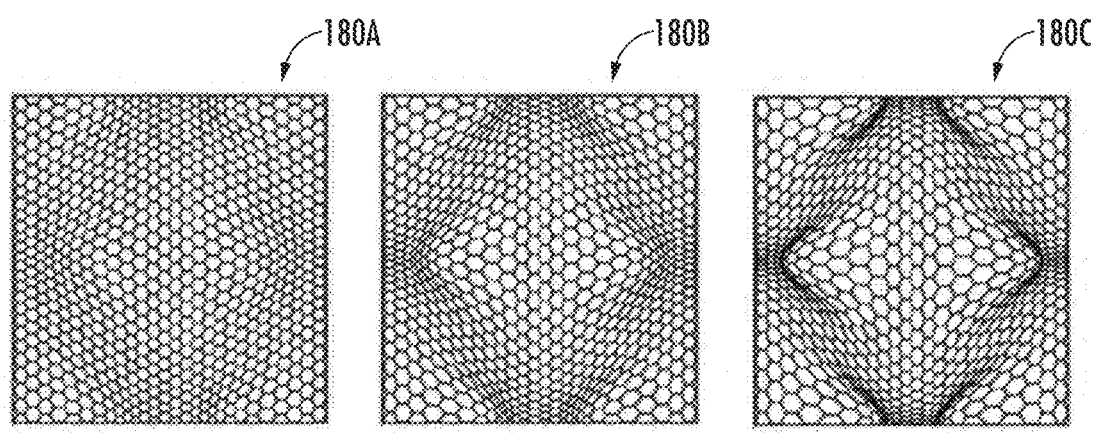

In FIGS. 5G-5I, the shift functions are shown being applied identically in the x- and y-directions, such that the cellular gradient is mirrored in the x- and y-directions. In FIG. 5G, the cellular structure, generally designated 180A, has a low amplitude shift function applied, resulting in a non-uniform cellular gradient. In the embodiments shown in FIGS. 5G-5I, the cells are largest and have the lowest density in the central region and also in the quadrants adjacent the corners (e.g., in regions adjacent the corners of the square domains shown), with comparatively smaller cells and higher cellular densities being located in a quasi-circular or diamond-shaped region defined about the central region and extending circumferentially between the central region and the quadrant regions.

In the embodiments shown in FIGS. 5G-5I, the quasi-circular region comprises a generally V-shaped region of increased cellular density extending from each edge of the boundary of the domain, the resultant shape of the four V-shaped regions appearing substantially circular or diamond shaped, depending on the intensity of this shift function being applied. For example, in FIG. 5G, the V-shaped regions are not distinctly visible, resulting in the quasi-circular shape circumferentially surrounding the central region. However, in FIGS. 5H and 5I, the V-shaped regions are increasingly visibly distinct, resulting in the increased cellular density region having an increasingly diamond shaped appearance. Regardless of the terminology used, these increased cellular density regions extend to the boundaries of the domain, thereby segregating the quadrant region at each corner from an adjacent quadrant region, as is shown most clearly in FIG. 5I, but which is also present in FIGS. 5G and 5H. By changing boundaries from which the shift function is applied, the increased cellular density regions can be radially shifted (e.g., rotated) relative to the perimeter of the domain.

In FIG. 5H, the cellular structure, generally designated 180B, has an intermediate amplitude shift function applied, resulting in a non-uniform cellular gradient in which the relative cellular geometries and densities between the central/quadrant regions and the increased cellular density region(s) are increased and decreased, respectively, relative to the cellular arrangement shown in FIG. 5G, with the cells in the central/quadrant regions in FIG. 5H being comparatively larger and having a comparatively lower cellular density than the cells in the increased cellular density region(s) in FIG. 5G. In FIG. 5I, the cellular structure, generally designated 180C, has a high amplitude shift function applied, resulting in a cellular gradient in which the non-uniformity of the relative cellular geometries and densities between the central/quadrant regions and the increased cellular density region(s) are increased and decreased, respectively, relative to the cellular arrangements shown in FIGS. 5G and 5H, with the cells in the central/quadrant regions being comparatively larger than the cells at the increased cellular density region(s) in FIG. 5I being comparatively greater than those shown in the cellular structures 180A, 180B shown in FIGS. 5G and 5H, respectively.

Printed and schematic examples of complex gradient schemes are shown in FIGS. 6A and 6B, 7A and 7B, and 8A and 8B. As shown in FIGS. 6A and 6B, the schematic cellular arrangement, generally designated 162, and the printed cellular arrangement, generally designated 164, are most similar to cellular structure 160B shown in FIG. 5B. As shown in FIGS. 7A and 7B, the schematic cellular arrangement, generally designated 172, and the printed cellular arrangement, generally designated 174, are most similar to cellular structure 170B shown in FIG. 5E. As shown in FIG. 8A, the schematic cellular arrangement, generally designated 182 is most similar to cellular structure 180B shown in FIG. 5H. FIG. 8B is an example of a cellular structure, generally designated 184, generated by applying an inverted shift function, as embodied by equations (5) and (6), such that the resulting regions of increased cellular density are located in the central region and in the quadrant regions adjacent to the corners of the domain, thereby resulting in the overall region of increased cellular density having a shape generally in the shape of an "X". Cellular structure 184 thus has regions of lower cellular density and larger cellular geometries along the boundaries of the domain, apart from the corners of the domain and extending inwardly towards the central region.

It is important to note that the modified (e.g., non-uniformly distributed) point lists generated by the algorithm(s) described above can be transmitted to a 3D printer to print a physical specimen, such as is shown in FIGS. 6B, 7B, and 8B, and also transmitted to finite element analysis (FEA) software using a custom conversion program, such as by using Python language and Abaqus software, so that the exact same graded cellular structure can be printed and numerically simulated simultaneously.

Figure 9A:
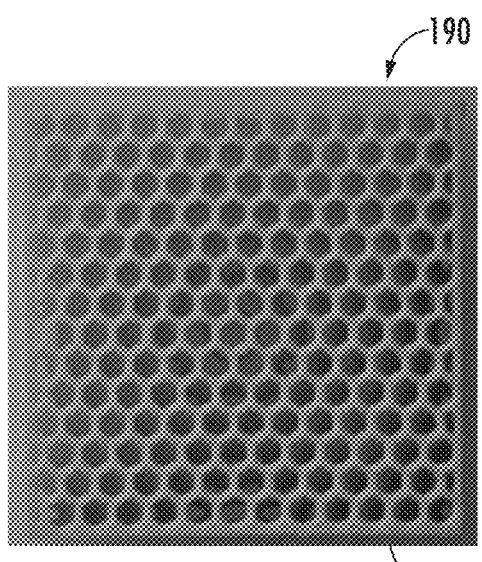
FIGS. 9A and 9B are photographs showing respective opposing sides of a three-dimensional (3D) cellular structure with a variable shift function being applied to the front and rear sides, such that the distribution of cells differs across a thickness of the cellular structure (e.g., cells have a variable cross-section across the thickness of the cellular structure).
Figure 9B:
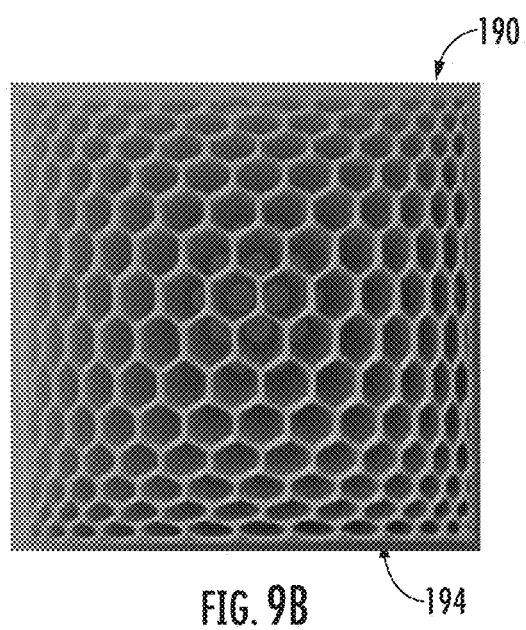

FIGS. 9A and 9B illustrate an embodiment of a cellular structure, generally designated 190, which has a non-negligible thickness that is created by the sequential deposition of a plurality of subsequent layers on top of each other. Each of the plurality of subsequent layers can have a plurality of cells that are arranged according to respective predetermined gradients (e.g., created by corresponding shift functions). A rear first face, generally designated 192, is shown in FIG. 9A; rear first face 192 has a uniform distribution of cells across the height and width of the domain. A front second face, generally designated 194, is shown in FIG. 9B; front second face 194 has a non-uniform distribution of cells across the height and width of the domain. The size (e.g., the area) of the domain in each of FIGS. 9A and 9B are substantially identical, such that cellular structure 190 has a volumetric shape of a cuboid or rectangular prism, but the size of the domain can be different for one or more (or all) of the plurality of layers comprising the cellular structure, such that the size/shape of the domain may taper, vary, and/or have discontinuities (e.g., large changes in size) through the thickness thereof (e.g., in the direction between rear first face 192 and front second face 194). The cellular arrangement at the front second face 194 shown in FIG. 9B has been modified with a shift function that modifies the arrangement of cells across the width and height of the cellular structure 190 at the front second face 194.

In the embodiment shown, the same shift function is applied in the height (y) and the width (x) directions, but different shift functions can be applied in different directions to create non-uniformity of cellular distribution in multiple directions. Furthermore, the domain over which the shift function is to be applied can be applied over only a portion of the total cellular arrangement, such that the boundary of the domain is not co-located with the edge of the cellular arrangement; also, the domain can be rotated and/or positionally shifted (e.g., not centered) relative to the boundaries of the cellular arrangement being altered. Additionally, while in the example embodiment in FIGS. 9A and 9B the amplitude of the shift function is constantly increased for each subsequent layer being deposited to create a substantially continuous increase/decrease in cross-sectional area for each respective cell from the rear face to the front face, in some embodiments, it may be advantageous to create cells with a variable cross-section through a thickness of the cellular structure. For example, the front and rear faces of the cellular arrangement may have identical cellular distribution patterns (e.g., either uniform or non-uniform), but the shift functions applied to the intermediate layers defining the thickness of the cellular structure (e.g., 190) can vary from that of the front and rear faces, such that an internal cross-section of each cell is different from the cross-section thereof at the front and rear faces of the cellular structure. Additionally, cellular discontinuities (e.g., steps, or breaks, in cellular cross-sections) can be introduced between adjacent layers by applying a different shift function and/or shift amplitude to adjacent layers, such that at least some of the walls in one layer are not in contact with at least a portion of another adjacent layer.

The instant methods are particularly advantageous for use with material extrusion AM devices because they utilize cellular infill patterns that are already part of a standard process flow in generating such cellular structures. These infill patterns have been devised for the material extrusion AM method to fill space quickly and efficiently using walls comprised only of integer numbers of printed road widths, usually one or two. Furthermore, using these methods, the gradient is imposed separately from the computer-aided design (CAD) description of the each of the layers of the cellular structure, so that the gradient (e.g., the shift and/or thickness functions) does not need to be expressed in the CAD part. This enables a whole series of prototype components with different gradient schemes to be rapidly generated from the same CAD description of the part.

Figure 2A:
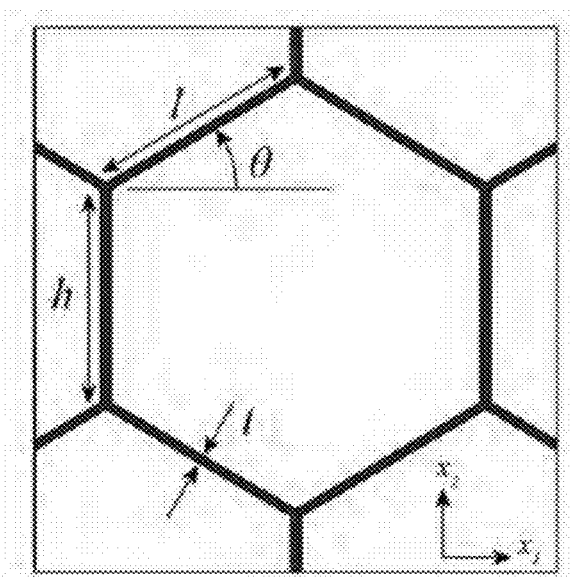
FIG. 2A is a diagrammatic geometric representation of a hexagonal cellular structure.
Figure 2B:
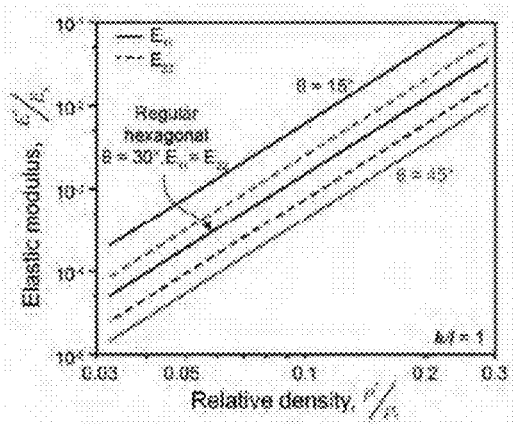
FIG. 2B is a graph of normalized elastic modulus vs. relative density for the hexagonal cellular structure illustrated in FIG. 2A.
Figure 2C:
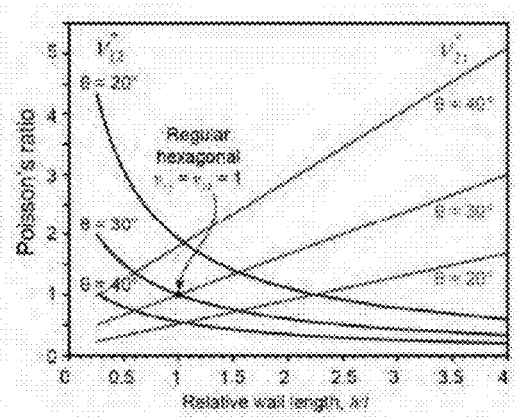
FIG. 2C is a graph of Poisson's ratio vs. relative wall length (h/l) for the hexagonal cellular structure illustrated in FIG. 2A.

The gradients described herein are used to alter the shape and relative density of cells within an existing cellular structure, allowing a tunable change from a uniform distribution of cells to introduce some level of non-uniformity into the arrangement of cells of the cellular structure. Based on the classical mechanics description of the elastic properties of cellular materials summarized in FIGS. 2A-2C, cellular gradients can change the stiffness and/or strength of local regions of the cellular structure, the anisotropy of the strength and stiffness of local regions of the cellular structure, and the effective Poisson's ratio of local regions in the structure, without necessarily altering the entirety of the cellular structure. The original shape and connectivity of the cells (e.g., in a shape of a hexagon, a triangle, a rectangle, a square, a kagome pattern, an octagon, a parallelogram, and/or an "hourglass") within each layer, and the choice of gradient scheme will dictate which property is most strongly affected. Regions that become less dense will, in general, become less stiff, while gradients that orient walls to be more aligned with a particular direction will result in a stiffer response in that direction and a more compliant response transverse to that direction.

FIGS. 10A-25C present simulation results analyzing the effect of such cellular gradients in a quantitative manner, including executing a series of elastic finite element analysis (FEA) calculations for a range of cellular shapes and initial relative densities for two example gradient schemes—the piece-wise (e.g., linear) and nonlinear quadratic shift functions described and shown in FIGS. 4B and 4C—and a range of gradient amplitudes from zero to 0.2. The gradient amplitude is a function of the maximum shift of any cell within the domain, expressed as a percentage of the entire dimension of the domain in the direction of shift; as such, a gradient amplitude of 0.2 means that the maximum positional shift of any cell within the domain is no larger than 20% of the coordinating dimension of the domain. To ensure no other variables were introduced to influence the results of the analysis for these simulations, the domain size was held constant throughout and the initial relative density was varied by changing the thickness of the cell walls to achieve a static density value. The fully elastic calculations were run using Abaqus/Standard with no material failure and no imperfections. The bottom edge of the domain was constrained in the y-direction and a displacement in the negative y-direction, indicated by the force "F" and the plurality of downward arrows, was applied at the top vertical edge of the domain. The reaction force was recorded and used to calculate the engineering stiffness and strain, as well as the elastic modulus. The normalized elastic modulus values were then plotted as a function of gradient amplitude and relative density, as shown in FIGS. 10C, 11C, et seq. The effects of each of the gradient types on cellular structure with different initial cell shapes are described further hereinbelow.

Figure 10A:
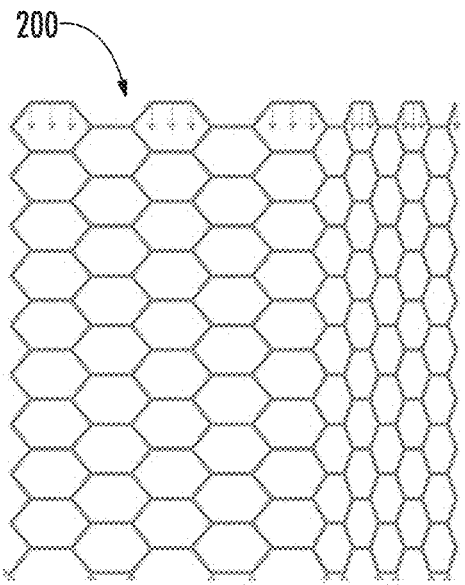
FIGS. 10A-10C are schematic illustrations showing a hexagonal cellular structure, which has a piece-wise linear shift function applied transverse to a loading direction, in an undeformed (FIG. 10A) state, a deformed state (FIG. 10B), and a plot (FIG. 10C) of the elastic modulus vs. relative density of the hexagonal cellular structure at several amplitudes of the shift function.
Figure 10B:
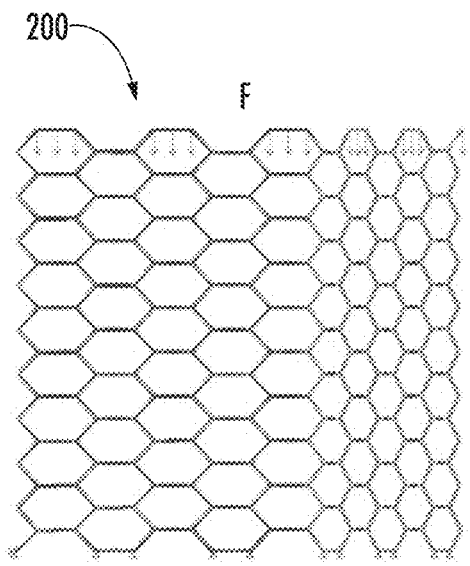
Figure 10C:
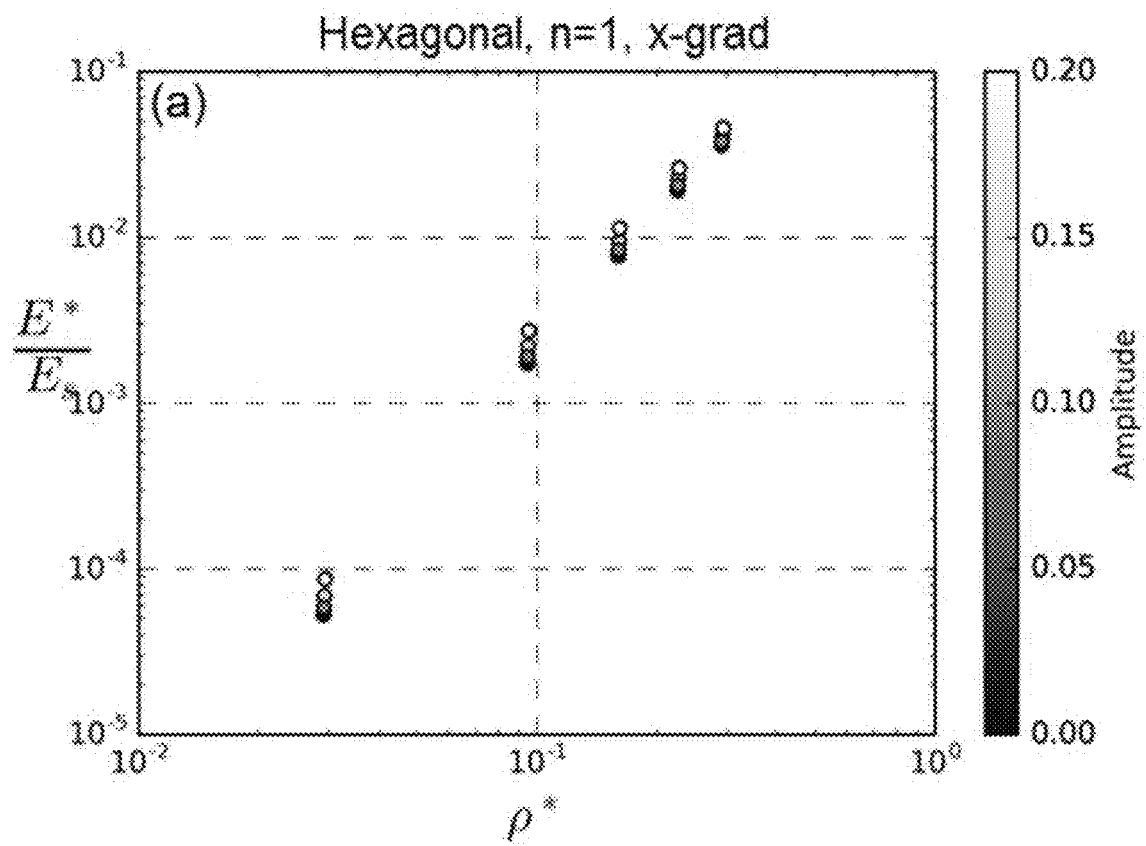

In FIGS. 10A-10C show the simulation results for an example embodiment of a hexagonal cellular structure, generally designated 200, with a piece-wise (e.g., linear) shift function applied in the x-direction (e.g., transverse to the direction of compressive force F, see FIG. 10B) such that the cellular structure 200 has a horizontally-oriented cellular gradient. FIG. 10A shows an undeformed (e.g., with no force applied) cellular structure 200 with a piece-wise shift function applied to form the cellular gradient shown. While the force vectors are shown by the orange arrows in FIG. 10A, the force F (see FIG. 10B) is not applied to the cellular structure 200 shown therein. FIG. 10B shows the deformation of the cellular structure 200 shown in FIG. 10A when a compressive force F is applied thereto, with the color gradients illustrating relative stress concentrations caused by the application of the compressive force F and the resultant deformation of the cellular structure 200. As shown in the plot of FIG. 10C, for piece-wise, or linear, shift functions applied transverse to the loading direction of the compressive force F, the graded cellular structure 200 becomes stiffer than a uniformly distributed cellular structure, which is shown by the black dots in the graph in FIG. 10C, which has a shift amplitude of zero. This increased stiffness characteristic is caused by the change in orientation of the cell walls at the denser end (e.g., the right side, as shown in FIGS. 10A and 10B) of the cellular structure 200, which are inclined relative to the direction of the force F in a uniform distribution, are aligned to a greater degree (e.g., are more vertically oriented) with the loading direction F as a result of the application of the shift function, thereby transitioning a portion (e.g., those on the right side) of cell walls from predominantly bending deformation to predominantly axial deformation. These walls forming the cells that experience the greatest amplitude of the shift function support a majority of the force F in the graded cellular structure 200, as visualized by the yellow, orange, and red colors shown, so the graded cellular structure 200 has a stiffer response than a uniformly distributed cellular structure that otherwise has the same relative density. This corresponding increase in stiffness of the cellular structure 200 caused by increasing the amplitude of the shift function is illustrated in FIG. 10C, where it is shown that the increase in amplitude, marked by the plots of different colors, causes an increase in the relative stiffness of the cellular structure 200 for amplitudes from 0 to 0.20.

Figure 11A:
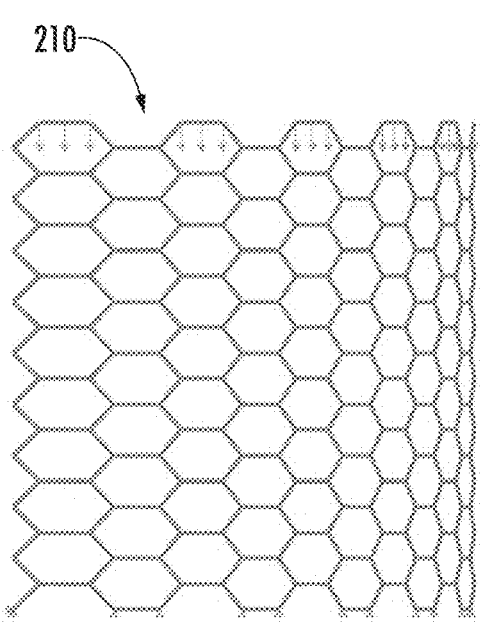
FIGS. 11A-11C show a hexagonal cellular structure, which has a nonlinearly-graded (e.g., quadratic-like) shift function applied transverse to a loading direction, in an undeformed state (FIG. 11A), a deformed state (FIG. 11B), and a plot (FIG. 11C) of the elastic modulus vs. relative density of the hexagonal cellular structure at several amplitudes of the shift function.
Figure 11B:
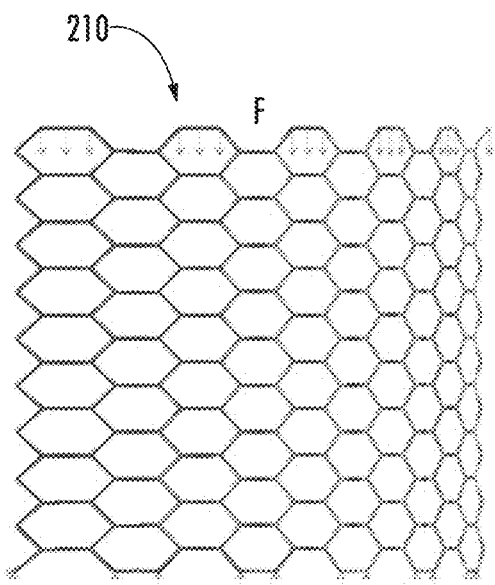
Figure 11C:
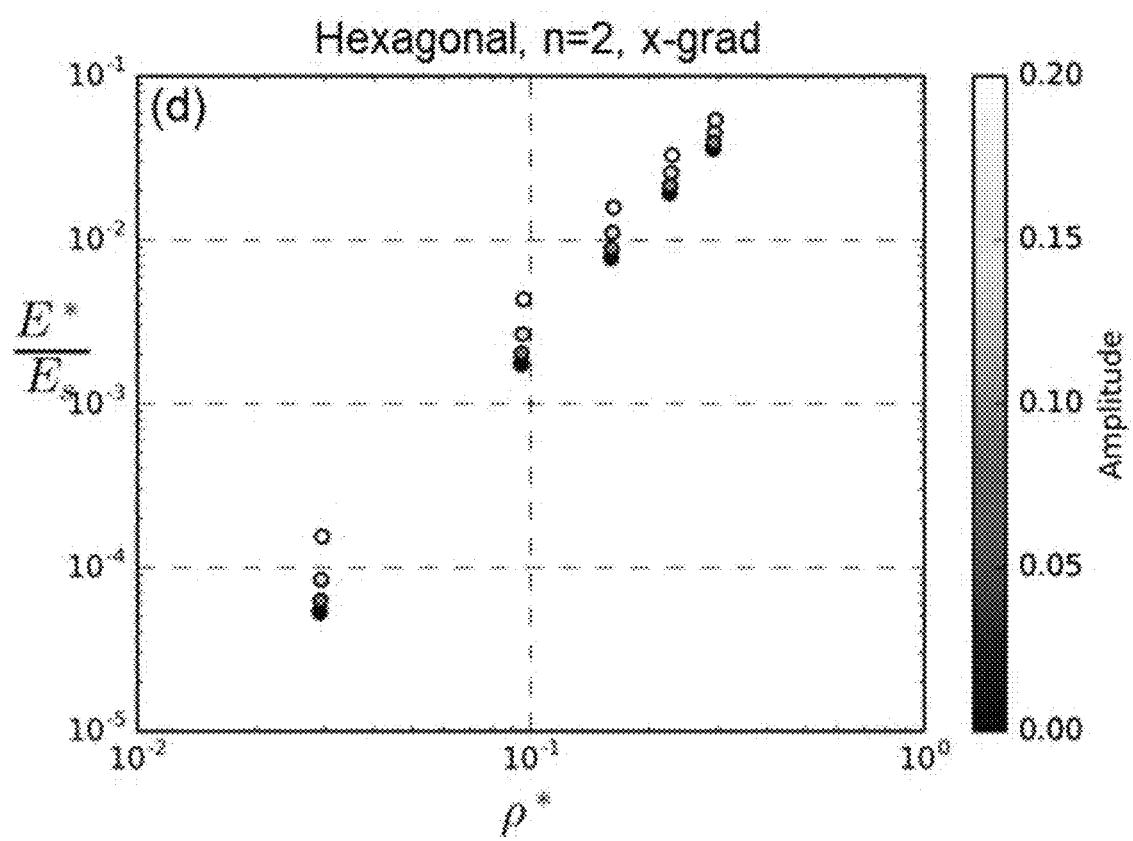

FIGS. 11A-11C show the simulation results for an example embodiment of a hexagonal cellular structure, generally designated 210, with a non-linear (e.g., quadratic) shift function applied in the x-direction (e.g., transverse to the direction of compressive force F, see FIG. 11B) such that the cellular structure 210 has a horizontally-oriented cellular gradient. FIG. 11A shows an undeformed (e.g., with no force applied) cellular structure 210 with a non-linear shift function applied to form the cellular gradient shown. While the force vectors are shown by the orange arrows in FIG. 11A, the force F (see FIG. 11B) is not applied to the cellular structure 210 shown therein. FIG. 11B shows the deformation of the cellular structure 210 shown in FIG. 11A when a compressive force F is applied thereto, with the color gradients illustrating relative stress concentrations caused by the application of the compressive force F and the resultant deformation of the cellular structure 210. As shown in the plot of FIG. 11C, for non-linear (e.g., quadratic) shift functions applied transverse to the loading direction of the compressive force F, the graded cellular structure 210 becomes stiffer than uniformly distributed cellular structure, which is shown by the black dots in the graph in FIG. 11C, which has a shift amplitude of zero. This increased stiffness characteristic is caused by the change in orientation of the cell walls at the denser end (e.g., the right side, as shown in FIGS. 11A and 11B) of the cellular structure 210, which are inclined relative to the direction of the force F in a uniform distribution, are aligned to a greater degree (e.g., are more vertically oriented) with the loading direction F as a result of the application of the shift function, thereby transitioning a portion (e.g., those on the right side) of cell walls from predominantly bending deformation to predominantly axial deformation. These walls forming the cells that experience the greatest amplitude of the shift function support a majority of the force F in the graded cellular structure 210, as visualized by the yellow, orange, and red colors shown, so that the graded cellular structure 210 has a stiffer response than a uniformly distributed cellular structure that otherwise has the same relative density. This corresponding increase in stiffness of the cellular structure 210 caused by increasing the amplitude of the shift function is illustrated in FIG. 11C, where it is shown that the increase in amplitude, marked by the plots of different colors, causes an increase in the relative stiffness of the cellular structure 210 for amplitudes from 0 to 0.20.

Figure 12A:
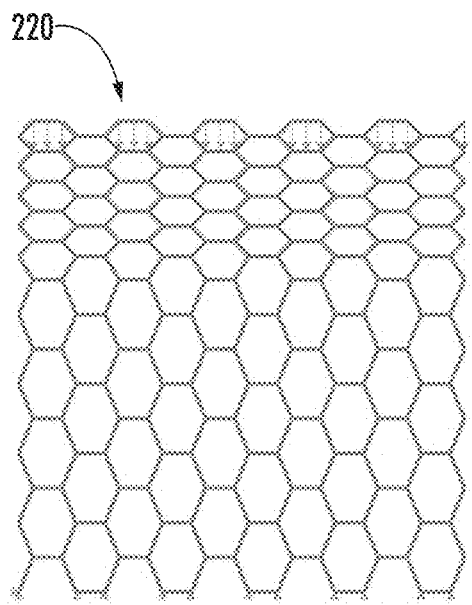
FIGS. 12A-12C show a hexagonal cellular structure, which has a piece-wise linear shift function applied parallel to a loading direction, in an undeformed state (FIG. 12A), a deformed state (FIG. 12B), and a plot (FIG. 12C) of the elastic modulus vs. relative density of the hexagonal cellular structure at several amplitudes of the shift function.
Figure 12B:
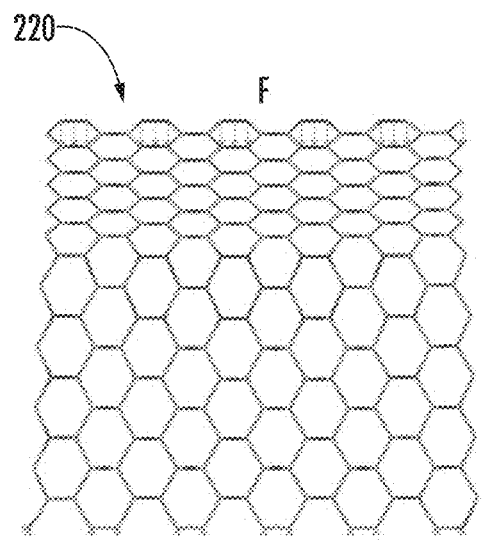
Figure 12C:
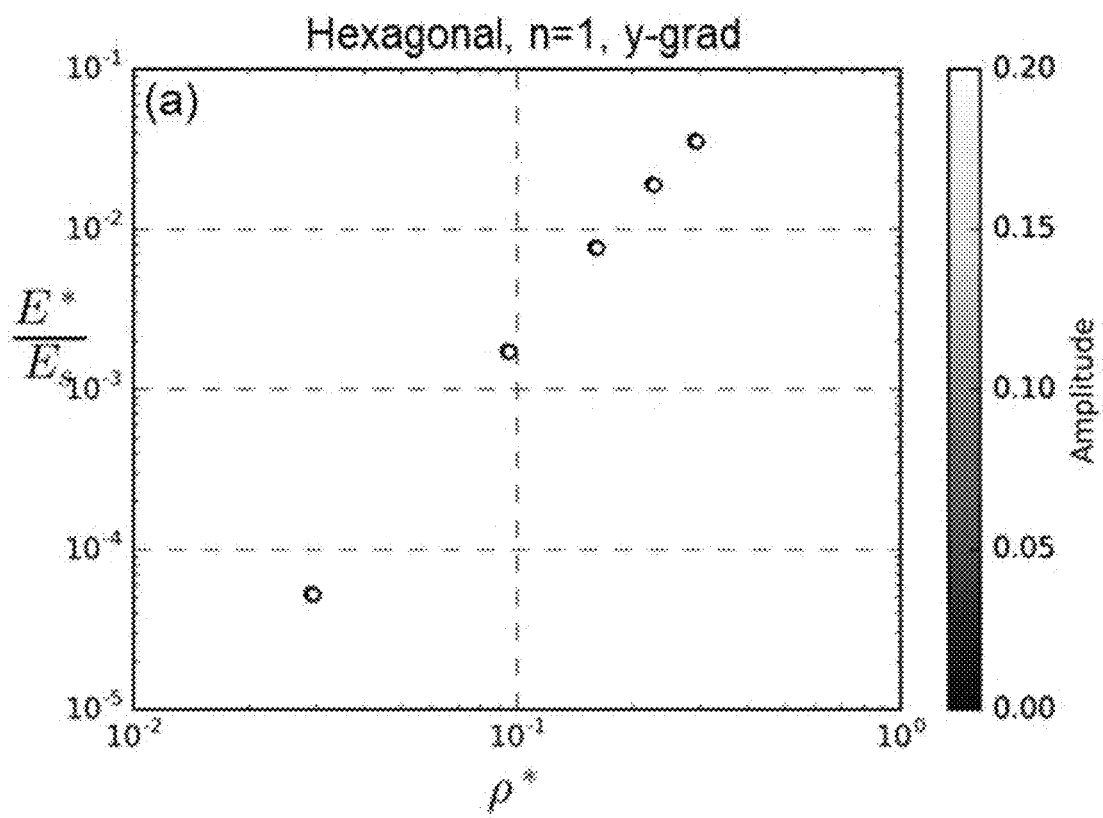

FIGS. 12A-12C show the simulation results for an example embodiment of a hexagonal cellular structure, generally designated 220, with a piece-wise (e.g., linear) shift function applied in the y-direction (e.g., parallel to the direction of compressive force F, see FIG. 12B) such that the cellular structure 220 has a vertically-oriented cellular gradient. FIG. 12A shows an undeformed (e.g., with no force applied) cellular structure 220 with a piece-wise shift function applied to form the cellular gradient shown. While the force vectors are shown by the orange arrows in FIG. 12A, the force F (see FIG. 12B) is not applied to the cellular structure 220 shown therein. FIG. 12B shows the deformation of the cellular structure 220 shown in FIG. 12A when a compressive force F is applied thereto, with the color gradients illustrating relative stress concentrations caused by the application of the compressive force F and the resultant deformation of the cellular structure 220. As shown in the plot of FIG. 12C, for piece-wise, or linear, shift functions applied parallel to the loading direction of the compressive force F, the elastic stiffness of the graded cellular structure 220 is unchanged compared to uniformly distributed cellular structure (e.g., those having a shift amplitude of zero); this is shown by each of the data points for the different amplitudes for the shift function applied being substantially a same value as those associated with other amplitude values, thereby producing a line with a same slope for each of the shift amplitudes applied. In the lower density regions (e.g., the bottom region) of the graded cellular structure 220, the inclined walls of each cell are more closely aligned with the direction of force F than they would be for an ungraded cellular structure, thereby counterbalancing the effect of the lower cellular density in that region. Conversely, in the regions that become denser (e.g., the upper region) due to the application of the shift function, the inclined walls are less aligned with (e.g., inclined at a greater angle relative to) the loading direction compared to an ungraded cellular structure, thereby counterbalancing the effect of the increased cell density in the same region. The net effect on the graded structure is that there is no effective change in elastic stiffness when the loading direction of compressive force F is aligned to be substantially parallel with the cellular gradient induced by applying the shift function. It is important to note that the post-yield and dynamic behavior will be substantially different for the graded cellular structure 220 compared to the ungraded (e.g., uniform) cellular structure, despite the fact that the elastic properties remain unchanged. This feature is one of the major strengths of this method for creating graded cellular structures.

Figure 13A:
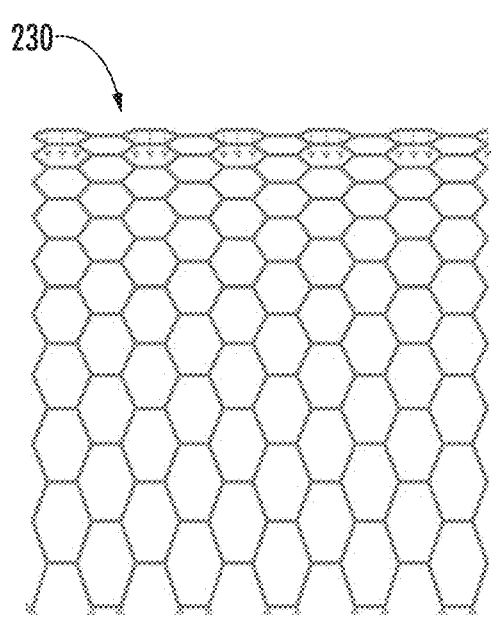
FIGS. 13A-13C show a hexagonal cellular structure, which has a nonlinearly-graded (e.g., quadratic) shift function applied parallel to a loading direction, in an undeformed state (FIG. 13A), a deformed state (FIG. 13B), and a plot (FIG. 13C) of the elastic modulus vs. relative density of the hexagonal cellular structure at several amplitudes of the shift function.
Figure 13B:
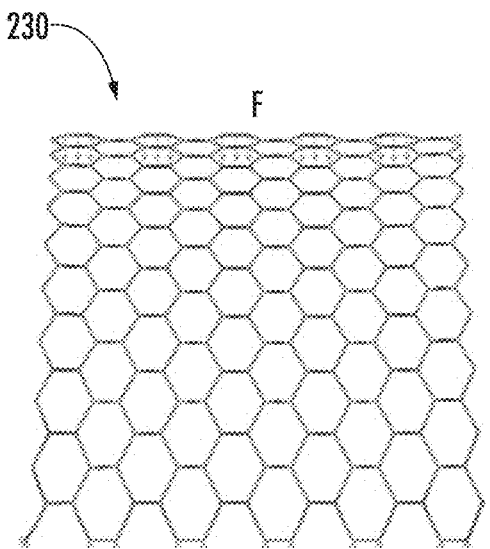
Figure 13C:
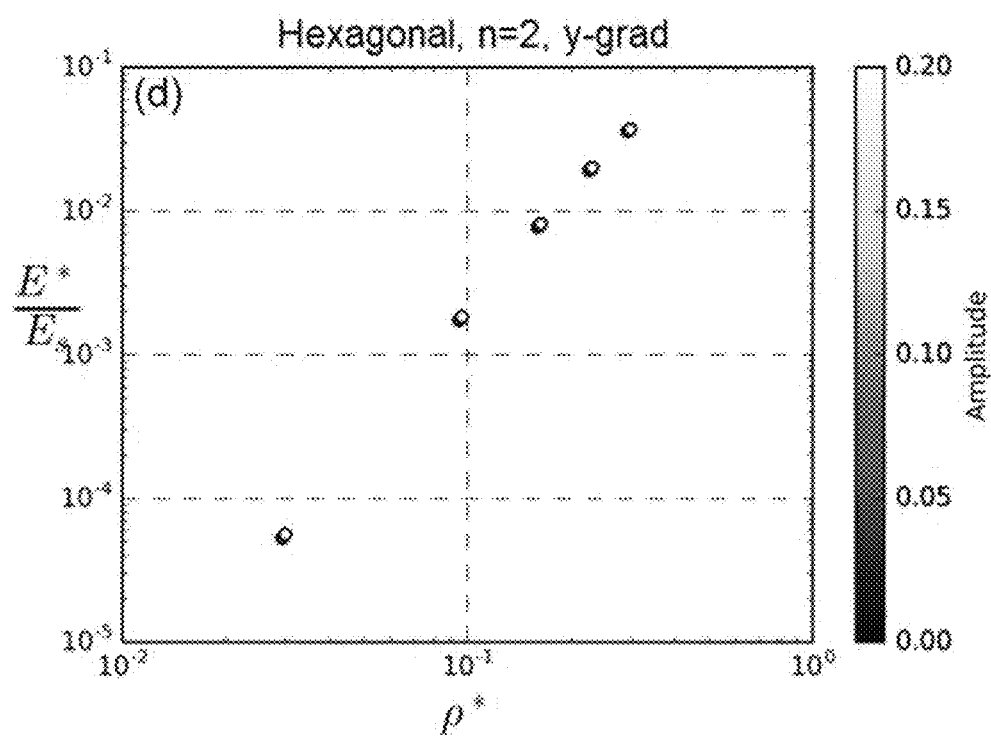

FIGS. 13A-13C show the simulation results for an example embodiment of a hexagonal cellular structure, generally designated 230, with a nonlinear (e.g., quadratic) shift function applied in the y-direction (e.g., parallel to the direction of compressive force F, see FIG. 13B) such that the cellular structure 230 has a vertically-oriented cellular gradient. FIG. 13A shows an undeformed (e.g., with no force applied) cellular structure 230 with a nonlinear (e.g., quadratic) shift function applied to form the cellular gradient shown. While the force vectors are shown by the orange arrows in FIG. 13A, the force F (see FIG. 13B) is not applied to the cellular structure 230 shown therein. FIG. 13B shows the deformation of the cellular structure 230 shown in FIG. 13A when a compressive force F is applied thereto, with the color gradients illustrating relative stress concentrations caused by the application of the compressive force F and the resultant deformation of the cellular structure 230. As shown in the plot of FIG. 13C, for non-linear (e.g., quadratic) shift functions applied parallel to the loading direction of the compressive force F, the elastic stiffness of the graded cellular structure 230 is unchanged compared to uniformly distributed cellular structure (e.g., those having a shift amplitude of zero); this is shown by each of the data points for the different amplitudes for the shift function applied being substantially a same value as those associated with other amplitude values, thereby producing a line with a same slope for each of the shift amplitudes applied. In the lower density areas (e.g., adjacent to the bottom edge of the domain, with cellular density increasing in the vertical direction) of the graded cellular structure 230, the inclined walls of each cell are progressively more closely aligned with the direction of force F than they would be for an ungraded cellular structure, thereby counterbalancing the effect of the lower cellular density in that region. Conversely, in the regions that become denser (e.g., adjacent to the upper edge of the domain, with the cellular density decreasing in the vertical direction) due to the application of the shift function, the inclined walls are progressively less aligned with (e.g., inclined at a greater angle relative to) the loading direction compared to an ungraded (e.g., uniform) cellular structure, thereby counterbalancing the effect of the increased cell density in the same region. The net effect on the graded structure is that there is no effective change in elastic stiffness when the loading direction of compressive force F is aligned to be substantially parallel with the cellular gradient induced by applying the shift function. It is important to note that the post-yield and dynamic behavior will be substantially different for the graded cellular structure 230 compared to the ungraded (e.g., uniform) cellular structure, despite the fact that the elastic properties remain unchanged. This feature is one of the major strengths of this method for creating graded cellular structures.

Figure 14A:
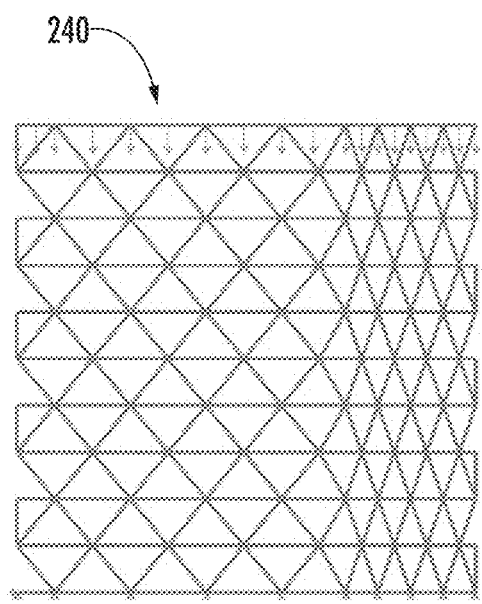
FIGS. 14A-14C show a triangular cellular structure, which has a piece-wise linear shift function applied transverse to a loading direction, in an undeformed state (FIG. 14A), a deformed state (FIG. 14B), and a plot (FIG. 14C) of the elastic modulus vs. relative density of the triangular cellular structure at several amplitudes of the shift function.
Figure 14B:
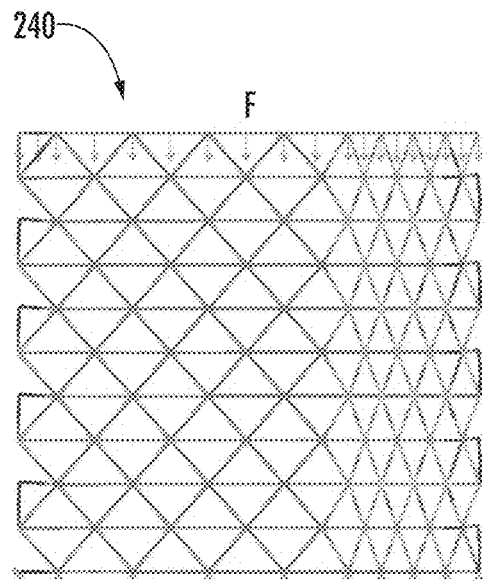
Figure 14C:
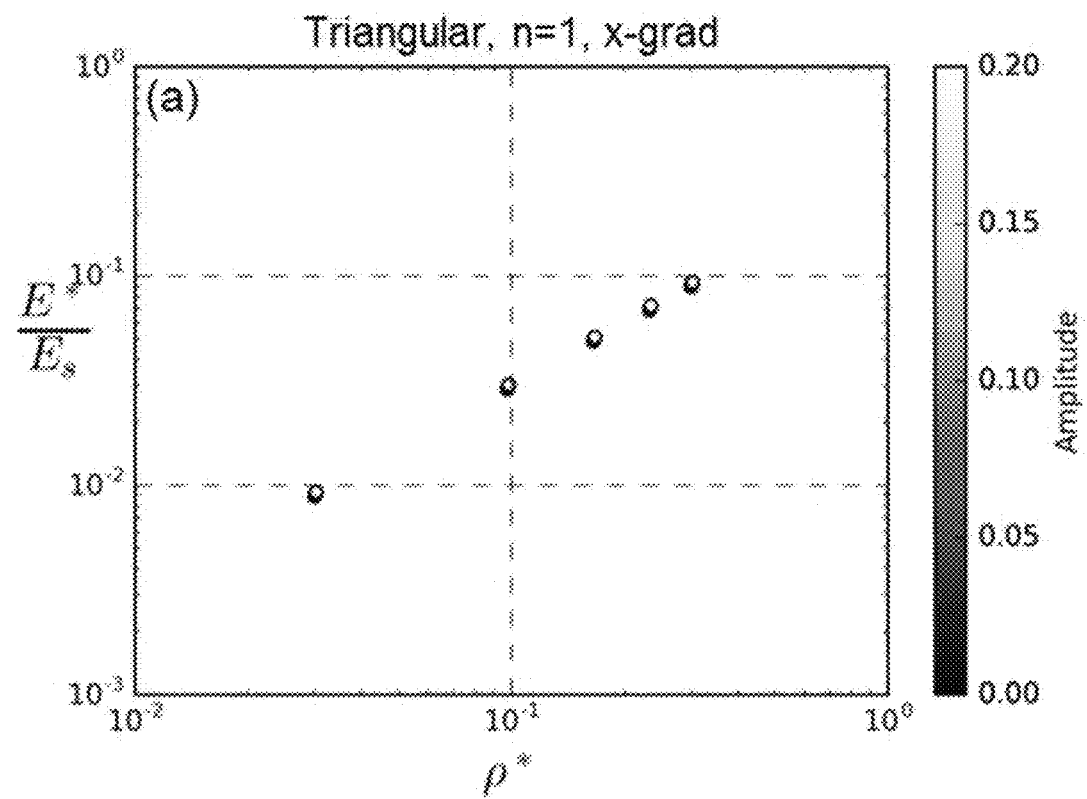

FIGS. 14A-14C show the simulation results for example embodiments of triangular cellular structure, generally designated 240, with a piece-wise (e.g., linear) shift function applied in the x-direction (e.g., transverse to the direction of compressive force F, see FIG. 14B) such that the cellular structure 240 has a horizontally-oriented cellular gradient. FIG. 14A shows an undeformed (e.g., with no force applied) cellular structure 240 with a piece-wise shift function applied to form the cellular gradient shown. While the force vectors are shown by the orange arrows in FIG. 14A, the force F (see FIG. 14B) is not applied to the cellular structure 240 shown therein. FIG. 14B shows the deformation of the cellular structure 240 shown in FIG. 14A when a compressive force F is applied thereto, with the color gradients illustrating relative stress concentrations caused by the application of the compressive force F and the resultant deformation of the cellular structure 240. As shown in the plot of FIG. 14C, for piece-wise, or linear, shift functions applied transverse to the loading direction of the compressive force F, the elastic stiffness of the graded cellular structure 240 is insensitive to cellular gradients oriented transverse to the loading direction indicated by the compressive force F. Since a uniform (e.g., ungraded) triangular cell geometry displays a stretch-dominated deformation behavior, the regions of higher and lower density created in the graded cellular structure 240 display increased and decreased elastic stiffness, respectively, across the width of the domain in equal measure, such that the net effect is an elastic stiffness equivalent to that of a cellular structure with uniformly distributed triangular cells. It is important to note that the distribution of stress within the cellular structure 240 changes with the distribution of material, such that the denser region will necessarily support more stress than the less dense region when a shift function gradient is applied to alter the distribution of triangular cells across the width of a cellular structure.

Figure 15A:
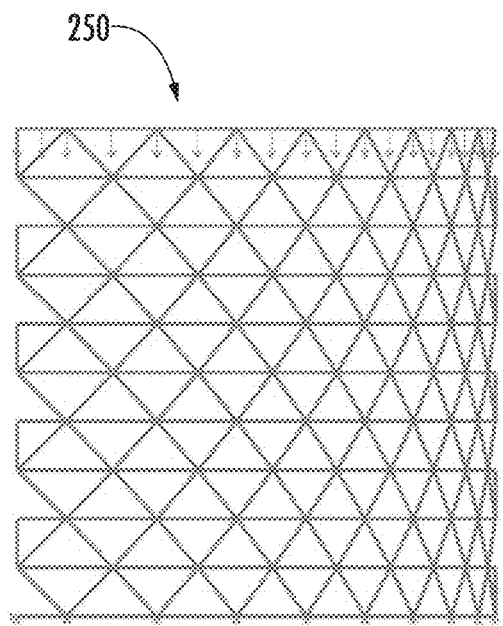
FIGS. 15A-15C show a triangular cellular structure, which has a nonlinearly-graded (e.g., quadratic) shift function applied transverse to a loading direction, in an undeformed state (FIG. 15A), a deformed state (FIG. 15B), and a plot (FIG. 15C) of the elastic modulus vs. relative density of the triangular cellular structure at several amplitudes of the shift function.
Figure 15B:
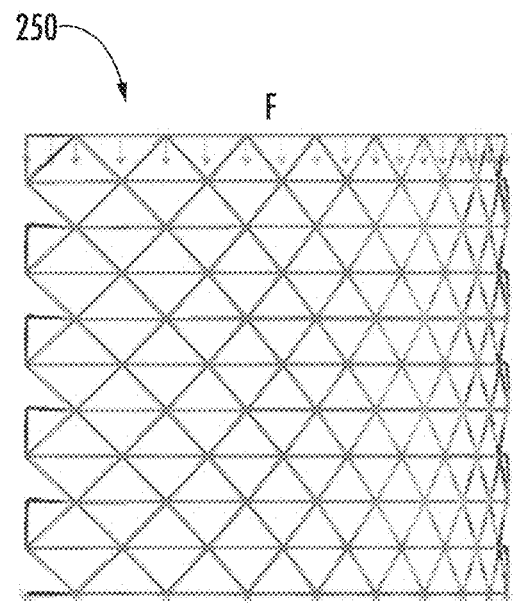
Figure 15C:
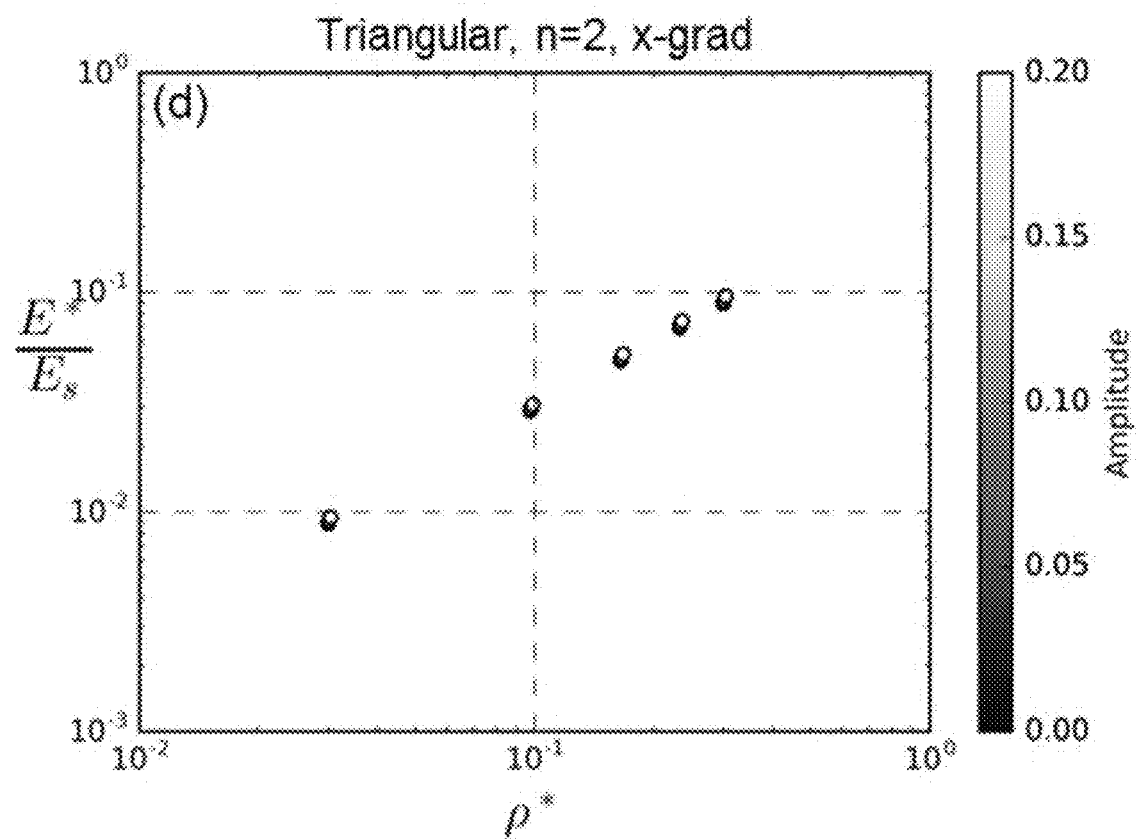

FIGS. 15A-15C show the simulation results for example embodiments of triangular cellular structure, generally designated 250, with a non-linear (e.g., quadratic) shift function applied in the x-direction (e.g., transverse to the direction of compressive force F, see FIG. 15B) such that the cellular structure 250 has a horizontally-oriented cellular gradient. FIG. 15A shows an undeformed (e.g., with no force applied) cellular structure 250 with a non-linear shift function applied to form the cellular gradient shown. While the force vectors are shown by the orange arrows in FIG. 15A, the force F (see FIG. 14B) is not applied to the cellular structure 250 shown therein. FIG. 15B shows the deformation of the cellular structure 250 shown in FIG. 15A when a compressive force F is applied thereto, with the color gradients illustrating relative stress concentrations caused by the application of the compressive force F and the resultant deformation of the cellular structure 250. As shown in the plot of FIG. 15C, for non-linear shift functions applied transverse to the loading direction of the compressive force F, the elastic stiffness of the graded cellular structure 250 is insensitive to cellular gradients oriented transverse to the loading direction indicated by the compressive force F. Since a uniform (e.g., ungraded) triangular cell geometry displays a stretch-dominated deformation behavior, the regions of higher and lower density created in the graded cellular structure 250 display increased and decreased elastic stiffness, respectively, across the width of the domain in equal measure, such that the net effect is an elastic stiffness equivalent to that of a cellular structure with uniformly distributed triangular cells. It is important to note that the distribution of stress within the cellular structure 250 changes with the distribution of material, such that the denser region will necessarily support more stress than the less dense region when a shift function gradient is applied to alter the distribution of triangular cells across the width of a cellular structure.

Figure 16A:
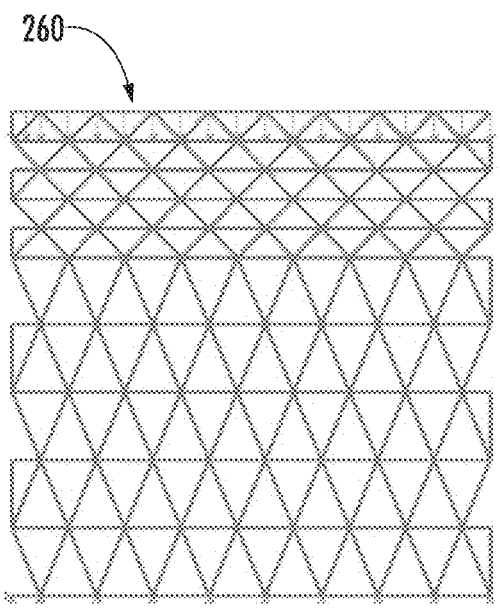
FIGS. 16A-16C show a triangular cellular structure, which has a piece-wise linear shift function applied parallel to a loading direction, in an undeformed state (FIG. 16A), a deformed state (FIG. 16B), and a plot (FIG. 16C) of the elastic modulus vs. relative density of the triangular cellular structure at several amplitudes of the shift function.
Figure 16B:
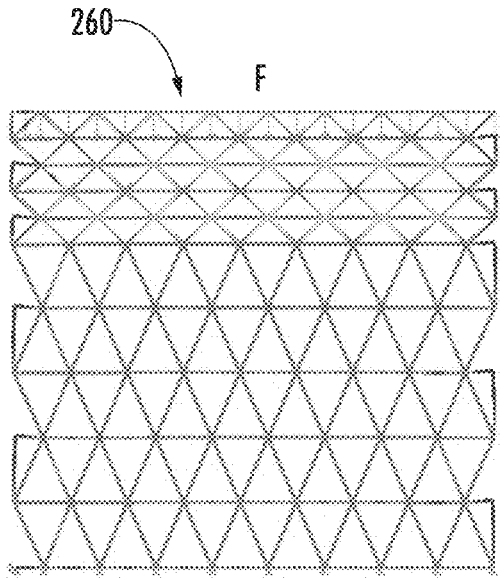
Figure 16C:
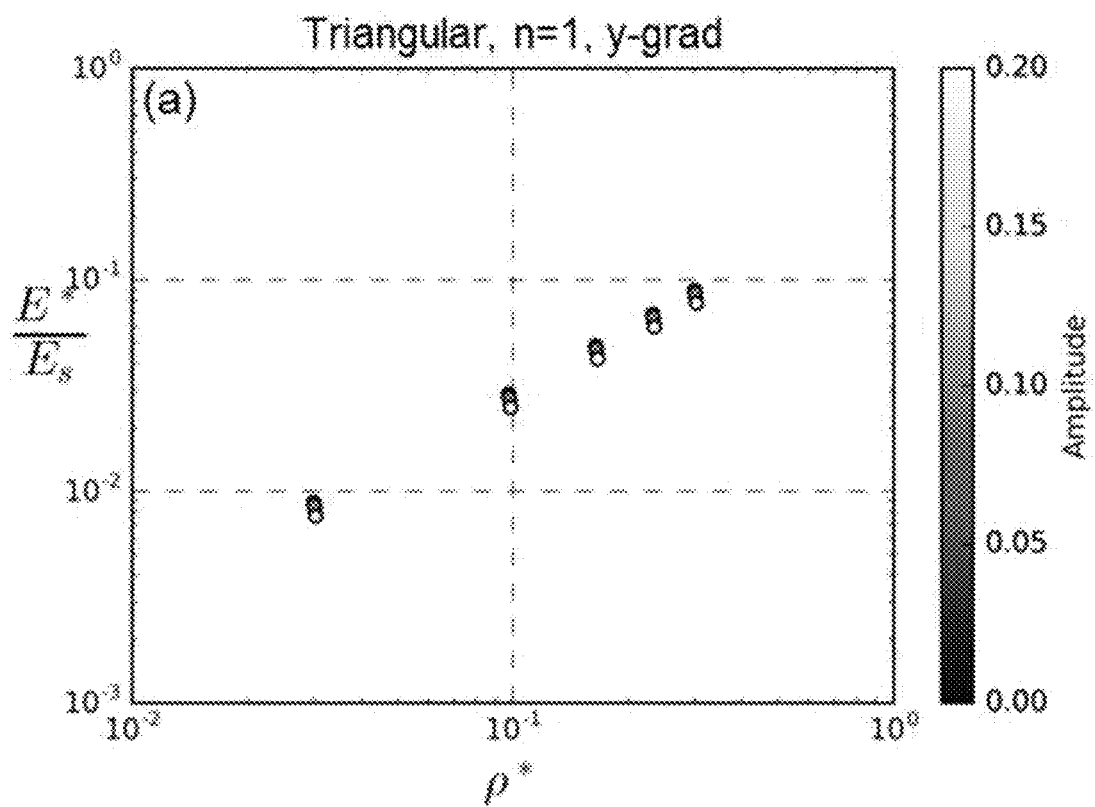

FIGS. 16A-16C show the simulation results for an example embodiment of a triangular cellular structure, generally designated 260, with a piece-wise (e.g., linear) shift function applied in the y-direction (e.g., parallel to the direction of compressive force F, see FIG. 16B) such that the cellular structure 260 has a vertically-oriented cellular gradient. FIG. 16A shows an undeformed (e.g., with no force applied) cellular structure 260 with a piece-wise shift function applied to form the cellular gradient shown. While the force vectors are shown by the orange arrows in FIG. 16A, the force F (see FIG. 16B) is not applied to the cellular structure 260 shown therein. FIG. 16B shows the deformation of the cellular structure 260 shown in FIG. 16A when a compressive force F is applied thereto, with the color gradients illustrating relative stress concentrations caused by the application of the compressive force F and the resultant deformation of the cellular structure 260. As shown in the plot of FIG. 16C, for piece-wise, or linear, shift functions applied parallel to the loading direction of the compressive force F, the elastic stiffness of the graded triangular cellular structure 260 decreases as the amplitude of the shift function increases. The operative mechanism is similar to that observed in the hexagonal cellular structures of FIGS. 10A-14C, where the regions that are made denser by application of the shift function gradient also have walls that are made to be less aligned with (e.g., closer to orthogonal to) the loading direction of force F, therefore operating to decrease the elastic stiffness of the cellular structure 260 in such regions. For triangular cell geometries, this softening effect has a greater impact than the corresponding stiffening effect caused by the walls of the cells becoming more closely aligned (e.g., closer to parallel) in such less dense regions where the piece-wise shift function makes the cells have a higher aspect ratio (e.g., height/width ratio), thereby resulting in a net softening effect when such shift functions are applied to triangular cellular structures.

Figure 17A:
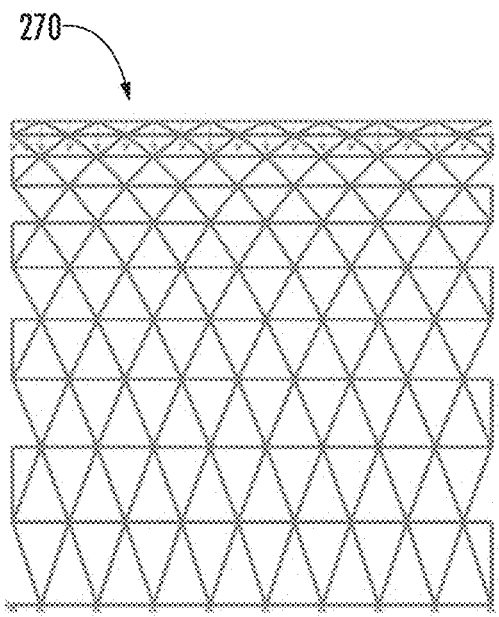
FIGS. 17A-17C show a triangular cellular structure, which has a nonlinearly-graded (e.g., quadratic) shift function applied parallel to a loading direction, in an undeformed state (FIG. 17A), a deformed state (FIG. 17B), and a plot (FIG. 17C) of the elastic modulus vs. relative density of the triangular cellular structure at several amplitudes of the shift function.
Figure 17B:
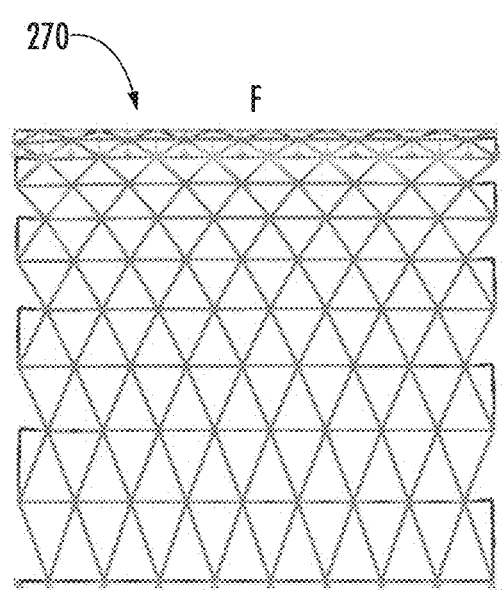
Figure 17C:
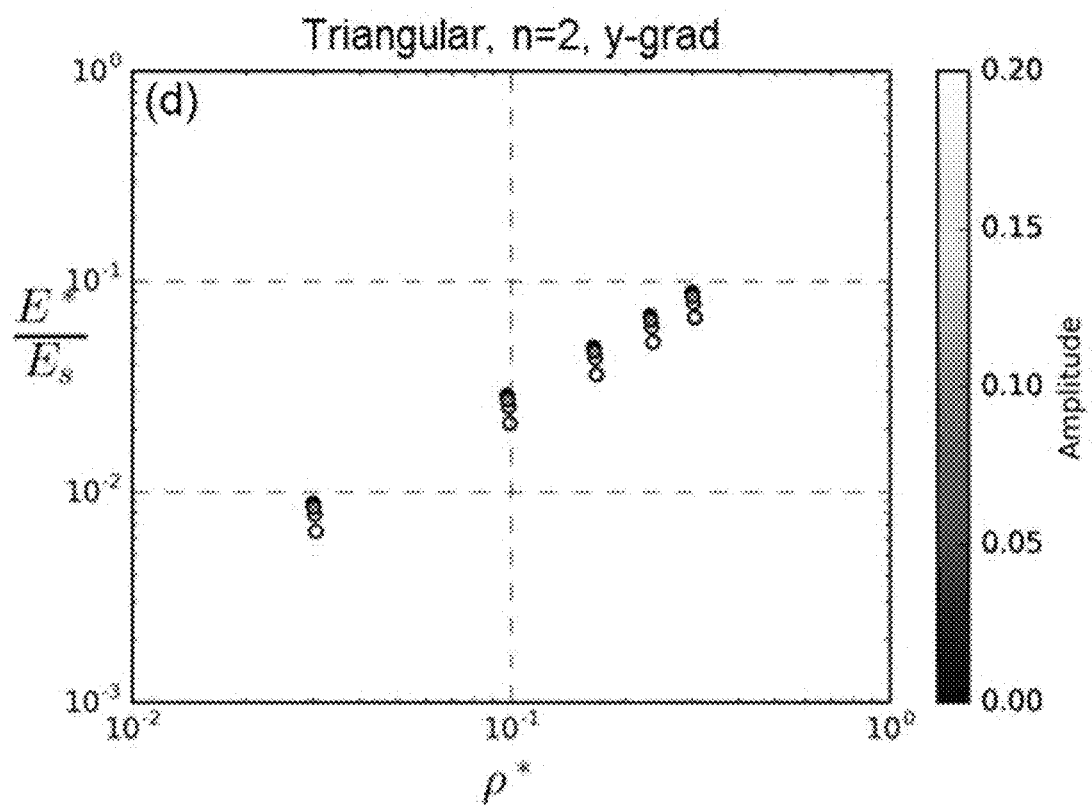

FIGS. 17A-17C show the simulation results for an example embodiment of a triangular cellular structure, generally designated 270, with a non-linear (e.g., quadratic) shift function applied in the y-direction (e.g., parallel to the direction of compressive force F, see FIG. 17B) such that the cellular structure 270 has a vertically-oriented cellular gradient. FIG. 17A shows an undeformed (e.g., with no force applied) cellular structure 270 with a non-linear shift function applied to form the cellular gradient shown. While the force vectors are shown by the orange arrows in FIG. 17A, the force F (see FIG. 17B) is not applied to the cellular structure 270 shown therein. FIG. 17B shows the deformation of the cellular structure 270 shown in FIG. 17A when a compressive force F is applied thereto, with the color gradients illustrating relative stress concentrations caused by the application of the compressive force F and the resultant deformation of the cellular structure 270. As shown in the plot of FIG. 17C, for non-linear shift functions applied parallel to the loading direction of the compressive force F, the elastic stiffness of the graded triangular cellular structure 270 decreases as the amplitude of the shift function increases. The operative mechanism is similar to that observed in the hexagonal cellular structures of FIGS. 10A-14C, where the regions that are made denser by application of the shift function gradient also have walls that are made to be less aligned with (e.g., closer to orthogonal to) the loading direction of force F, therefore operating to decrease the elastic stiffness of the cellular structure 270 in such regions. For triangular cell geometries, this softening effect has a greater impact than the corresponding stiffening effect caused by the walls of the cells becoming more closely aligned (e.g., closer to parallel) in such less dense regions where the non-linear shift function makes the cells have a higher aspect ratio (e.g., height/width ratio), thereby resulting in a net softening effect when such shift functions are applied to triangular cellular structures.

Figure 18A:
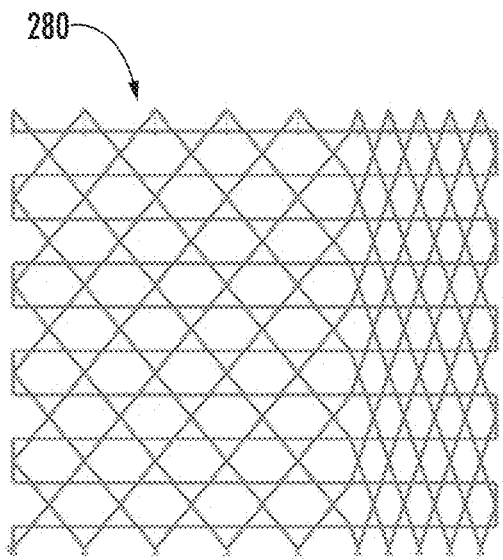
FIGS. 18A-18C show a kagome-shaped cellular structure, which has a piece-wise linear shift function applied transverse to a loading direction, in an undeformed state (FIG. 18A), a deformed state (FIG. 18B), and a plot (FIG. 18C) of the elastic modulus vs. relative density of the kagome-shaped cellular structure at several amplitudes of the shift function.
Figure 18B:
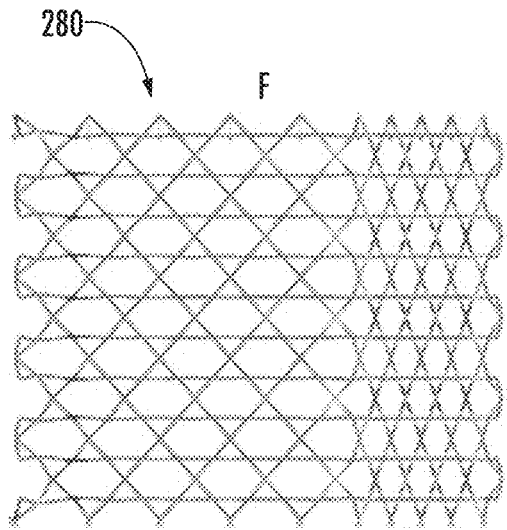
Figure 18C:
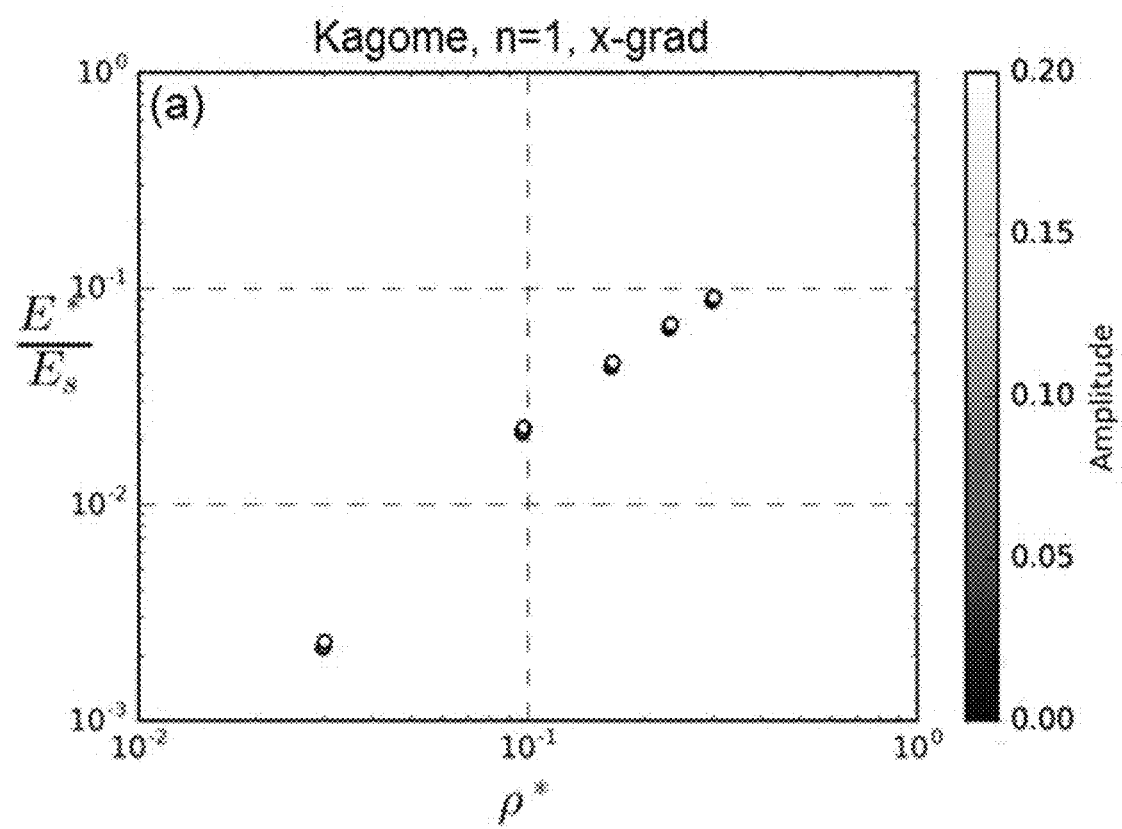

FIGS. 18A-18C show the simulation results for an example embodiment of a kagome cellular structure, generally designated 280, with a piece-wise (e.g., linear) shift function applied in the x-direction (e.g., transverse to the direction of compressive force F, see FIG. 18B) such that the cellular structure 280 has a horizontally-oriented cellular gradient. FIG. 18A shows an undeformed (e.g., with no force applied) cellular structure 280 with a piece-wise shift function applied to form the cellular gradient shown. While the force vectors are shown by the orange arrows in FIG. 18A, the force F (see FIG. 18B) is not applied to the cellular structure 280 shown therein. FIG. 18B shows the deformation of the cellular structure 280 shown in FIG. 18A when a compressive force F is applied thereto, with the color gradients illustrating relative stress concentrations caused by the application of the compressive force F and the resultant deformation of the cellular structure 280. As shown in the plot of FIG. 18C, for piece-wise, or linear, shift functions applied transverse to the loading direction of the compressive force F, the graded kagome cellular structure 280 has an increased elastic stiffness compared to a uniform cellular structure. The effect of this increase in stiffness is minimal for a piece-wise shift function (see, e.g., FIG. 18C) as shown by the plotted points becoming grouped closer together as the relative density of the cellular structure 280 is increased.

Figure 19A:
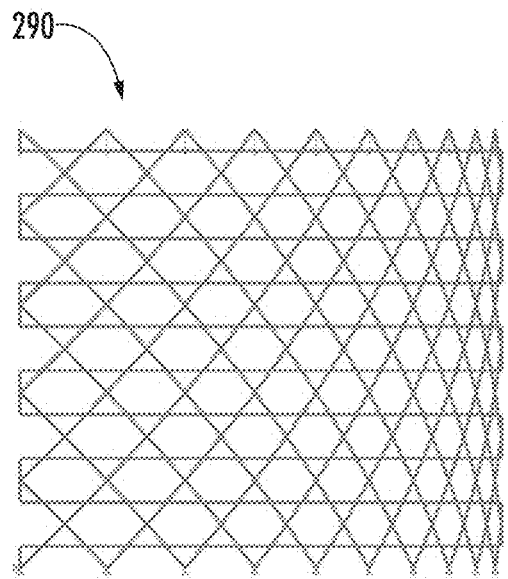
FIGS. 19A-19C show a kagome-shaped cellular structure, which has a nonlinearly-graded (e.g., quadratic) shift function applied transverse to a loading direction, in an undeformed state (FIG. 19A), a deformed state (FIG. 19B), and a plot (FIG. 19C) of the elastic modulus vs. relative density of the kagome-shaped cellular structure at several amplitudes of the shift function.
Figure 19B:
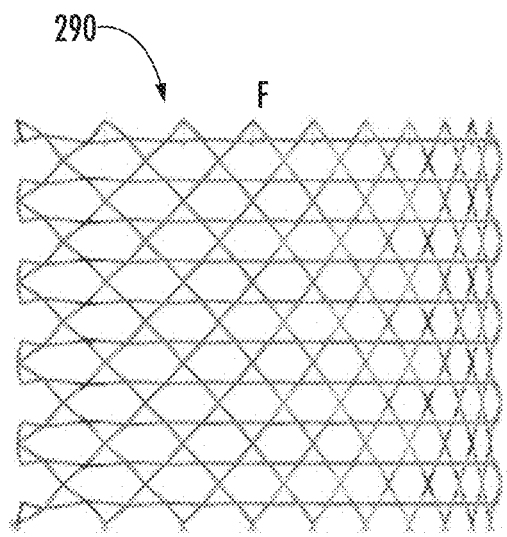
Figure 19C:
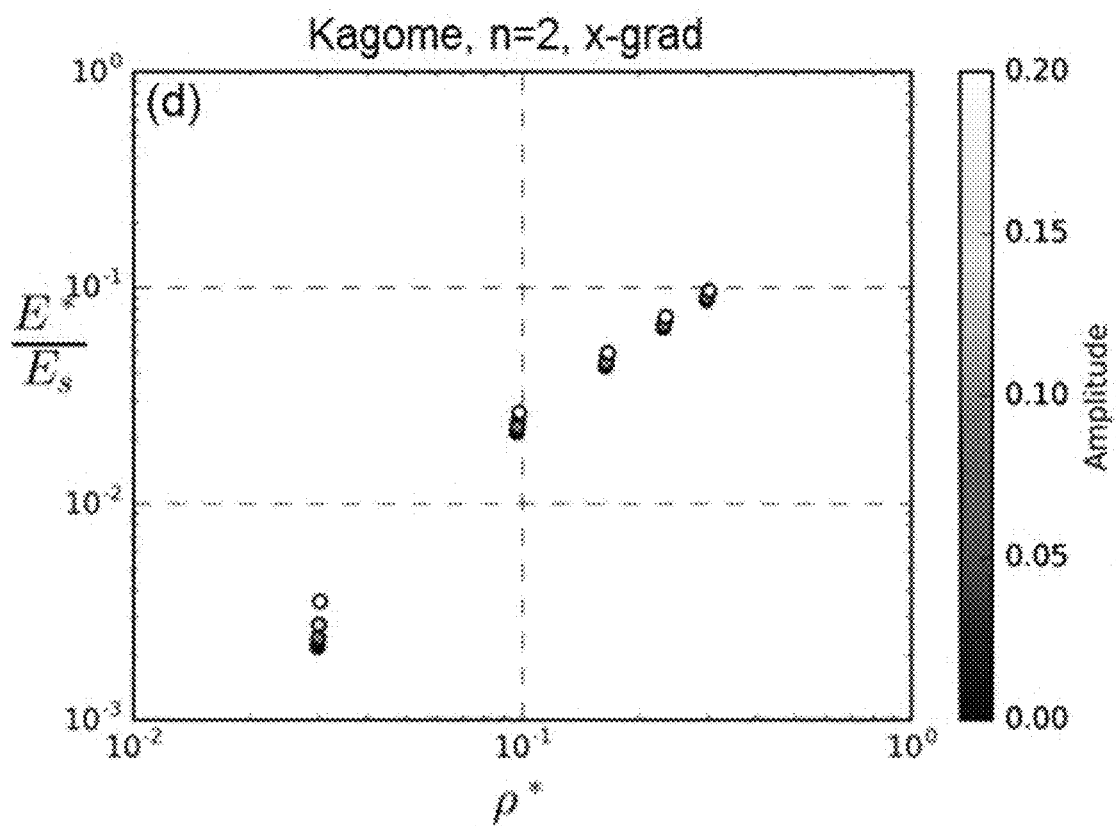

FIGS. 19A-19C show the simulation results for an example embodiment of a kagome cellular structure, generally designated 290, with a non-linear (e.g., quadratic) shift function applied in the x-direction (e.g., transverse to the direction of compressive force F, see FIG. 19B) such that the cellular structure 290 has a horizontally-oriented cellular gradient. FIG. 19A shows an undeformed (e.g., with no force applied) cellular structure 290 with a non-linear shift function applied to form the cellular gradient shown. While the force vectors are shown by the orange arrows in FIG. 19A, the force F (see FIG. 19B) is not applied to the cellular structure 290 shown therein. FIG. 19B shows the deformation of the cellular structure 290 shown in FIG. 19A when a compressive force F is applied thereto, with the color gradients illustrating relative stress concentrations caused by the application of the compressive force F and the resultant deformation of the cellular structure 290. As shown in the plot of FIG. 19C, for non-linear shift functions applied transverse to the loading direction of the compressive force F, the graded kagome cellular structure 290 has an increased elastic stiffness compared to a uniform cellular structure. The effect of this increase in stiffness for a quadratic shift function decreases as the relative density of the cellular structure 290 increases (see, e.g., FIG. 19C), as shown by the plotted points becoming grouped closer together as the relative density of the cellular structure 290 is increased.

FIGS. 20A-20C show the simulation results for an example embodiment of a kagome cellular structure, generally designated 300, with a piece-wise (e.g., linear) shift function applied in the y-direction (e.g., parallel to the direction of compressive force F, see FIG. 20B) such that the cellular structure 300 has a vertically-oriented cellular gradient. FIG. 20A shows an undeformed (e.g., with no force applied) cellular structure 300 with a piece-wise shift function applied to form the cellular gradient shown. While the force vectors are shown by the orange arrows in FIG. 20A, the force F (see FIG. 20B) is not applied to the cellular structure 300 shown therein. FIG. 20B shows the deformation of the cellular structure 300 shown in FIG. 20A when a compressive force F is applied thereto, with the color gradients illustrating relative stress concentrations caused by the application of the compressive force F and the resultant deformation of the cellular structure 300. As shown in the plot of FIG. 20C, for piece-wise, or linear, shift functions applied parallel to the loading direction, such graded kagome cellular structures 300 have a reduced stiffness (e.g., are softened) compared to a uniform (e.g., non-graded) kagome cellular structure. Unlike in the transversely oriented shift function applications discussed previously relative to FIGS. 18A-18C, application of a parallel shift function causes a softening effect that increases as relative density increases for piece-wise, or linear, and shift functions.

FIGS. 21A-21C show the simulation results for an example embodiment of a kagome cellular structure, generally designated 310, with a piece-wise (e.g., linear) shift function applied in the y-direction (e.g., parallel to the direction of compressive force F, see FIG. 21B) such that the cellular structure 310 has a vertically-oriented cellular gradient. FIG. 21A shows an undeformed (e.g., with no force applied) cellular structure 310 with a piece-wise shift function applied to form the cellular gradient shown. While the force vectors are shown by the orange arrows in FIG. 21A, the force F (see FIG. 21B) is not applied to the cellular structure 310 shown therein. FIG. 21B shows the deformation of the cellular structure 310 shown in FIG. 21A when a compressive force F is applied thereto, with the color gradients illustrating relative stress concentrations caused by the application of the compressive force F and the resultant deformation of the cellular structure 310. As shown in the plot of FIG. 21C, for non-linear (e.g., quadratic) shift functions applied parallel to the loading direction, such graded kagome cellular structures 310 have a reduced stiffness (e.g., are softened) compared to a uniform (e.g., non-graded) kagome cellular structure. Unlike in the transversely oriented shift function applications discussed previously relative to FIGS. 19A-19C, application of a parallel shift function causes a softening effect that increases as relative density increases for both the piece-wise, or linear, and quadratic shift functions. However, as can be seen in FIGS. 20C and 21C, respectively, the effect of this softening has a greater magnitude for quadratic shift functions than for piece-wise shift functions; this can be seen where the plotted points in FIG. 21C becoming spread further apart vertically as the relative density increases compared to the plotted points in FIG. 20C, where the plotted points are comparatively grouped tighter together, such that the softening effect is muted in comparison to the softening caused by a quadratic shift function of a same amplitude.

Figure 22A:
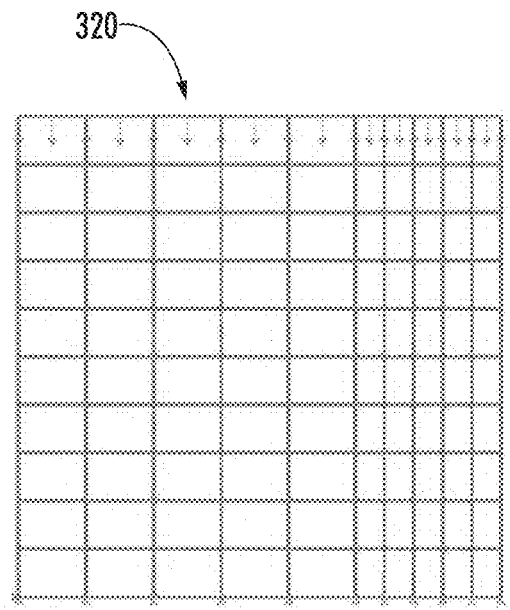
FIGS. 22A-22C show a square/rectangular cellular structure, which has a piece-wise linear shift function applied transverse to a loading direction, in an undeformed state (FIG. 22A), a deformed state (FIG. 22B), and a plot (FIG. 22C) of the elastic modulus vs. relative density of the square/rectangular cellular structure at several amplitudes of the shift function.
Figure 25A:
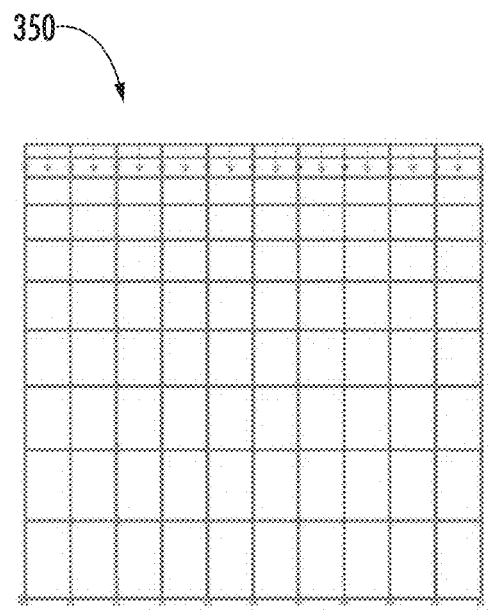
FIGS. 25A-25C show a square/rectangular cellular structure, which has a nonlinearly-graded (e.g., quadratic) shift function applied parallel to a loading direction, in in an undeformed state (FIG. 25A), a deformed state (FIG. 25B), and a plot (FIG. 25C) of the elastic modulus vs. relative density of the square/rectangular cellular structure at several amplitudes of the shift function.
Figure 25B:
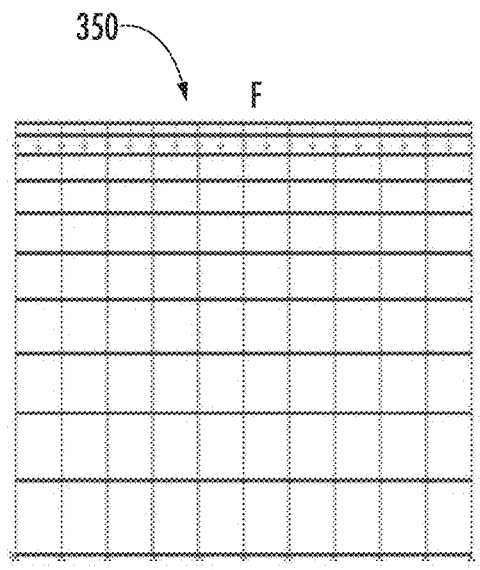
Figure 25C:
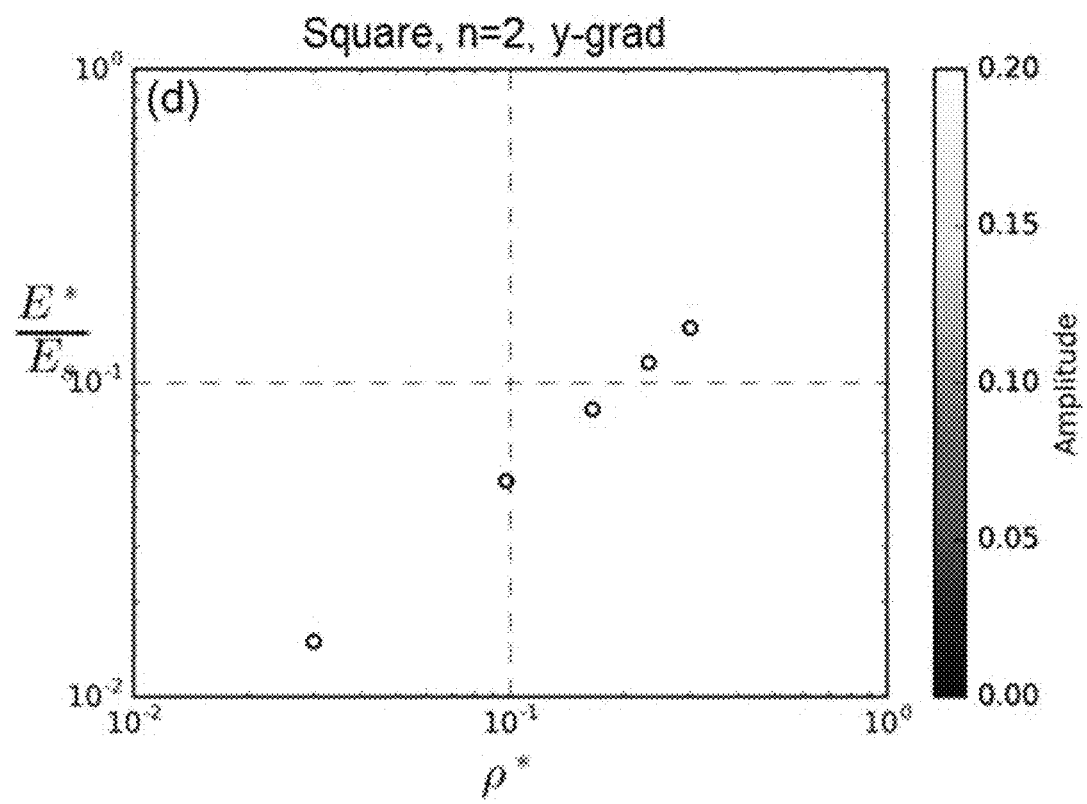

FIGS. 22A-25C show the simulation results for example embodiments of square and/or rectangular cellular structures. In FIGS. 22A-22C, the square/rectangular cellular structures, generally designated 320, have a piece-wise (e.g., linear) shift function applied in the x-direction (e.g., transverse to the direction of compressive force F, see FIG. 22B) such that the cellular structure 320 has a horizontally-oriented cellular gradient. In FIGS. 23A-23C, the square/rectangular cellular structures, generally designated 330, have a non-linear (e.g., quadratic) shift function applied in the x-direction (e.g., transverse to the direction of compressive force F, see FIG. 23B) such that the cellular structure 330 has a horizontally-oriented cellular gradient. In FIGS. 24A-24C, the square/rectangular cellular structures, generally designated 340, have a piece-wise (e.g., linear) shift function applied in the y-direction (e.g., parallel to the direction of compressive force F, see FIG. 24B) such that the cellular structure 340 has a vertically-oriented cellular gradient. In FIGS. 25A-25C, the square/rectangular cellular structures, generally designated 350, have a non-linear (e.g., quadratic) shift function applied in the y-direction (e.g., parallel to the direction of compressive force F, see FIG. 25B) such that the cellular structure 350 has a vertically-oriented cellular gradient.

Figure 22B:
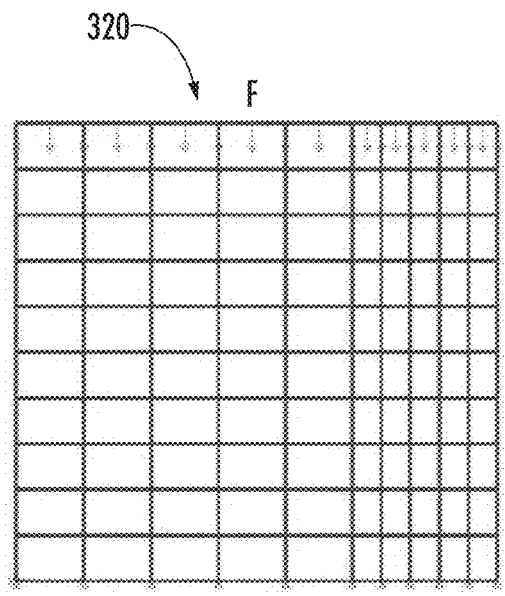
Figure 22C:
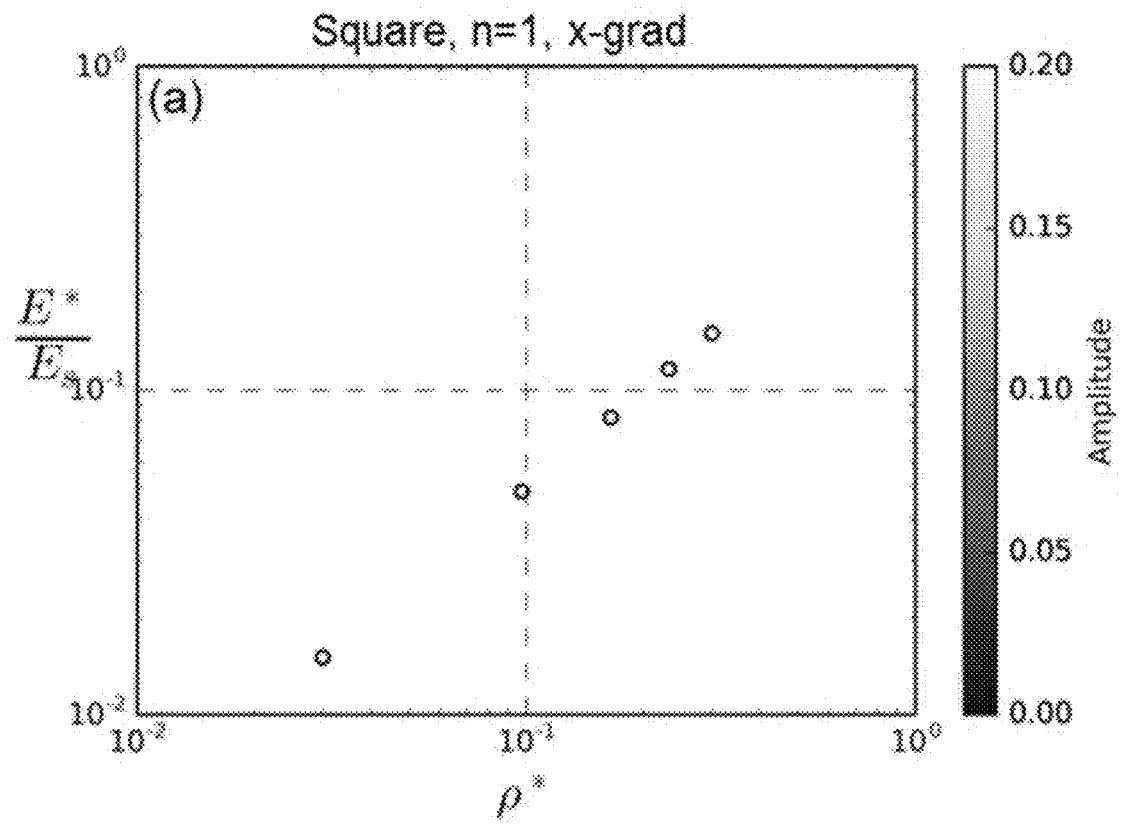
Figure 23A:
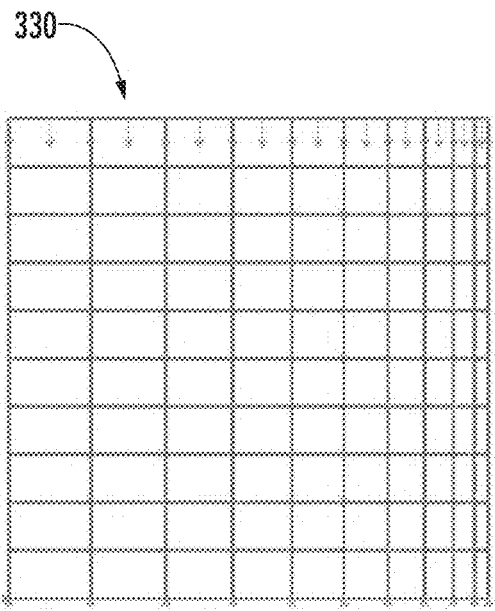
FIGS. 23A-23C show a square/rectangular cellular structure, which has a nonlinearly-graded (e.g., quadratic) shift function applied transverse to a loading direction, in an undeformed state (FIG. 23A), a deformed state (FIG. 23B), and a plot (FIG. 23C) of the elastic modulus vs. relative density of the square/rectangular cellular structure at several amplitudes of the shift function.
Figure 23B:
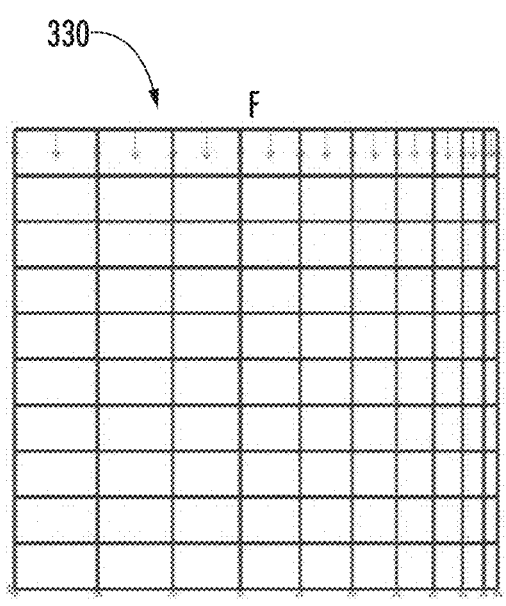
Figure 23C:
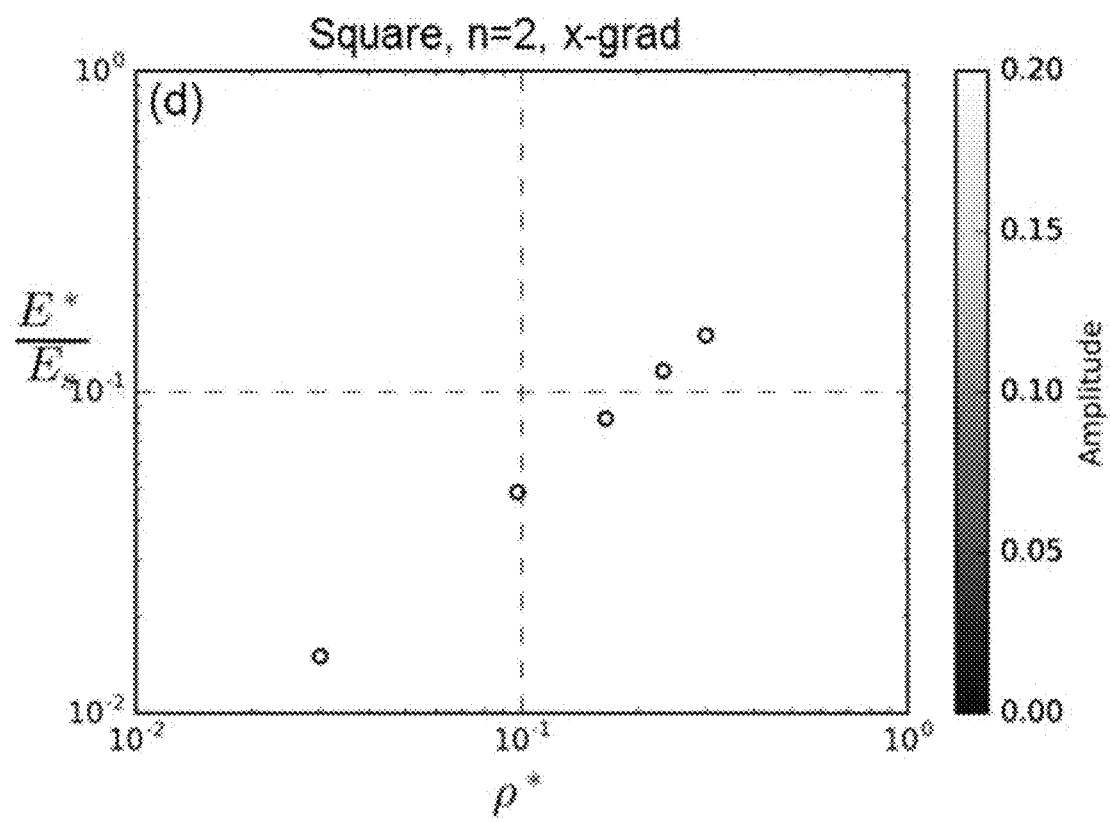
Figure 24A:
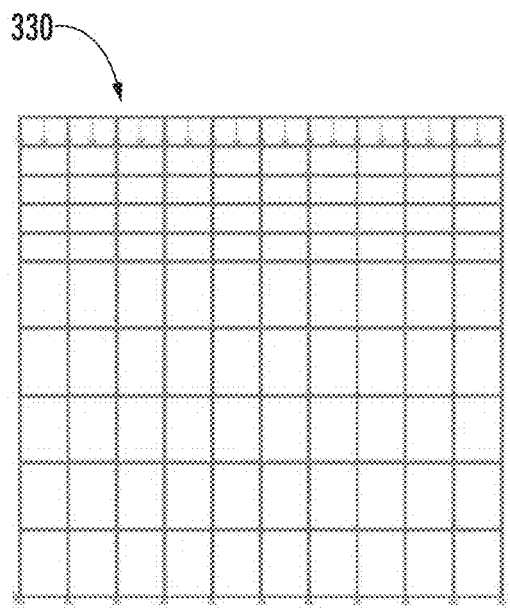
FIGS. 24A-24C show a square/rectangular cellular structure, which has a piece-wise linear shift function applied parallel to a loading direction, in in an undeformed state (FIG. 24A), a deformed state (FIG. 24B), and a plot (FIG. 24C) of the elastic modulus vs. relative density of the square/rectangular cellular structure at several amplitudes of the shift function.
Figure 24B:
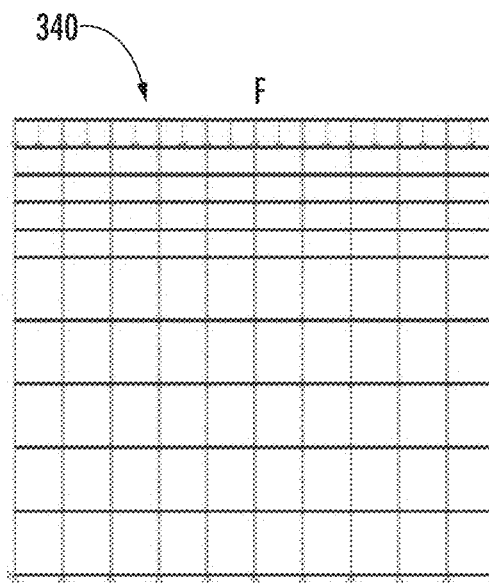
Figure 24C:
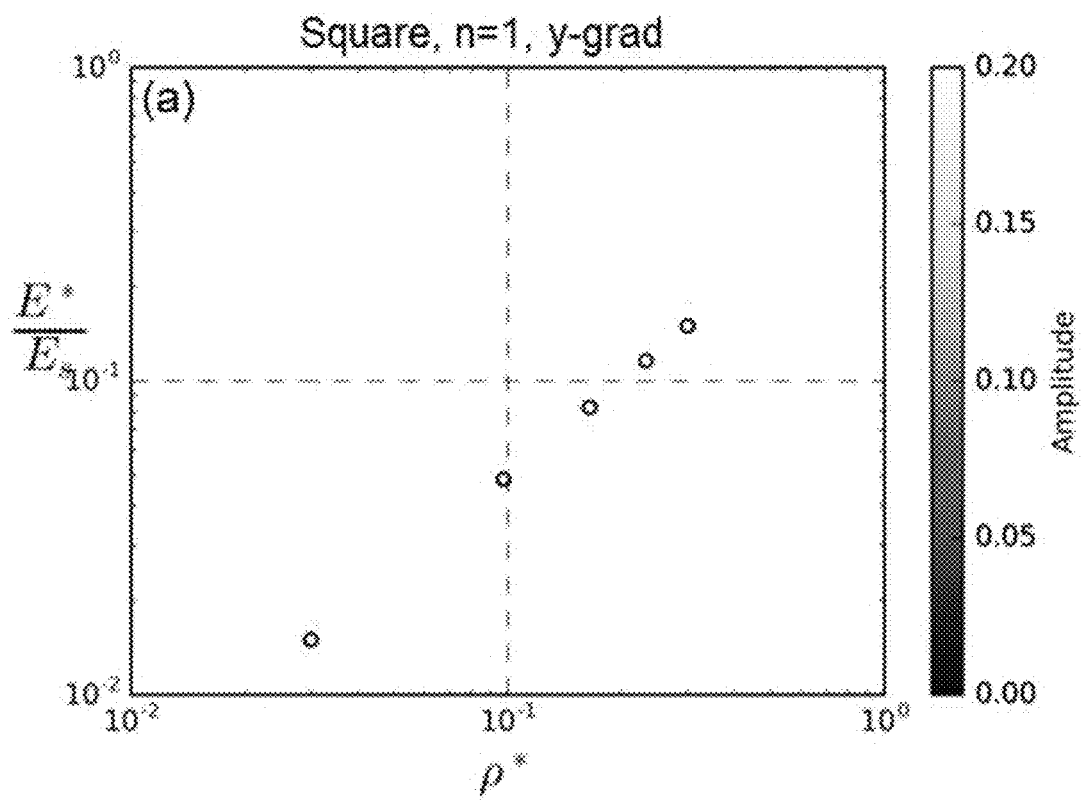

FIGS. 22A/24A and 23A/25A show the undeformed (e.g., with no force applied) cellular structures 320, 330, 340, 350 with a piece-wise linear shift function gradient and a non-linear quadratic shift function gradient, respectively, applied thereto. FIGS. 22B/24B and 23B/25B show the deformation of the cellular structures 320, 330, 340, 350 respectively shown in FIGS. 22A/24A and 23A/25A when a compressive force F is applied thereto. As shown in the plots of FIGS. 22C, 23C, 24C, and 25C, for square and rectangular cellular structures 320, 330, 340, 350 loaded parallel to either of the wall directions, the application of gradients, whether piece-wise or quadratic, does not alter the stiffness of the cellular structure 320, 330, 340, 350 when the loading (e.g., compressive force F) is aligned with either of the wall directions. For cellular structures 320, 330, 340, 350 loaded in this manner, the load is supported entirely by the portion of cell walls that are fully aligned with the loading direction, regardless of where the walls are located or how they are spatially distributed throughout the height and/or width of the cellular structure 320, 330, 340, 350.

From this series of numerical analyses, and from inspection of the analytical equations for elastic stiffness, several advantages can be observed from applying shift functions to produce graded cellular structures in general. First, the stiffness of any region of a cellular structure is most strongly dictated by the orientation of the cell walls in the graded region relative to the loading direction of any force acting on the cellular structure. By applying gradients in the manner described herein, any increase in stiffness in one region is generally coupled with a stiffness decrease in another region for simple uniaxial loading scenarios. For bending-dominated cellular materials that have sub-optimal stiffness in their original configuration (e.g., the hexagonal cellular geometries), grading schemes can alter (i.e., increase or decrease) the stiffness substantially and/or change the mass distribution within the graded portion of the cellular structure without changing the overall stiffness of the graded cellular structure. The stiffness of stretch-dominated cell types (e.g., triangular and kagome), on the other hand, either remains unchanged or is decreased by the application of gradients. Thus, by choosing an appropriate cell type in conjunction with the gradient type, a wide range of stiffness values, relative densities, and directionality can be achieved. This effective stiffness can be further altered by the application of a thickness function, as described above, to alter at least some portion of the walls within the cellular structure to have a thickness that is different than a thickness of others of the walls within the cellular structure. Examples of such thickness functions being applied can be seen, for example, in FIGS. 36A-36C, which are described in greater detail elsewhere herein.

Although cellular gradients can be applied without changing the elastic properties of the cellular materials, the collapse behavior and post-collapse behavior will be strongly affected by the application of gradients. Examples of how gradients can be used to tailor the collapse behavior of elastomeric honeycomb structures is shown in FIGS. 26A-28B. FIG. 26A, shows a hexagonal cellular structure, generally designated 360, with a uniform distribution of cells within cellular structure 360. FIG. 26B shows the resulting deformed hexagonal cellular structure, generally designated 362, that yields a predictably uniform deformation as shown, resulting in each of the cells collapsing and/or yielding at substantially a same rate and force. FIG. 27A shows a graded hexagonal cellular structure, generally designated 370, which has a nonlinear quadratic shift function applied across the height and width of the cellular structure 370. FIG. 27B shows the resulting deformed hexagonal cellular structure, generally designated 372, in which it can be seen that the cells in the central region, where the walls that are aligned with the vertical force being applied are the tallest, are the first to yield and deform, while the cells within the upper and lower regions having comparatively shorter side walls are not substantially deformed (e.g., are not collapsed). FIG. 28A, shows a graded cellular structure, generally designated 380, having a comparatively complex gradient applied by applying a shift function across the height and width of the cellular structure. In FIG. 28B, the resulting deformed hexagonal cellular structure, generally designated 382, is shown, with the cellular structure 382 being compressed in more than one direction, thereby causing a compression and/or collapse of substantially all of the cells arranged at and/or about the perimeter of the cellular structure 382, but creating an uncompressed central region which may be suitable for use as a protected enclave for objects that may be nested within the cellular structure 382 to prevent such objects from being compressed.

Referring now to FIGS. 29A-31E, a series of compression tests on elastic-plastic cellular structures, which have been printed from acrylonitrile butadiene styrene (ABS) on a commercially available desktop fused filament fabrication (FFF) 3D printer, are shown. These elastomeric cellular structures demonstrate that the buckling behavior can be localized by applying gradients that result in cell walls that are aligned with the loading direction of the force applied and have increased aspect ratios (e.g., are comparatively elongated compared to other comparably oriented cell walls within the cellular structure). The regions having the elongated walls have lower relative density and, accordingly, will experience elastic instability and undergo a buckle-type failure before the comparably oriented cell walls in the denser regions, resulting in a more gradual and "programmable" (e.g., controllable and/or predictable) collapse behavior. Such behavior can also be employed to create regions within the structure that do not collapse during compression, as shown in FIGS. 28A and 28B, where weak regions have been created around a high density central region. Such weaker regions can be designed to collapse first, therefore enabling large amounts of global engineering strain to be experienced by the graded cellular structure without significantly deforming the denser region in the central region of the graded cellular structure within a specified loading (e.g., force) range experienced by the graded cellular structure.

Figure 29A:
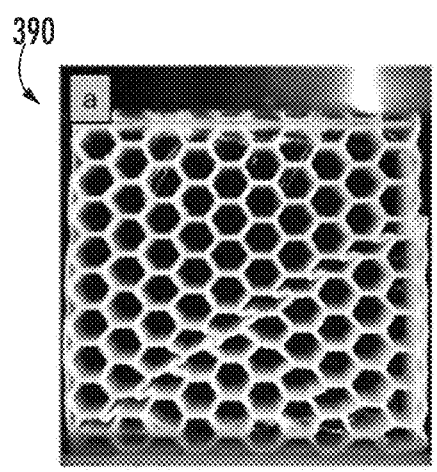
FIGS. 29A and 29B are photographs showing a compression behavior of ABS hexagonal cellular structure with a uniform cellular distribution, when compressed in the x-direction.
Figure 29B:
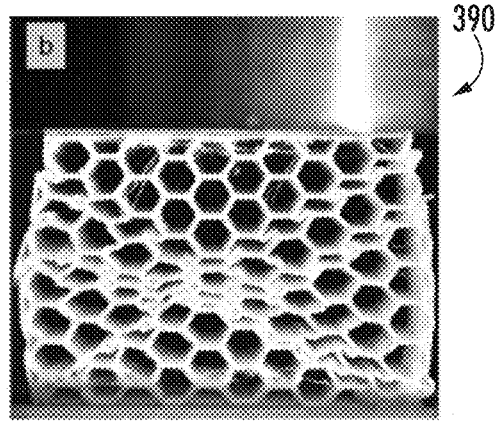
Figure 29C:
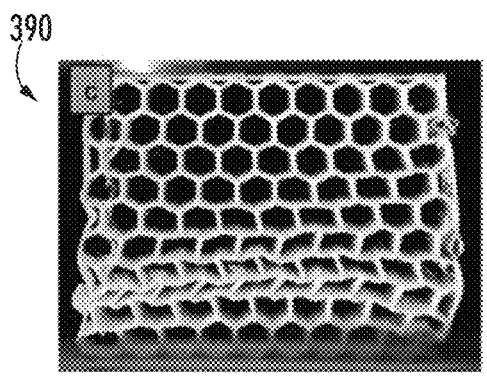
FIGS. 29C and 29D are photographs showing a compression behavior of the ABS cellular structure of FIGS. 29A and 29B, when compressed in the y-direction (e.g., orthogonal to the direction shown in FIGS. 29A and 29B).
Figure 29D:
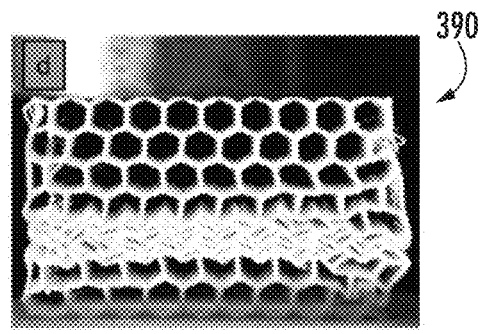
Figure 29E:
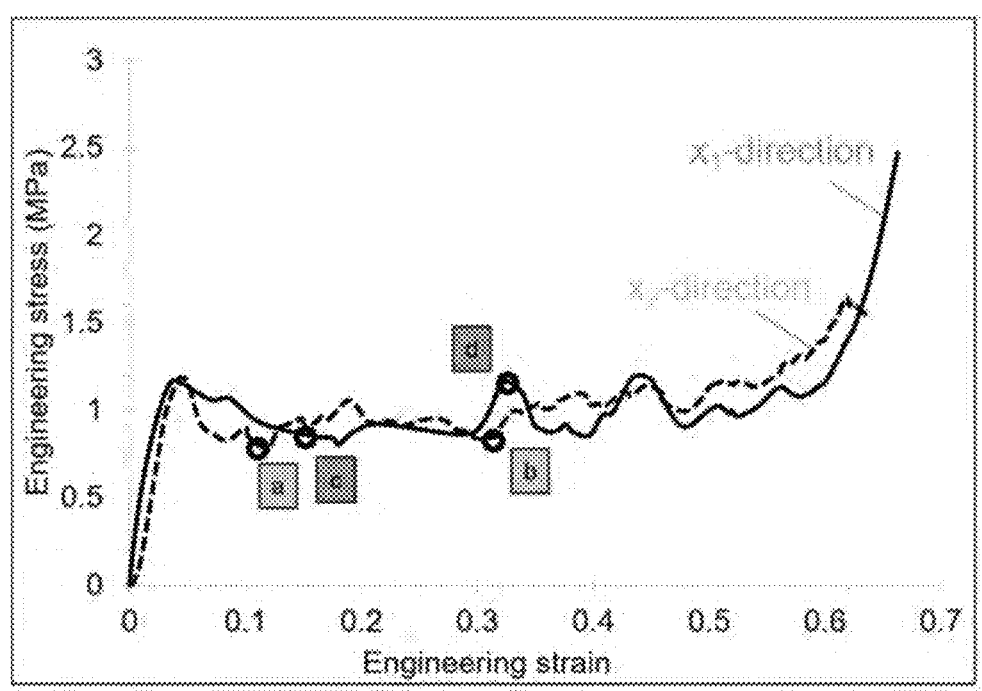
FIG. 29E is a graph of engineering stress vs. engineering strain as the hexagonal cellular structure of FIGS. 29A-29D is compressed in the respective directions indicated.

In FIGS. 29A-29E, compression failure (e.g., buckling) of a cellular structure, generally designated 390, with a hexagonal cellular geometry and uniform cellular distribution (e.g., no shift function applied) is shown. FIGS. 29A and 29B show the resulting compression when the cellular structure 390 is compressed to the point of buckling failure by a compressive force oriented in a first (e.g., height) direction relative to the cellular structure 390; this first direction is oriented substantially orthogonal to the direction in which the shift function is applied to cellular structure 390. FIGS. 29C and 29D show the resulting compression when the cellular structure 390 is compressed to the point of buckling failure by a compressive force oriented in a second (e.g., width) direction relative to the cellular structure 390; this second direction is oriented substantially parallel to the direction in which the shift function is applied to cellular structure 390. The resulting engineering stress is plotted against engineering strain in the graph of FIG. 29E, with the corresponding points of compression illustrated in FIGS. 29A-29D being marked on the appropriate data plot line. As can be seen in FIGS. 29A and 29B, where none of the internal cell walls are oriented to be parallel to the direction of the compressive force applied, the deformation of the cellular structure 390 is bending-dominated; it can be seen that the cells collapse in diagonal rows through a center region of the cellular structure 390, with the side walls buckling outward. In FIGS. 29C and 29D, where at least some of the side walls are oriented substantially parallel to the direction of the compressive force applied, the deformation of the cellular structure 390 is stretch-dominated; it can be seen that the horizontal rows of cells are deformed substantially sequentially, with adjacent rows of cells progressively deforming through bending before the vertically oriented side walls eventually buckle.

Figure 30A:
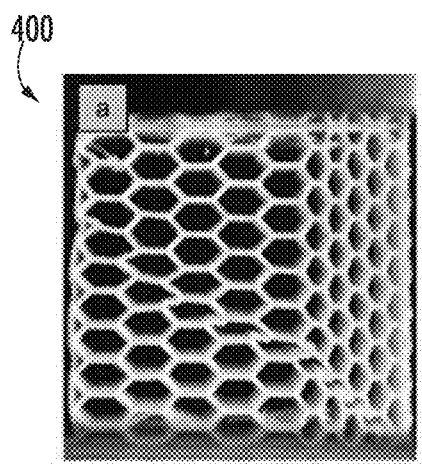
FIGS. 30A and 30B are photographs showing a compression behavior of ABS hexagonal cellular structure with a non-uniform cellular distribution according to a piece-wise linear shift function, when compressed in the x-direction.
Figure 30B:
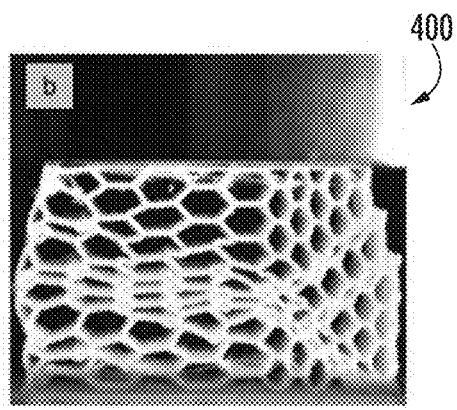
Figure 30C:
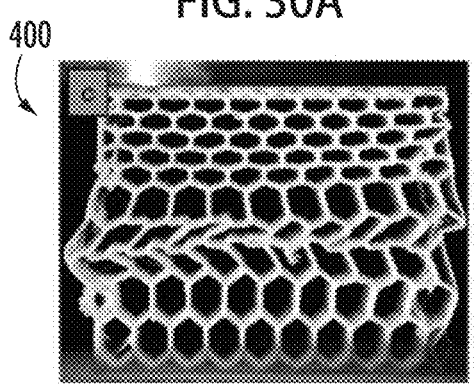
FIGS. 30C and 30D are photographs showing a compression behavior of the ABS cellular structure of FIGS. 30A and 30B, when compressed in the y-direction (e.g., orthogonal to the direction shown in FIGS. 30A and 30B).
Figure 30D:
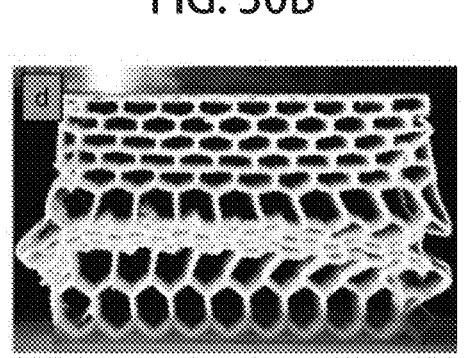
Figure 30E:
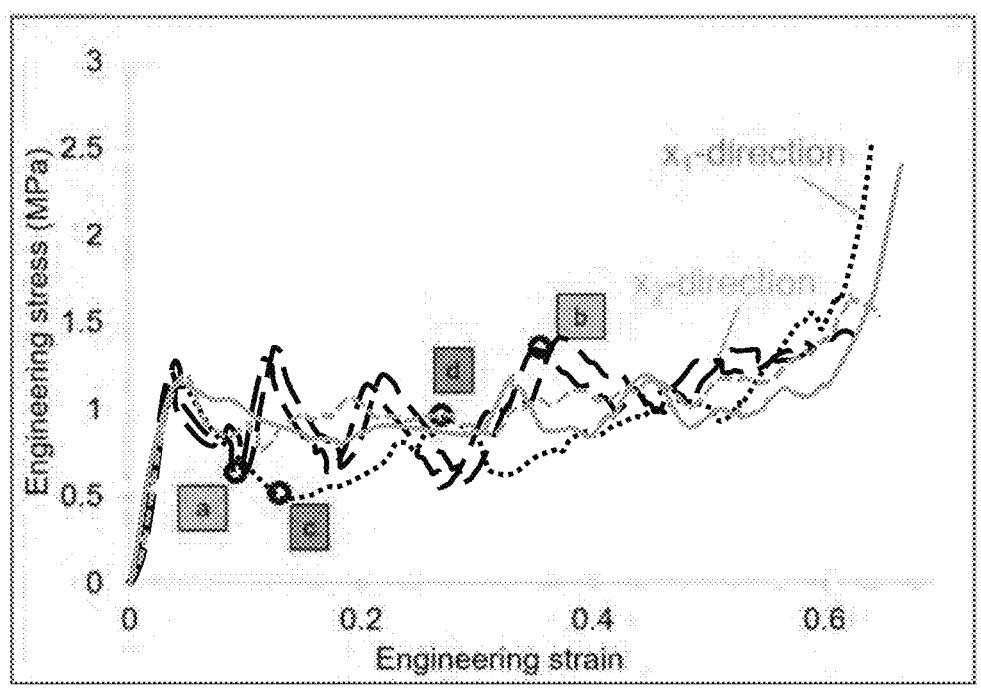
FIG. 30E is a graph of engineering stress vs. engineering strain as the hexagonal cellular structure of FIGS. 30A-30D is compressed in the respective directions indicated.

In FIGS. 30A-30E, compression failure (e.g., buckling) of a cellular structure, generally designated 400, with a hexagonal cellular geometry and cellular distribution according to a piece-wise (e.g., linear) shift function is shown. FIGS. 30A and 30B show the resulting compression when the cellular structure 400 is compressed to the point of buckling failure by a compressive force oriented in a first (e.g., height) direction relative to the cellular structure 400; this first direction is oriented substantially orthogonal to the direction in which the shift function is applied to cellular structure 400. FIGS. 30C and 30D show the resulting compression when the cellular structure 400 is compressed to the point of buckling failure by a compressive force oriented in a second (e.g., width) direction relative to the cellular structure 400; this second direction is oriented substantially parallel to the direction in which the shift function is applied to cellular structure 400. The resulting engineering stress is plotted against engineering strain in the graph of FIG. 30E, with the corresponding points of compression illustrated in FIGS. 30A-30D being marked on the appropriate data plot line. As can be seen in FIGS. 30A and 30B, where none of the internal cell walls are oriented to be parallel to the direction of the compressive force applied, the deformation of the cellular structure 400 is bending-dominated; it can be seen that, because the left region has wider cells than the right side, the cells of the left region are compressed and deform primarily through bending, whereas the cells of the right region, which have comparatively narrower cells, fail primarily through compression and buckling. This is because the side walls of the right region are oriented at an angle that is closer to parallel to the compressive force being applied than are the walls of the cells in the left region. In FIGS. 30C and 30D, where at least some of the side walls are oriented substantially parallel to the direction of the compressive force applied, the deformation of the cellular structure 400 is stretch-dominated and proceeds in substantially a similar manner as was shown in FIGS. 29C and 29D; however, because the bottom region of cells have comparatively longer side walls than do the side walls of the cells in the upper region, the cells of the lower region buckle and are compressed first, while substantially all of the cells in the upper region are not substantially deformed.

Figure 31A:
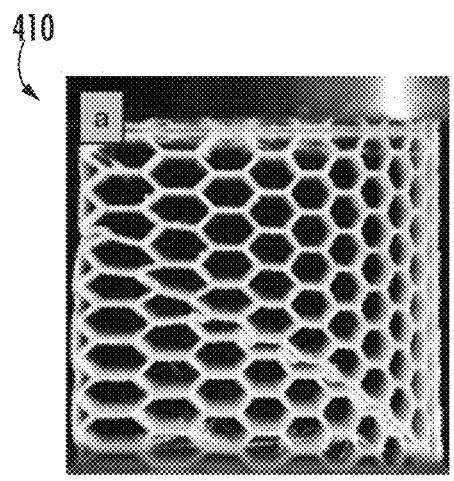
FIGS. 31A and 31B are photographs showing the compression behavior of ABS hexagonal cellular structure with a non-uniform cellular distribution according to a nonlinearly-graded (e.g., quadratic) shift function, when compressed in the x-direction.
Figure 31B:
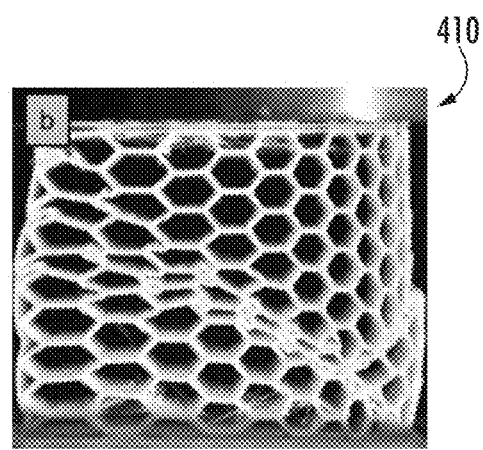
Figure 31C:
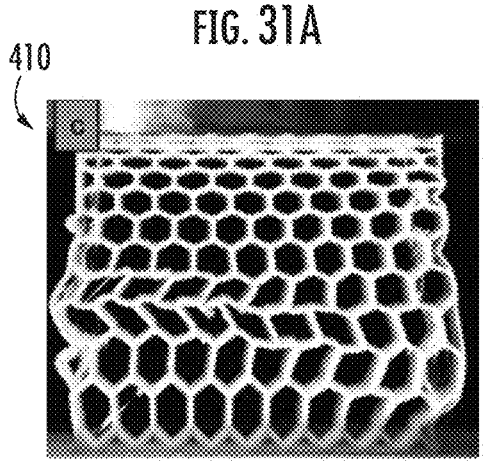
FIGS. 31C and 31D are photographs showing the compression behavior of the ABS cellular structure of FIGS. 31A and 31B, when compressed in the y-direction (e.g., orthogonal to the direction shown in FIGS. 31A and 31B).
Figure 31D:
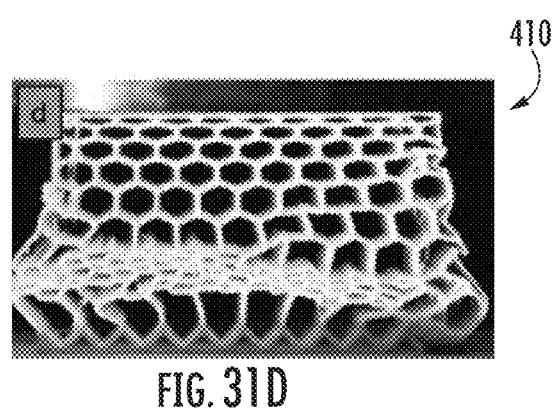
Figure 31E:
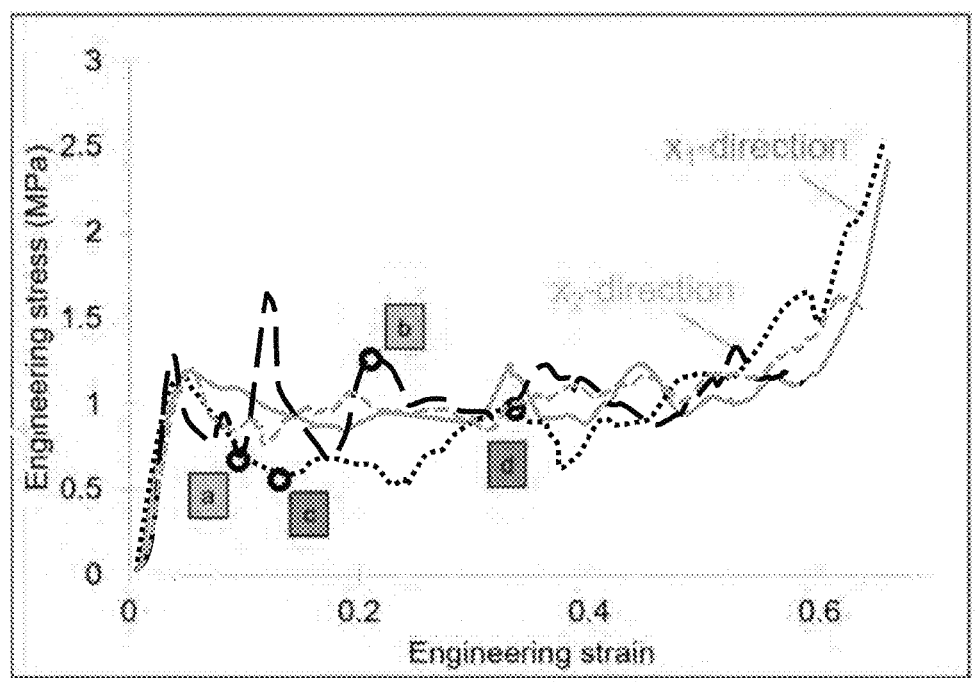
FIG. 31E is a graph of engineering stress vs. engineering strain as the hexagonal cellular structure of FIGS. 31A-31D is compressed in the respective directions indicated.

In FIGS. 31A-31E, compression failure (e.g., buckling) of a cellular structure, generally designated 410, with a hexagonal cellular geometry and cellular distribution according to a nonlinear (e.g., quadratic) shift function is shown. FIGS. 31A and 31B show the resulting compression when the cellular structure 410 is compressed to the point of buckling failure by a compressive force oriented in a first (e.g., height) direction relative to the cellular structure 410; this first direction is oriented substantially orthogonal to the direction in which the shift function is applied to cellular structure 410. FIGS. 31C and 31D show the resulting compression when the cellular structure 410 is compressed to the point of buckling failure by a force oriented in a second (e.g., width) direction of the cellular structure 410; this second direction is oriented substantially parallel to the direction in which the shift function is applied to cellular structure 410. The resulting engineering stress is plotted against engineering strain in the graph of FIG. 31E, with the corresponding points of compression illustrated in FIGS. 31A-31D being marked on the appropriate data plot line. As can be seen in FIGS. 31A and 31B, where none of the internal cell walls are oriented to be parallel to the direction of the force applied, the deformation of the cellular structure 410 is bending-dominated; unlike in the direction in which the shift function is applied to cellular structure 410 arranged according to the piece-wise shift function, because the aspect ratios of each column of cells is different from each other column of cells, failure mode of each column of cells varies, with those having lower aspect ratios (e.g., height/width) being predominated by deformation in bending and those having higher aspect ratios being predominated by deformation in stretching and/or buckling. As such, the cells of each column transition, as viewed from left to right in this embodiment, from being bending-dominant to being stretch-dominant. This is because, as the aspect ratio of each column of cells increases from left to right, the side walls of each subsequent column of cells are progressively oriented at an angle that is closer to parallel to the force being applied than are the walls of the cells having lower aspect ratios. In FIGS. 31C and 31D, where at least some of the side walls are oriented substantially parallel to the direction of the compressive force applied, the deformation of the cellular structure 410 is stretch-dominated and proceeds in substantially a similar manner as was shown in FIGS. 30C and 30D; however, because each subsequently higher row of cells has comparatively longer side walls than do the side walls of the cells immediately above, the lowest row of cells will generally buckle first, with immediately adjacent upper rows of cells buckling next in a sequential manner. It should be noted that the bottom row of cells in FIGS. 31C and 31D are not the first to buckle, but this is due to the frictional effects on the bottom surfaces of this row of cells, which causes the row of cells adjacent to the bottom row to buckle first.

As shown in the empirical test results for elastic-plastic materials shown in FIGS. 29A-31E, gradients applied parallel and transverse to the loading direction strongly affect post-collapse stress-strain behavior of the cellular structures 390, 400, 410, but the initial collapse strength is not significantly altered. As such, it is possible to apply shift and/or thickness functions to create gradients across a cellular structure to tune elastic, collapse, and post-collapse behavior independently.

Figure 32A:
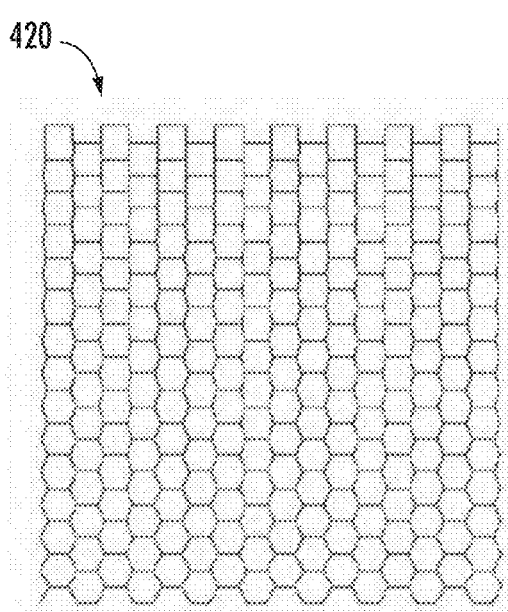
FIGS. 32A-32C are respective schematic illustrations and a photograph showing example embodiments of a cellular structure having more than one cellular geometry, with the cellular geometry transitioning from one to another across a width or height of the cellular structure.
Figure 32B:
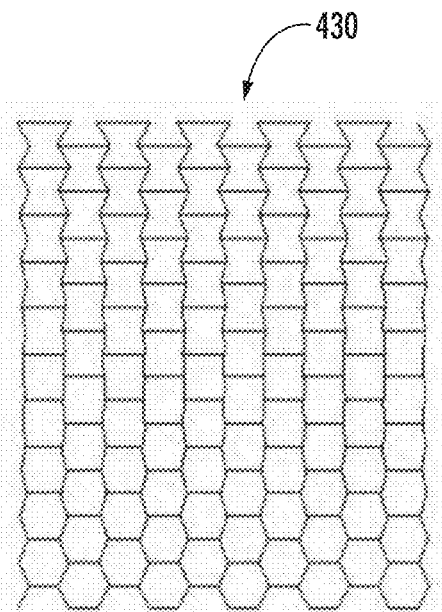
Figure 32C:
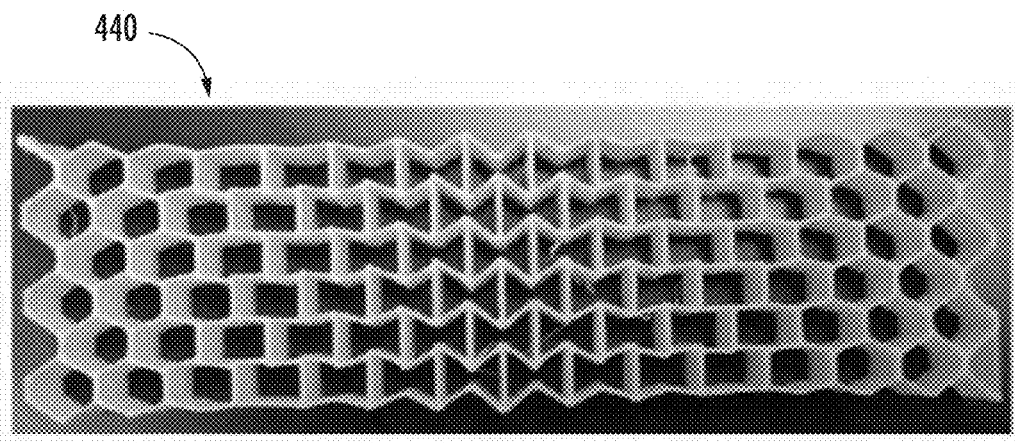

As is shown in FIGS. 32A-32C, a single cellular structure can have cells of multiple different shapes. In FIG. 32A, the cellular structure, generally designated 420, has a shape in which the geometries of the individual cells transitions from having a rectangular (e.g., square) shape at the top into a hexagonal shape at the bottom, with each row of cells being gradually different from the immediately adjacent row of cells to prevent any sharp discontinuities in cellular geometry between adjacent cells. In FIG. 32B, the cellular structure, generally designated 430, has three different cell geometries shown, progressing from an "hourglass" shape at the upper region into a rectangular (e.g., square) shape at the central region, and from the rectangular shape into the hexagonal shape at the lower region. In FIG. 32C, a printed article of manufacture is shown, with a cellular structure, generally designated 440, that is geometrically mirrored across a vertical line of symmetry arranged through a center, or midpoint, of the article. As shown, cellular structure 440 has a cellular geometry that progresses from a hexagonal shape on the left side, to a rectangular shape, to an hourglass shape, to a rectangular shape, and finally to a hexagonal shape on the right side. In some embodiments, the thickness of at least one of the walls of one or more cell within the cellular structure 440 may be different from the thickness of another such wall of the cellular structure 440.

Figures 33A, 33B:
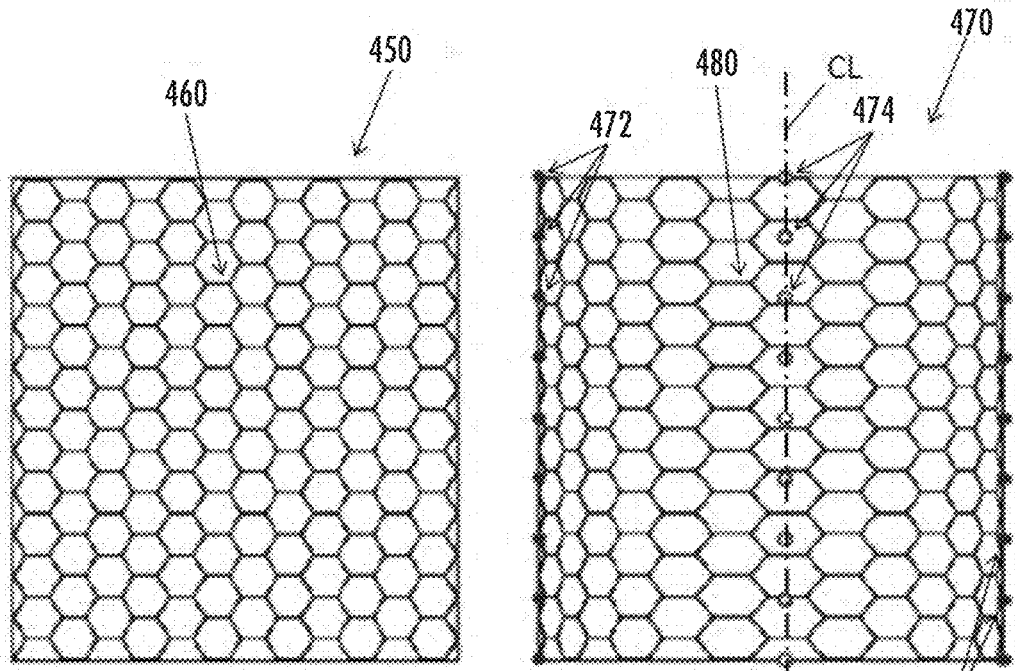
FIGS. 33A-33E are schematic illustrations showing a gradient scheme achieved by placement of functional attractor and detractor "nodes" throughout a uniform distribution of cells throughout a cellular structure, with the degree of non-uniformity capable of being produced at each node being variable by controlling an amplitude and a type of shift function applied at each such node.

FIGS. 33A-33B show a method of arranging functional attractor nodes, generally designated 472, and functional detractor nodes, generally designated 474, at discrete points within an otherwise uniformly distributed array of cells, generally designated 460, in a cellular structure, generally designated 450, shown in FIG. 33A without attractor nodes 472 or detractor nodes 474 being illustrated therein for clarity. The functional attractor nodes 472 have a positive amplitude associated therewith, such that adjacent cells 460 are distorted towards the functional attractor node 472. The functional detractor nodes 474 have a negative amplitude associated therewith, such that adjacent cells 460 are distorted away from the functional detractor node 474. The amplitudes associated with each functional attractor and detractor node 472, 474 can be selected independently of each other to create any desired arrangement of cells 460.

FIG. 33B shows an example embodiment of a cellular structure, generally designated 470, with a non-uniformly distributed array of cells 460 produced from the placement of example functional attractor and detractor nodes 472, 474, within cellular structure 450 in FIG. 33A. While FIG. 33B shows cellular structure 470 as a single layer, multiple such layers may be stacked upon each other, with one or more (e.g., all) of the multiple layers having different numbers of functional attractor and/or detractor nodes 472, 474, which can be located at the same or a different position from those functional nodes located in adjacent layers, and the amplitudes of corresponding nodes in each layer may be set independently from functional attractor and/or detractor nodes 472, 474 arranged in other (e.g., adjacent) layers of cellular structure 470. This allows for each layer within cellular structure 470 to have a different arrangement of cells (e.g., a cellular pattern), to create a graduated cellular pattern that varies across the thickness of cellular structure 470 (see, e.g., FIGS. 9A and 9B).

As shown in FIG. 33A, a plurality of cells are provided as a uniformly distributed array of cells across a domain of a cellular structure 450, with each of the cells 460 having a same shape and/or size. Cells of different shapes and/or sizes may also be used within a single layer of cellular structure 450. Additionally, a first gradient may be applied to produce an initially non-uniform distribution of cells in the domain before the placement of functional attractor and detractor nodes (see, e.g., 472, 474 in FIG. 33B). In FIG. 33B, a plurality of functional detractor nodes 474 have been placed along a vertical centerline CL of the domain and a plurality of functional attractor nodes 472 have been placed along both the lateral (e.g., right and left) perimeter edges of the domain. The functional detractor nodes 474 act to repulse the cells away, here with a uniform amplitude, or intensity. The functional attractor nodes 472 act to attract the cells towards the lateral perimeter edges, here with a uniform amplitude, or intensity, resulting in a higher concentration of cells at the lateral perimeter edges of the domain than in the center of the domain.

Figure 33C:
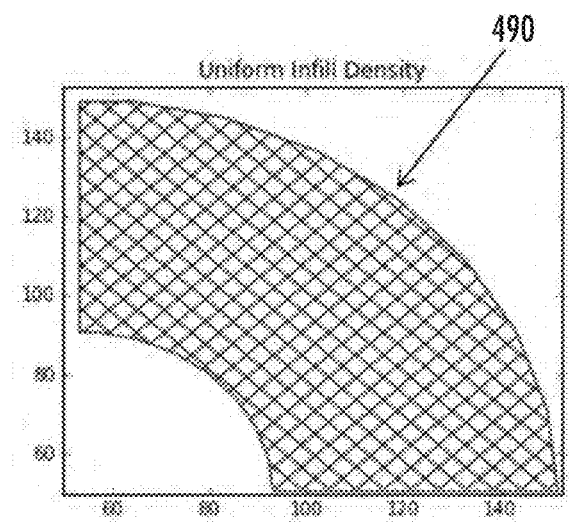
Figure 33D:
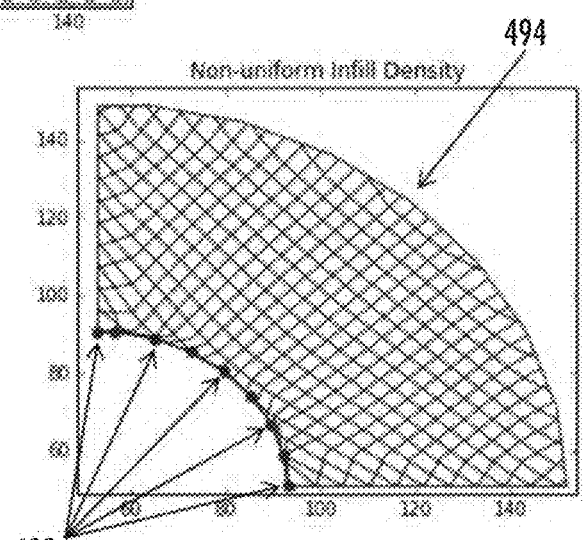
Figure 33E:
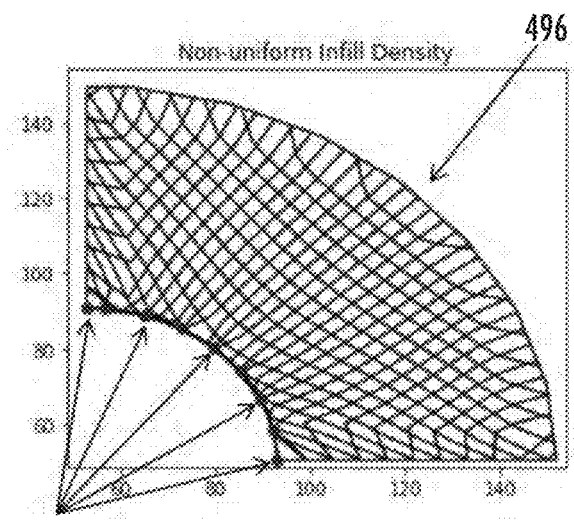

FIG. 33C shows a domain having a uniform infill density, in which is located a layer, generally designated 490, of a cellular structure, this layer 490 being in the shape of a quarter-circular arc section. Multiple different or identical layers 490 may be combined in any order to define a cellular structure. Here, no functional attractor or detractor nodes (e.g., 472, 474, FIG. 33B) are arranged and the domain has a substantially uniform distribution of cells throughout the domain, resulting in a substantially constant relative density as well. In FIG. 33D, a plurality of functional attractor nodes, generally designated 492, are arranged at an inner circumferential edge of the layer 490 in FIG. 33C to produce a modified layer, generally designated 494, with the functional attractor nodes 472 causing the cells to become distorted towards the functional attractor nodes 472 in their immediate vicinity, resulting in a non-uniform cell distribution across the modified layer 494; in other words, the cell sizes adjacent to the functional attractor nodes 472 will be smaller than those located farther away. FIGS. 33D and 33E illustrate examples of a non-uniform infill density. As is shown in FIG. 33E, the degree of non-uniformity induced by the functional attractor nodes 472 is increased relative to the example embodiment in FIG. 33D by increasing the amplitude at each of the functional attractor nodes 472, to produce a further modified layer, generally designated 496. The amplitude of one or more (here, all) of the functional attractor nodes 472 may be altered to increase the degree of non-uniformity of the array of cells within the further modified layer 496, as well as the effective distance from the functional attractor nodes 472 of the non-uniformity being induced. The opposite arrangement is also contemplated, whereby one or more of the functional attractor nodes 472 are replaced with functional detractor nodes (see, e.g., 474, FIG. 33B) to repulse the adjacent cells, thus causing cell sizes adjacent to such functional detractor nodes 474 to be larger than those located farther away. Any combination of functional attractor nodes 472 and functional detractor nodes 474 may be utilized to create any arrangement of cells within the domain, as will be understood by those having ordinary skill in the art.

Figure 34A:
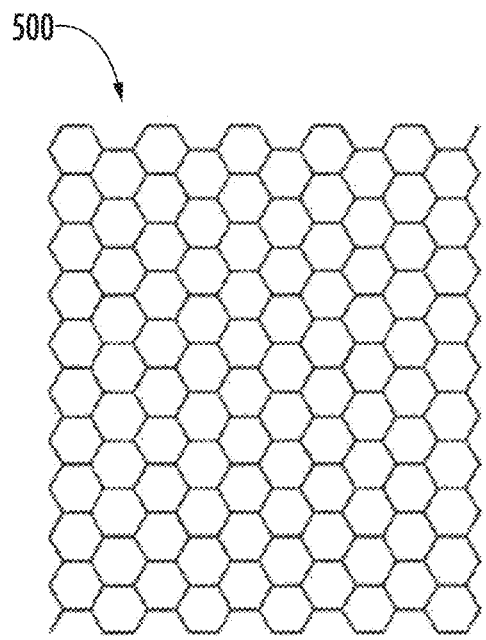
FIGS. 34A-34D are schematic illustrations showing how the distribution of the cells within the cellular structure and the thickness of the walls of the cellular structure can be varied, either independently of each other or together.
Figure 34B:
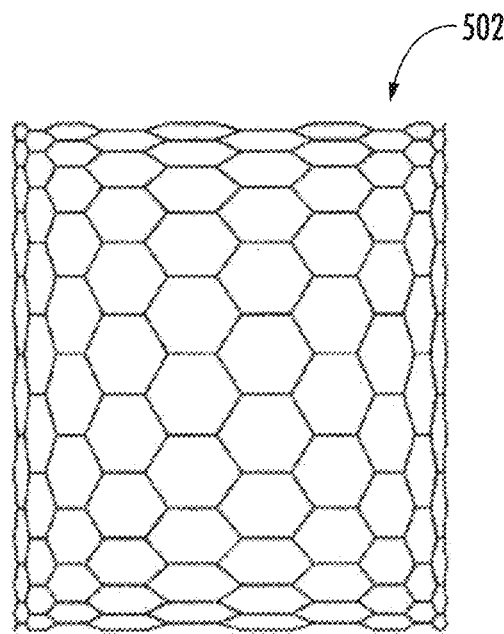
Figure 34C:
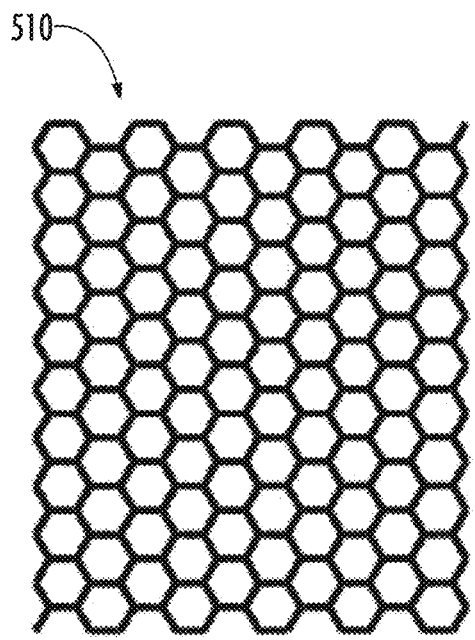
Figure 34D:
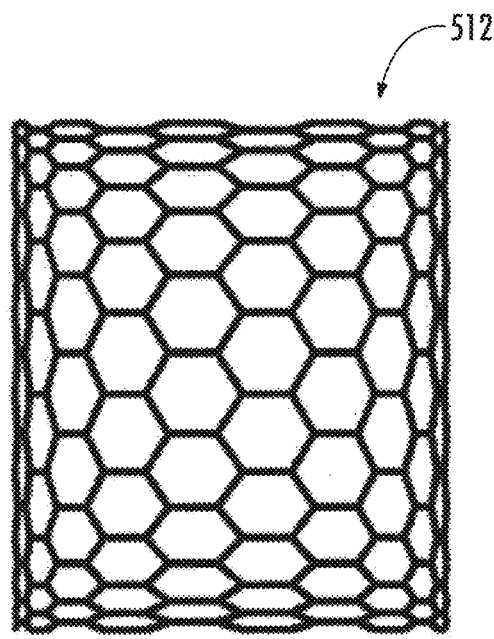

In FIGS. 34A-34D, several example embodiments are shown that illustrate how the cellular geometry and distribution of cells can be varied, either independent of, or in conjunction with, the thickness of the cell walls. In FIG. 34A, a cellular structure, generally designated 500, is shown with a uniform distribution of substantially identical hexagonal cells. Any cellular geometry may be used in cellular structure 500 instead of the hexagonal cells without deviating from the scope of the presently disclosed subject matter. In FIG. 34B, a shift function is applied to the cellular structure 500 of FIG. 34A, to produce a graded cellular structure, generally designated 502, having a non-uniform distribution of cells in the domain, both vertically and horizontally, as well as creating a plurality of differently shaped hexagonal cell geometries. In FIG. 34C, the thickness of the cell walls in the cellular structure 500 of FIG. 34A is altered according to a uniform thickness function to create a thickened cellular structure, generally designated 510, which has an increased wall thickness. The thickness function may also be non-uniform, so as to induce a thickness gradient in one or more (e.g., all) directions, so that cells arranged at opposing sides of the domain have walls of different thicknesses from each other. This thickness function can be a step function, a continuously variable function, or any combination(s) thereof. In FIG. 34D, the aspects of the shift function applied in FIG. 34B and the aspects of the thickness function in FIG. 34C are combined, such that any combination of such features as were described relative to shift functions and thickness functions can be achieved in one or more layers of a cellular structure, generally designated 512.

Figure 35:
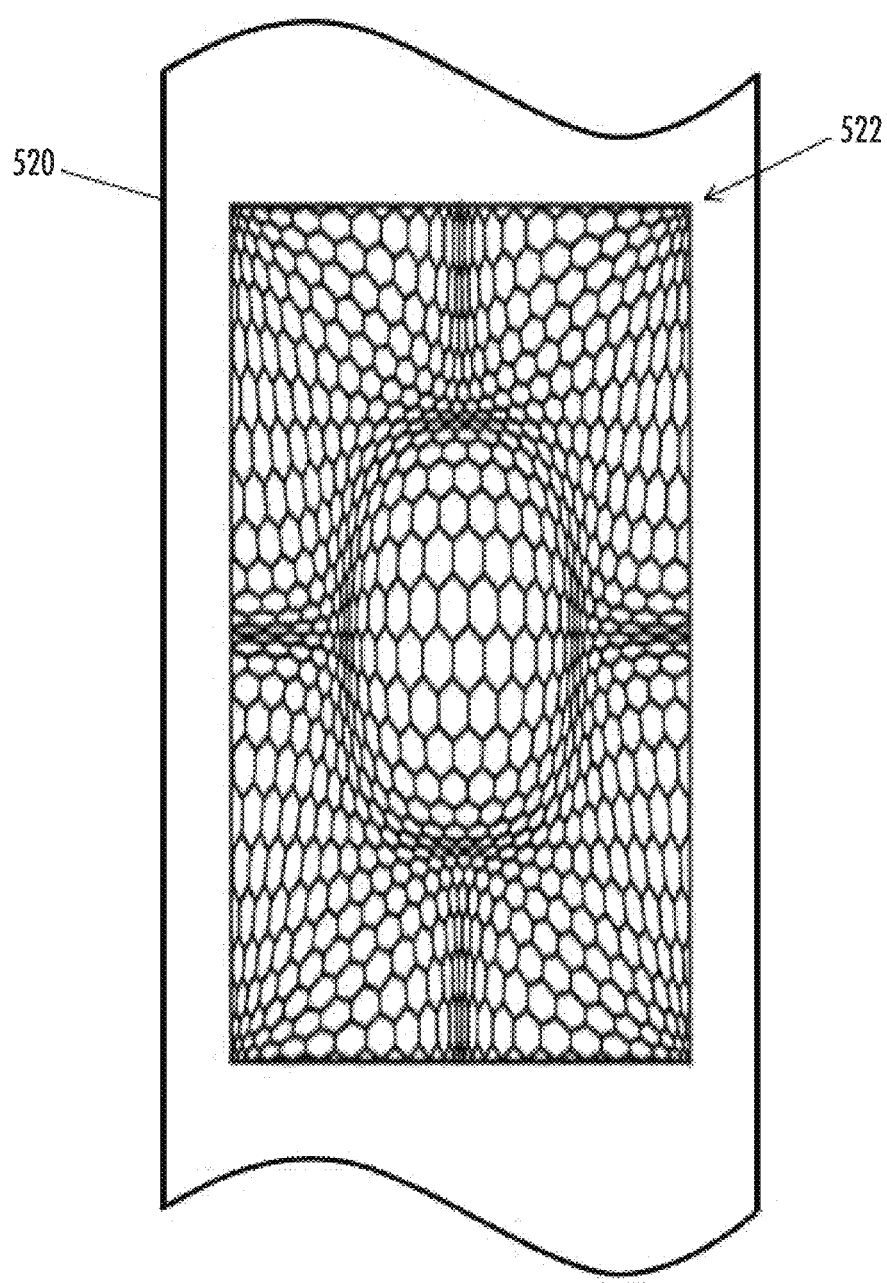
FIG. 35 is a schematic illustration showing a cellular structure dispensed as one or more layers onto a substrate material as a reinforcement.

In yet another embodiment, as shown in FIG. 35, a layer, generally designated 522, with a plurality of cells in a uniform or non-uniform distribution arrangement, may be deposited on a substrate 500 to provide a reinforcement member. The layer 522 may be arranged and/or formed in any suitable manner according to any suitable shift and/or thickness function, as described hereinabove in other example embodiments (see, e.g., FIGS. 34A-34D). The layer 522 may be provided either via a direct dispensing method (e.g., via additive manufacturing techniques) or through application of a suitable adhesive to a pre-formed layer or substrate 520. A plurality of such layers 522 may be deposited. This substrate 520 may be flexible, rigid, fibrous, elastomeric, or any suitable type of material, such as, for example, woven or non-woven fabric, felt, polymer film, paper, foil, and the like, as well as any suitable combinations thereof. In one example, the substrate 520 may be a flexible fabric, onto which a single layer 522 with a cellular structure may be deposited directly. In some aspects, the substrate 520 may be configured to absorb and/or bond to the dispensed material to form a rugged bonding interface. In some other aspects, multiple layers 522 of a cellular arrangement may be dispensed onto such a substrate 520, such that the substrate 520 is still capable of deformation, but further reinforcement is provided. Such an article of manufacture, including a substrate 520 and at least one layer 522 with a cellular structure, may have a cellular geometry and/or distribution that is uniform, non-uniform, or a combination thereof in discrete regions of the substrate 520. Additionally, it is provided that a thickness function may be applied such that walls of a plurality of thicknesses may be used to provide further tunable stiffness characteristics for the combined substrate 520 and cellular layer 522.

In some embodiments, such an article of manufacture having a graded cellular arrangement (e.g., non-uniform distribution of cells) may be produced via techniques other than additive manufacturing, including, for example, injection molding, casting, stamping, laser cutting, water jet cutting, and/or electrical discharge machining (EDM).

In some embodiments, graded cellular structures may be produced in three dimensions. According to these embodiments, a predefined (e.g., uniform) coordinate system is defined within a three-dimensional domain. In the embodiment shown, the domain is in the shape of a cube, however other domain shapes, including irregularly shaped domains, are contemplated and within the scope of the disclosure made herein. In the cube domain example, a plurality of nodes are defined throughout the domain in the height, width, and thickness directions of the domain, such that a plurality of nodes are defined within the domain at regular intervals. This can be envisioned as an internal three-dimensional grid defining a plurality of cells within the cube domain. The individual nodes can be connected in any suitable manner and direction within the cube domain.

In some embodiments, struts (e.g., cylindrically shaped connecting members) can be provided between adjacent nodes to provide an interconnection therebetween. The use of such struts creates an "open cell" three-dimensional cellular structure, where each individual cell is open to other adjacent cells within the cube domain. In some other embodiments, the cells can be fully or partially enclosed, such that internal cells are physically segregated from each other.

Regardless of whether the resultant cellular structure is of an open or closed cells type, one or more shift functions can be applied to alter an arrangement of the nodes in one or more of the height, width, and thickness directions, thereby producing cells that have different physical dimensions within the domain. The same or different shift functions can be applied in any number of directions and can be applied over the domain at an angle offset from the height, width, and thickness directions of the domain. In some embodiments, nodes in one or more directions may have a shift function applied thereto, while nodes in one or more other directions may have no shift function, a same shift function, or a different shift function applied thereto. The shift function(s) applied may comprise, for example, any of the shift functions disclosed elsewhere herein.

Figure 37A:
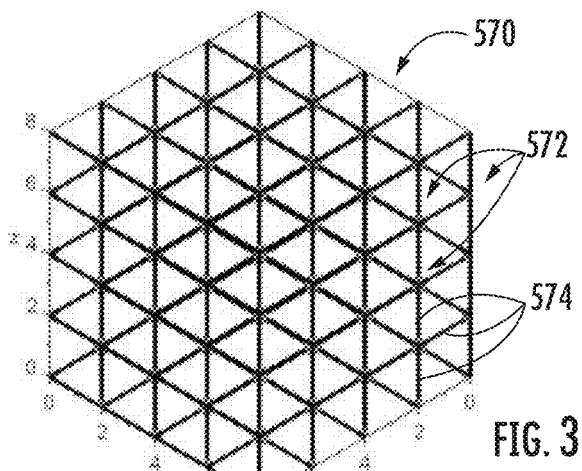
FIGS. 37A-37E are schematic illustrations showing respective views of an example embodiment of a three-dimensional cellular structure with a uniform cellular distribution.
Figure 37B:
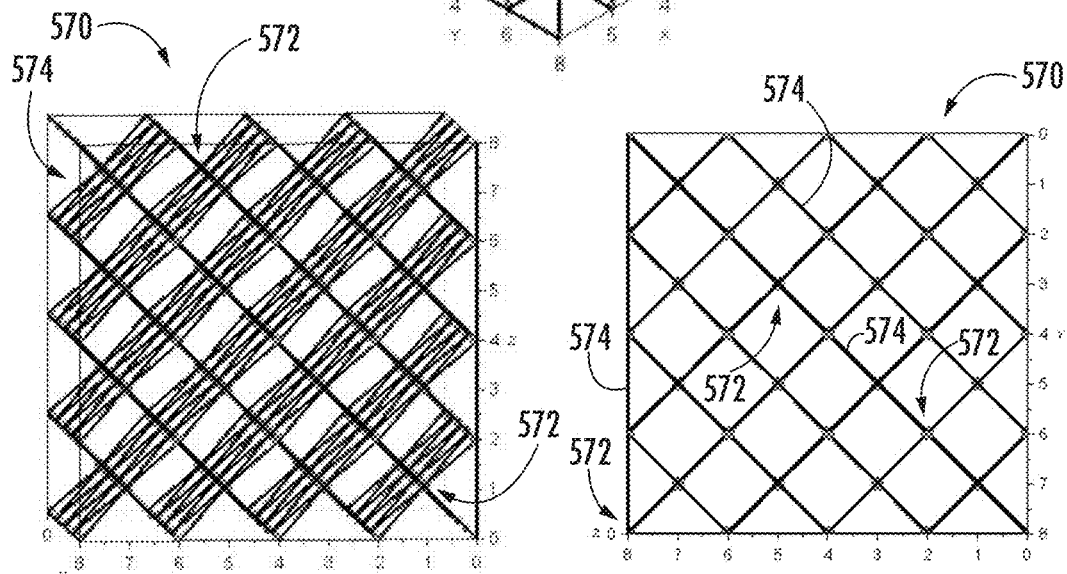
Figure 37C:
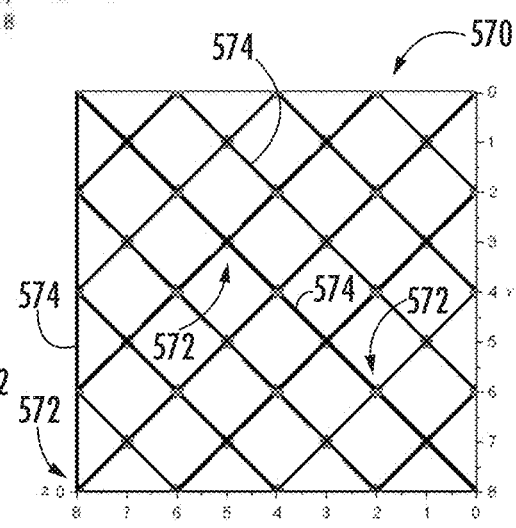
Figure 37D:
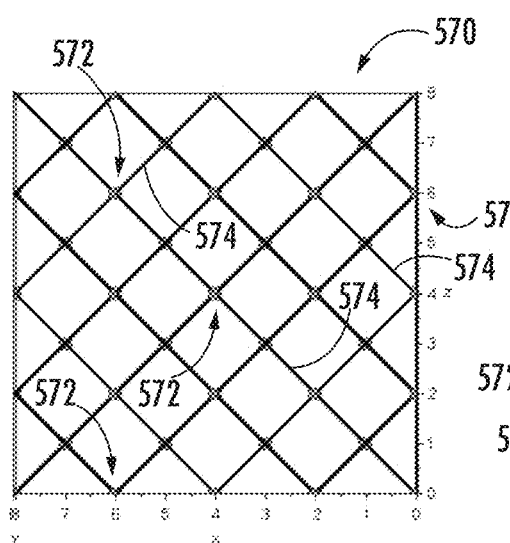
Figure 37E:
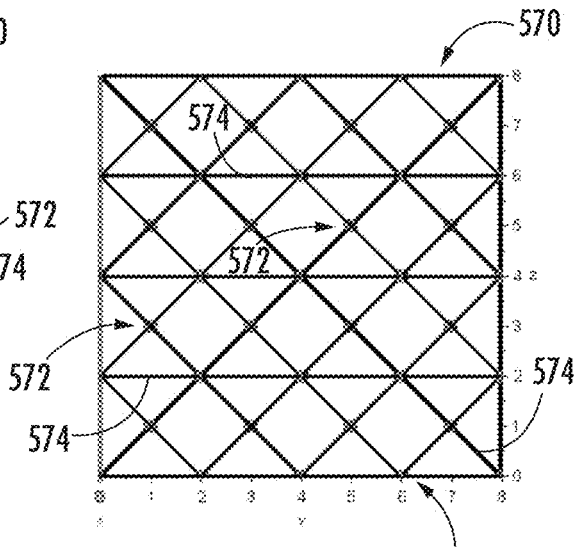

Example embodiments for such three-dimensional cellular structures are shown in FIGS. 37A-39E. FIGS. 37A-37E show an example of an ungraded three-dimensional cellular structure, generally designated 570. The cellular structure 570 is defined by a plurality of nodes, generally designated 572, spaced apart from each other according to a predefined arrangement (e.g., uniformly) within a three-dimensional domain, shown here along the x, y, and z axes. Each of the nodes 572 are connected to one or more adjacent nodes 572 by at least one strut 574 or wall. FIG. 37A shows an isometric view of the cellular structure 570. FIG. 37B shows a slightly offset view of the cellular structure 570. FIG. 37C shows a vertical view in the x-y plane (e.g., aligned with the z axis) of the cellular structure 570. As shown in FIG. 37C, the nodes 572 may be aligned with each other and/or offset from each other within the domain, shown here by the diamond-shaped and triangular-shaped individual cells. The nodes 572 can be aligned in a grid pattern such that each of the struts 574 shown in FIG. 37C is instead aligned with one of the x, y, or z axes. FIG. 37D shows a first side view in the x-z plane (e.g., aligned with the y axis) of the cellular structure 570. As shown in FIG. 37D, the nodes 572 may be aligned with each other and/or offset from each other within the domain, shown here by the diamond-shaped and triangular-shaped individual cells. The nodes 572 can be aligned in a grid pattern such that each of the struts 574 shown in FIG. 37D is instead aligned with one of the x, y, or z axes. FIG. 37E shows a second side view in the y-z plane (e.g., aligned with the x axis) of the cellular structure 570. As shown in FIG. 37E, the nodes 572 may be aligned with each other and/or offset from each other within the domain, shown here by the diamond-shaped and triangular-shaped individual cells. The nodes 572 can be aligned in a grid pattern such that each of the struts 574 shown in FIG. 37E is instead aligned with one of the x, y, or z axes. In some embodiments, the struts 574 can be replaced, either partially or entirely, with walls that physically segregate adjacent cells that are separated by such walls. In embodiments where the struts 574 are entirely replaced with walls, the cellular structure 570 is of a closed-cell type. Such embodiments, due to the inherent limitations in illustrating internal structures within a closed-cell cellular structure having an outer surface at least partially obscuring the internal structure within the cellular structure 570, are also illustrated in FIGS. 37A-37E. In embodiments where the struts 574 are partially replaced with walls, such that cellular structure 570 comprises both struts and walls, the cellular structure 570 is of a hybrid cell-type structure, comprising both open and closed cells. In some embodiments, multiple adjacent (e.g., contiguous) cells within the cellular structure 570 can be isolated by replacing the struts defining their perimeter surface with walls, such that such adjacent cells are, effectively, a cluster of open cells that is isolated from other cells within the cellular structure, thereby allowing, in some such embodiments, for containing other substances therein.

Figure 38A:
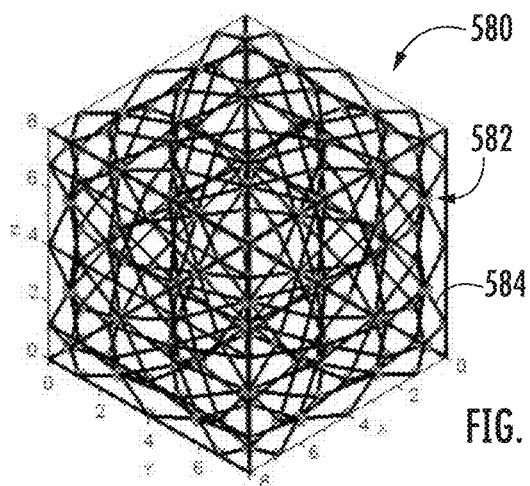
FIGS. 38A-38E are schematic illustrations showing respective views of another example embodiment of a three-dimensional cellular structure with a graded cellular distribution.
Figure 38B:
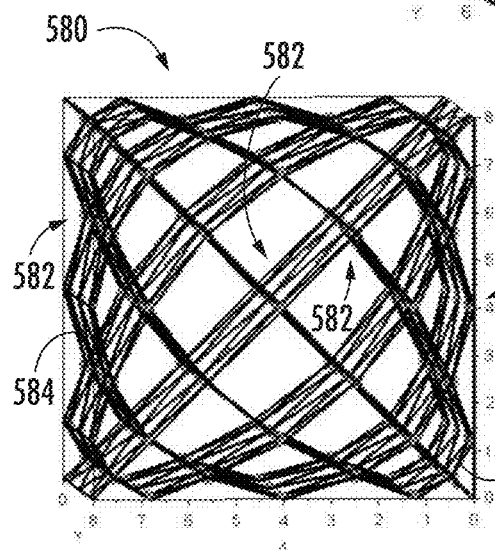
Figure 38C:
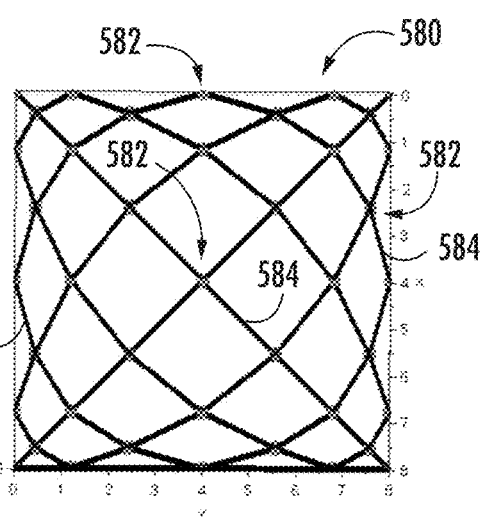
Figure 38D:
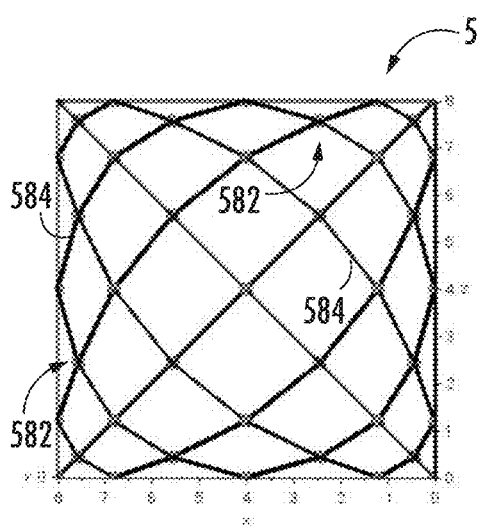
Figure 38E:
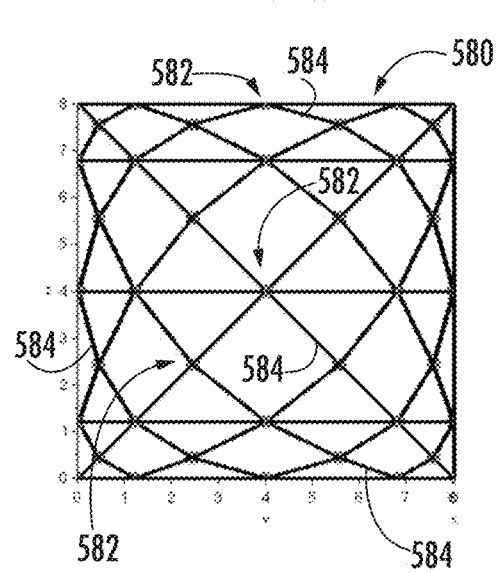

FIGS. 38A-38E show an example of an isometrically graded three-dimensional cellular structure, generally designated 580. In this embodiment, a the same shift function (e.g., linear, nonlinear, sinusoidal, etc.) is applied in each direction of the domain to produce the cellular structure 580. The cellular structure 580 is defined by a plurality of nodes, generally designated 582, spaced apart from each other according to a predefined arrangement (e.g., uniformly) within a three-dimensional domain, over which a shift function and/or a thickness function are applied to produce the graded arrangements of the nodes, shown here being distributed within the domain along the x, y, and z axes. Any of the shift functions and thickness functions described herein, as well as those understood by those having ordinary skill in the art, may be applied in any direction, including at an angle relative to the x, y, and/or x axes, to shift the positions of the nodes within the domain and/or a thickness of the struts or walls interconnecting the nodes 582. Each of the nodes 582 are connected to one or more adjacent nodes 582 by at least one strut 584 or wall. FIG. 38A shows an isometric view of the cellular structure 580. FIG. 38B shows a slightly offset view of the cellular structure 580. FIG. 38C shows a vertical view in the x-y plane (e.g., aligned with the z axis) of the cellular structure 580. As shown in FIG. 38C, the nodes 582 may be aligned with each other and/or offset from each other within the domain, shown here by the diamond-shaped and triangular-shaped individual cells. The nodes 582 can be aligned in a grid pattern such that each of the struts 584 shown in FIG. 38C is instead aligned with one of the x, y, or z axes. FIG. 38D shows a first side view in the x-z plane (e.g., aligned with the y axis) of the cellular structure 580. As shown in FIG. 38D, the nodes 582 may be aligned with each other and/or offset from each other within the domain, shown here by the diamond-shaped and triangular-shaped individual cells. The nodes 582 can be aligned in a grid pattern such that each of the struts 584 shown in FIG. 38D is instead aligned with one of the x, y, or z axes. FIG. 38E shows a second side view in the y-z plane (e.g., aligned with the x axis) of the cellular structure 580. As shown in FIG. 38E, the nodes 582 may be aligned with each other and/or offset from each other within the domain, shown here by the diamond-shaped and triangular-shaped individual cells. The nodes 582 can be aligned in a grid pattern such that each of the struts 584 shown in FIG. 38E is instead aligned with one of the x, y, or z axes. In some embodiments, the struts 584 can be replaced, either partially or entirely, with walls that physically segregate adjacent cells that are separated by such walls. In embodiments where the struts 584 are entirely replaced with walls, the cellular structure 580 is of a closed-cell type. Such embodiments, due to the inherent limitations in illustrating internal structures within a closed-cell cellular structure having an outer surface at least partially obscuring the internal structure within the cellular structure 580, are also illustrated in FIGS. 38A-38E. In embodiments where the struts 584 are partially replaced with walls, such that cellular structure 580 comprises both struts and walls, the cellular structure 580 is of a hybrid cell-type structure, comprising both open and closed cells. In some embodiments, multiple adjacent (e.g., contiguous) cells within the cellular structure 580 can be isolated by replacing the struts defining their perimeter surface with walls, such that such adjacent cells are, effectively, a cluster of open cells that is isolated from other cells within the cellular structure, thereby allowing, in some such embodiments, for containing other substances therein.

Figure 39A:
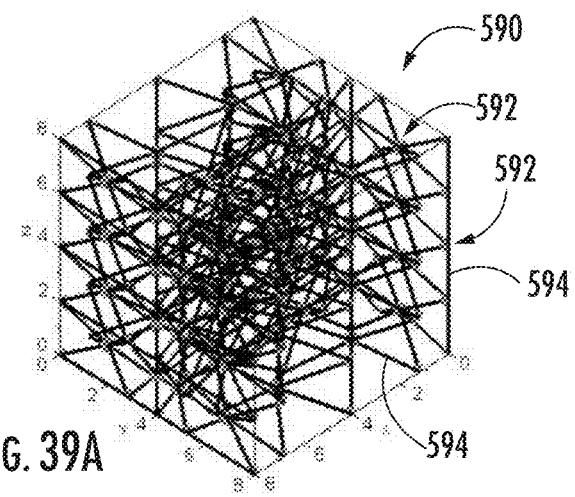
FIGS. 39A-39E are schematic illustrations showing respective views of a further example embodiment of a three-dimensional cellular structure with a graded cellular distribution.
Figures 39B, 39C:
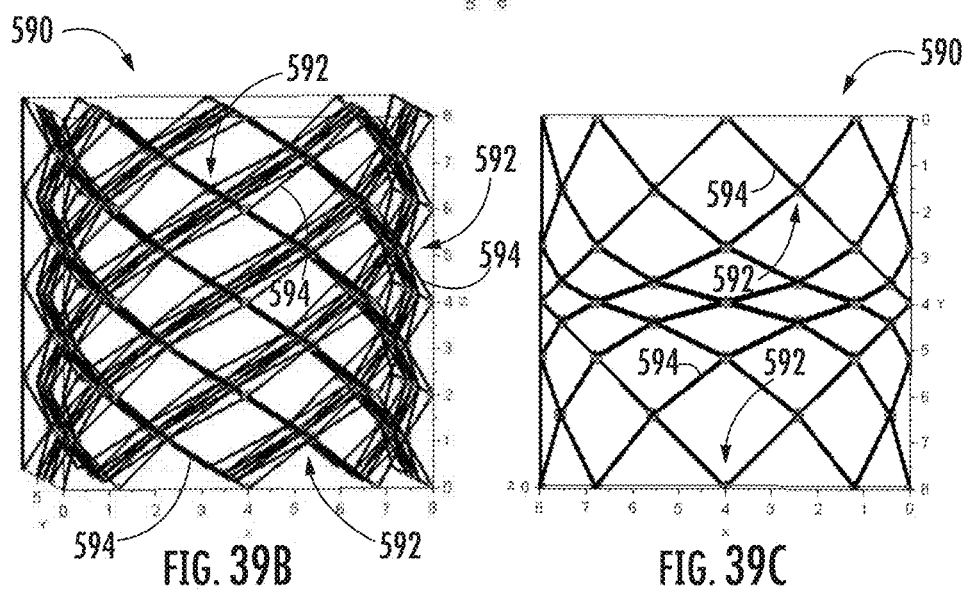
Figures 39D, 39E:
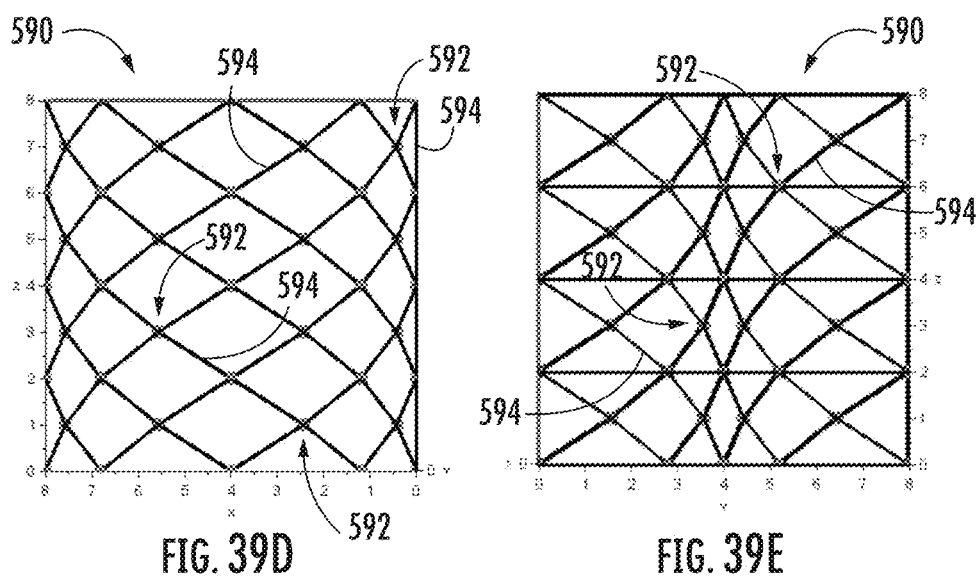

FIGS. 39A-39E show an example of a graded three-dimensional cellular structure, generally designated 590. In this embodiment, a different type of shift function (e.g., linear, nonlinear, sinusoidal, etc.) is applied in each direction of the domain to produce the cellular structure 590. In some embodiments, the same type of shift function may be applied in multiple directions, whether aligned with or angled relative to the axes defining the domain, and the characteristics (e.g., the amplitude) of the shift function can be varied. The cellular structure 590 is defined by a plurality of nodes, generally designated 592, spaced apart from each other according to a predefined arrangement (e.g., uniformly) within a three-dimensional domain, over which a shift function and/or a thickness function are applied to produce the graded arrangements of the nodes, shown here being distributed within the domain along the x, y, and z axes. Any of the shift functions and thickness functions described herein, as well as those understood by those having ordinary skill in the art, may be applied in any direction, including at an angle relative to the x, y, and/or x axes, to shift the positions of the nodes within the domain and/or a thickness of the struts or walls interconnecting the nodes 592. Each of the nodes 592 are connected to one or more adjacent nodes 592 by at least one strut 594 or wall. FIG. 39A shows an isometric view of the cellular structure 590. FIG. 39B shows a slightly offset view of the cellular structure 590. FIG. 39C shows a vertical view in the x-y plane (e.g., aligned with the z axis) of the cellular structure 590. As shown in FIG. 39C, the nodes 592 may be aligned with each other and/or offset from each other within the domain, shown here by the diamond-shaped and triangular-shaped individual cells. The nodes 592 can be aligned in a grid pattern such that each of the struts 594 shown in FIG. 39C is instead aligned with one of the x, y, or z axes. FIG. 39D shows a first side view in the x-z plane (e.g., aligned with the y axis) of the cellular structure 590. As shown in FIG. 39D, the nodes 592 may be aligned with each other and/or offset from each other within the domain, shown here by the diamond-shaped and triangular-shaped individual cells. The nodes 592 can be aligned in a grid pattern such that each of the struts 594 shown in FIG. 39D is instead aligned with one of the x, y, or z axes. FIG. 39E shows a second side view in the y-z plane (e.g., aligned with the x axis) of the cellular structure 590. As shown in FIG. 39E, the nodes 592 may be aligned with each other and/or offset from each other within the domain, shown here by the diamond-shaped and triangular-shaped individual cells. The nodes 592 can be aligned in a grid pattern such that each of the struts 594 shown in FIG. 39E is instead aligned with one of the x, y, or z axes. In some embodiments, the struts 594 can be replaced, either partially or entirely, with walls that physically segregate adjacent cells that are separated by such walls. In embodiments where the struts 594 are entirely replaced with walls, the cellular structure 590 is of a closed-cell type. Such embodiments, due to the inherent limitations in illustrating internal structures within a closed-cell cellular structure having an outer surface at least partially obscuring the internal structure within the cellular structure 590, are also illustrated in FIGS. 39A-39E. In embodiments where the struts 594 are partially replaced with walls, such that cellular structure 590 comprises both struts and walls, the cellular structure 590 is of a hybrid cell-type structure, comprising both open and closed cells. In some embodiments, multiple adjacent (e.g., contiguous) cells within the cellular structure 590 can be isolated by replacing the struts defining their perimeter surface with walls, such that such adjacent cells are, effectively, a cluster of open cells that is isolated from other cells within the cellular structure, thereby allowing, in some such embodiments, for containing other substances therein.

The embodiments disclosed herein are provided only by way of example and are not to be used in any way to limit the scope of the subject matter disclosed herein. As such, it will be understood that various details of the presently disclosed subject matter may be changed without departing from the scope of the presently disclosed subject matter. The foregoing description is for the purpose of illustration only, and not for the purpose of limitation.

What is claimed is:

1. A method of producing a cellular structure via an additive manufacturing technique, the method comprising:
providing a feedstock material to an additive manufacturing printer device;
dispensing the feedstock material from the printer device; and
controlling the dispensing of the feedstock material to form at least one layer of the cellular structure according to a first predetermined gradient;
wherein the at least one layer comprises an array of cells surrounded, respectively, by walls, and arranged to create a non-uniform relative density and/or cell geometry across a width and/or a length of the cellular structure, the width and the length being oriented substantially orthogonally to a depth of the cellular structure.

2. The method of claim 1, wherein the feedstock material is selected from the group consisting of one or more of acrylonitrile butadiene styrene (ABS), poly(lactic acid) (PLA), a thermoplastic material, epoxies, elastomers, reactive polymer systems, including (polyurethane and polyurea, preceramic polymer resins, ceramics, metals, fiber composites, bio-materials, gels, conductive inks, and battery materials.

3. The method of claim 1, wherein the array of cells comprises cells having a shape of one or more of a triangle, a square, a rectangle, a parallelogram, a kagome pattern, a hexagon, an octagon, and an hourglass.

4. The method of claim 1, wherein the relative density of the at least one layer increases from a first side of the at least one layer to a second side of the at least one layer.

5. The method of claim 1, wherein at least some of the walls are arranged between adjacent cells of the array of cells.

6. The method of claim 1, wherein the array of cells is arranged according to a shift function to create the non-uniform relative density and/or cell geometry across the width and/or the length of the at least one layer.

7. The method of claim 6, wherein the shift function is a non-linear shift function, such that each row and/or column of cells in the array of cells has a different relative density and/or cell geometry from an adjacent row and/or column of cells in the array of cells.

8. The method of claim 7, wherein the at least one layer has a lower and/or higher relative density in a center region of the at least one layer than at a perimeter region of the at least one layer.

9. The method of claim 6, wherein the shift function is a piece-wise linear shift function, such that the at least one layer comprises at least first and second regions,
wherein the array of cells comprises a first subarray of cells and a second subarray of cells,
wherein the first subarray of cells has a first relative density and is arranged in the first region, and
wherein the second subarray of cells has a second relative density and is arranged in the second region.

10. The method of claim 9, wherein the first relative density is different from the second relative density.

11. The method of claim 9, wherein the first subarray of cells comprises cells that are a different size, aspect ratio, and/or shape than cells in the second subarray of cells.

12. The method of claim 6, wherein controlling the dispensing of the feedstock material comprises:
arranging at least one attractor node and/or at least one detractor node within the first predetermined gradient;
selecting an amplitude associated with the shift function to determine a degree of non-linearity of a distribution of cells within the array of cells; and
applying the shift function to generate a non-uniform distribution of cells within the array of cells.

13. The method of claim 12, wherein the shift function comprises a piece-wise linear shift function, a quadratic shift function, a sinusoidal shift function, an exponential shift function, or any combination thereof.

14. The method of claim 1, comprising controlling the dispensing of the feedstock to form a plurality of subsequent layers of the cellular structure according to respective predetermined gradients.

15. The method of claim 14, wherein a relative density and/or cell geometry of an array of cells of a first layer has a different gradient from a relative density and/or cell geometry of an array of cells of a second layer.

16. The method of claim 1, comprising varying a speed of a nozzle of the printer device as the feedstock material is dispensed to produce walls having variable thickness.

17. The method of claim 1, wherein the additive manufacturing technique comprises one or more of a fused deposition modeling (FDM™) technique, a fused filament fabrication (FFF) technique, a big area additive manufacturing (BAAM) technique, a robocasting technique, a paste extrusion technique, and/or a direct ink writing (DIW) technique.

18. The method of claim 1, wherein the cellular structure comprises a single layer, wherein the at least one layer is the single layer, and wherein the at least one layer is dispensed onto a substrate.

19. The method of claim 18, wherein the substrate comprises woven or non-woven fabric, felt, polymer film, paper, and/or foil.

20. The method of claim 1, comprising:
- defining a three-dimensional domain corresponding to a three-dimensional cellular structure;
- arranging a plurality of nodes throughout the domain;
- applying a shift function in at least one direction of the domain so that the nodes have a non-uniform distribution in the at least one direction; and
- interconnecting the nodes to form individual three-dimensional cells within the cellular structure.

21. The method of claim 20, wherein interconnecting the nodes comprises connecting adjacent nodes with struts so that the cellular structure is of an open cell type.

22. The method of claim 20, wherein the individual cells are physically segregated from each other by walls so that the cellular structure is of a closed cell type.

\* \* \* \* \*